United States Patent
Chen et al.

(10) Patent No.: US 9,328,946 B2
(45) Date of Patent: May 3, 2016

(54) HEAT PUMPS WITH UNEQUAL COOLING AND HEATING CAPACITIES FOR CLIMATES WHERE DEMAND FOR COOLING AND HEATING ARE UNEQUAL, AND METHOD OF ADAPTING AND DISTRIBUTING SUCH HEAT PUMPS

(71) Applicant: Nortek Global HVAC LLC, O'Fallon, MO (US)

(72) Inventors: Jie Chen, Saint Charles, MO (US); Allan J. Reifel, Florissant, MO (US); David L. Koesterer, Belleville, MO (US); Siegfried J. Weigl, St. Clair, MO (US)

(73) Assignee: Nortek Global HVAC, LLC, O'Fallon, MO (US)

( * ) Notice: Subject to any disclaimer, the term of this patent is extended or adjusted under 35 U.S.C. 154(b) by 0 days.

(21) Appl. No.: 14/806,056

(22) Filed: Jul. 22, 2015

(65) Prior Publication Data

US 2015/0321298 A1    Nov. 12, 2015

Related U.S. Application Data

(60) Division of application No. 13/035,761, filed on Feb. 25, 2011, now Pat. No. 9,121,628, which is a (Continued)

(51) Int. Cl.
*F25B 49/02* (2006.01)
*F25B 30/02* (2006.01)

(52) U.S. Cl.
CPC .............. *F25B 30/02* (2013.01); *F25B 49/025* (2013.01); *F25B 2600/025* (2013.01); *F25B 2600/0253* (2013.01); *F25B 2600/11* (2013.01); *Y02B 30/741* (2013.01); *Y10T 29/49359* (2015.01)

(58) Field of Classification Search
CPC ........... F25B 49/025; F25B 2600/0253; Y02B 30/741
See application file for complete search history.

(56) References Cited

U.S. PATENT DOCUMENTS

| | | |
|---|---|---|
| 4,459,519 A | 7/1984 | Erdman |
| 4,460,035 A | 7/1984 | Mizote et al. |

(Continued)

FOREIGN PATENT DOCUMENTS

| | | |
|---|---|---|
| EP | 0072982 B1 | 5/1986 |
| EP | 0080838 B1 | 8/1986 |

(Continued)

OTHER PUBLICATIONS

"U.S. Appl. No. 12/844,709, Notice of Allowance mailed Jun. 30, 2011", 11 pgs.

(Continued)

*Primary Examiner* — Jonathan Bradford
(74) *Attorney, Agent, or Firm* — Schwegman Lundberg & Woessner, P.A.

(57) ABSTRACT

Heat pumps for climates where demand for cooling and heating are unequal and methods of adapting and distributing heat pumps for such climates. Heat pumps include a compressor, compressor motor, variable-speed drive, and controller. In a number of embodiments, non-volatile memory stores sets of constant speeds for cooling and heating, and a person can select, via an input device, different sets of speeds for cooling and heating to provide the different cooling and heating capacities. The controller then operates the unit at the selected speeds, selecting from within the set based on demand for cooling or heating. In some embodiments, different sets of speeds may have the same minimum speed but different maximum speeds. Identical heat pumps can be configured to have different capacity ratings and different advertized efficiencies for different climates.

11 Claims, 9 Drawing Sheets

Related U.S. Application Data continuation-in-part of application No. 12/844,709, filed on Jul. 27, 2010, now Pat. No. 8,011,199, which is a continuation of application No. PCT/US2010/037105, filed on Jun. 2, 2010.

(60) Provisional application No. 61/183,442, filed on Jun. 2, 2009.

(56) References Cited

U.S. PATENT DOCUMENTS

| | | |
|---|---|---|
| 4,584,844 A | 4/1986 | Lemal |
| 4,795,088 A | 1/1989 | Kobayashi et al. |
| 4,831,313 A | 5/1989 | Beilfuss |
| 4,978,896 A | 12/1990 | Shah et al. |
| 5,013,981 A | 5/1991 | Rodi |
| 5,074,120 A | 12/1991 | Kitamoto |
| 5,103,391 A | 4/1992 | Barrett et al. |
| 5,253,483 A | 10/1993 | Powell et al. |
| 5,269,660 A | 12/1993 | Pradelle |
| 5,323,619 A | 6/1994 | Kim |
| 5,410,230 A | 4/1995 | Bessler et al. |
| 5,673,568 A | 10/1997 | Isshiki |
| 6,134,901 A | 10/2000 | Harvest et al. |
| 6,330,806 B1 | 12/2001 | Beaverson et al. |
| 6,457,653 B1 | 10/2002 | Campbell |
| 6,726,113 B2 | 4/2004 | Guo |
| 7,296,426 B2 | 11/2007 | Butler et al. |
| 7,377,119 B2 | 5/2008 | Kim et al. |
| 7,513,123 B2 | 4/2009 | Lee et al. |
| 7,784,296 B2 | 8/2010 | Chen et al. |
| 8,011,199 B1 | 9/2011 | Chen et al. |
| 2002/0029475 A1 | 3/2002 | Myung et al. |
| 2003/0089121 A1 | 5/2003 | Wilson et al. |
| 2004/0237551 A1 | 12/2004 | Schwarz et al. |
| 2005/0086959 A1 | 4/2005 | Wilson et al. |
| 2006/0130504 A1 | 6/2006 | Agrawal et al. |
| 2007/0032909 A1 | 2/2007 | Tolbert, Jr. et al. |
| 2008/0041081 A1 | 2/2008 | Tolbert |
| 2008/0093132 A1 | 4/2008 | Wijaya et al. |
| 2008/0307811 A1 | 12/2008 | Bryan et al. |
| 2009/0030554 A1 | 1/2009 | Bean, Jr. et al. |
| 2009/0266091 A1 | 10/2009 | Tolbert, Jr. |
| 2012/0090337 A1 | 4/2012 | Chen et al. |

FOREIGN PATENT DOCUMENTS

| | | |
|---|---|---|
| EP | 0572149 B1 | 8/1998 |
| WO | WO-9815790 A1 | 4/1998 |
| WO | WO-2008097743 A1 | 8/2008 |
| WO | WO-2010141614 A3 | 12/2010 |

OTHER PUBLICATIONS

"U.S. Appl. No. 12/844,709, Preliminary Amendment filed May 27, 2011", 14 pgs.

"U.S. Appl. No. 12/844,709, Preliminary Amendment filed Jun. 10, 2011", 17 pgs.

"U.S. Appl. No. 13/035,761, Examiner Interview Summary mailed Nov. 28, 2014", 3 pgs.

"U.S. Appl. No. 13/035,761, Final Office Action mailed Feb. 23, 2015", 10 pgs.

"U.S. Appl. No. 13/035,761, Non Final Office Action mailed Aug. 26, 2014", 10 pgs.

"U.S. Appl. No. 13/035,761, Notice of Allowance mailed Apr. 29, 2015", 5 pgs.

"U.S. Appl. No. 13/035,761, Response filed Aug. 11, 2014 to Restriction Requirement mailed Jun. 12, 2014", 9 pgs.

"U.S. Appl. No. 13/035,761, Response filed Nov. 24, 2014 to Non Final Office Action mailed Aug. 26, 2014", 17 pgs.

"U.S. Appl. No. 13/035,761, Response filed Apr. 20, 2015 to Final Office Action mailed Feb. 23, 2015", 9 pgs.

"U.S. Appl. No. 13/035,761, Restriction Requirement mailed Jun. 12, 2014", 6 pgs.

"International Application Serial No. PCT/US2010/037105, International Preliminary Report on Patentability mailed Dec. 15, 2011", 5 pgs.

"International Application Serial No. PCT/US2010/037105, International Search Report mailed Dec. 22, 2010", 4 pgs.

"International Application Serial No. PCT/US2010/037105, Written Opinion mailed Dec. 22, 2010", 3 pgs.

HEAT PUMPS WITH UNEQUAL COOLING AND HEATING CAPACITIES FOR CLIMATES WHERE DEMAND FOR COOLING AND HEATING ARE UNEQUAL, AND METHOD OF ADAPTING AND DISTRIBUTING SUCH HEAT PUMPS

RELATED PATENT APPLICATIONS

This patent application is a divisional of U.S. patent application Ser. No. 13/035,761 filed on Feb. 25, 2011, titled: HEAT PUMPS WITH UNEQUAL COOLING AND HEATING CAPACITIES FOR CLIMATES WHERE DEMAND FOR COOLING AND HEATING ARE UNEQUAL, AND METHOD OF ADAPTING AND DISTRIBUTING SUCH HEAT PUMPS, which claims priority to U.S. patent application Ser. No. 12/844,709 filed on Jul. 27, 2010, titled: HVAC CONTROL USING DISCRETE-SPEED THERMOSTATS AND RUN TIMES, which claims priority to Patent Cooperation Treaty (PCT) patent application PCT/US2010/37105 filed on Jun. 2, 2010, also titled: HVAC CONTROL USING DISCRETE-SPEED THERMOSTATS AND RUN TIMES, which claims priority to U.S. Provisional Patent Application No. 61/183,442, filed on Jun. 2, 2009, titled DISCRETE SPEED THERMOSTATS CONTROLLING VARIABLE SPEED HVAC UNITS, METHODS, APPARATUS, AND HEAT PUMPS. All of these patent applications have the same inventors. Further, the contents of all of these listed patent applications are incorporated herein by reference.

FIELD OF THE INVENTION

This Invention relates to heating, ventilating, and air conditioning (HVAC) equipment, heat pumps, controls for such equipment, and methods of making, adapting, improving, replacing, controlling, and distributing such equipment, as well as HVAC units, systems, and buildings containing such systems. Particular embodiments concern controls for variable-speed HVAC equipment.

BACKGROUND OF THE INVENTION

Heating, ventilating, and air conditioning equipment has been used to heat, cool, and ventilate buildings and other enclosed spaces where people live and work. Air conditioning units and heat pumps have been used that have had single-speed motors driving the compressors. Such units operated at one speed and cycled on and off under the control of a thermostat to maintain space temperature, operating either at full speed, which was often noisy, or turned off.

In recent years, variable-speed drives have been used to drive compressors as well as indoor and outdoor fans. Examples include inverter-driven brushless DC compressors. Special thermostats have been used that have changed the speed of the compressor and fans to maintain the set point temperature rather than cycling on and off. Since these units usually operate considerably below maximum speed, and the heat exchanger sizes remain the same, energy consumption is reduced, resulting in greater overall efficiency.

Single-speed units have been replaced with variable-speed units, which has resulted in efficiency improvements as well as reductions in noise. In the past, however, such a unit replacement has necessitated the replacement of the thermostat, wiring between the unit and the thermostat, or both, which has resulted in a greater cost of replacement, especially in comparison with replacement with another single-speed unit that could reuse the old thermostat and thermostat wiring.

Two-speed or two-stage units (having two fixed non-zero speeds) have also been used which have had an additional wire from the thermostat to select between two non-zero compressor speeds, and often two non-zero fan speeds as well. Two-stage thermostats have typically called for stage one first, when the unit first turns on. In some configurations, the thermostat continued to call for stage one provided the measured temperature in the space moved towards the thermostat set point temperature. With such two-stage thermostats, however, if the measured temperature in the space moved away from the thermostat set point temperature, the thermostat called for stage two, increasing the capacity of the unit. In such configurations, the more-efficient and quieter stage one was used unless the cooling or heating demand became so large that the higher-capacity stage two was required in order to prevent the difference between the space temperature and the set point temperature from increasing.

In other two-stage configurations, however, the two-stage thermostat called for stage one if the measured temperature in the space was sufficiently close to the thermostat set point temperature, but called for stage two if the measured temperature in the space was sufficiently far away from the thermostat set point temperature. In such configurations, if the unit or system was left on and the set point temperature remained unchanged, the thermostat called for stage one first, and only increased to stage two if stage one was inadequate to keep the measured temperature in the space sufficiently close to the thermostat set point temperature. Again, in such configurations, in steady operation, the more-efficient and quieter stage one was used unless the cooling or heating demand became so large that the higher-capacity stage two was required in order to keep the temperature in the space sufficiently close to the set point temperature. When the operator first turned the unit on, however, or when the operator changed the set point temperature, the measured temperature in the space may have initially been sufficiently far away from the thermostat set point temperature so as to demand stage two capacity. Thus, this configuration typically resulted in more use of stage two, specifically, when the operator adjusted the thermostat. But the system or unit was typically more responsive to operator adjustments.

Three-speed units with an additional thermostat wire have also been used. Further, tandem multiple-capacity units have also been used with similar thermostats, which have had multiple single-speed compressors, for example. Such units have operated with one compressor running or with multiple (e.g., two) compressors in operation to provide different capacities. With two compressors, for instance, as many as three different capacities have been obtained where the two compressors were of different sizes or ran at different speeds. The indoor fan, outdoor fan, or both, have been operated at different speeds depending on which or how many compressors were in operation.

Two-speed or two-stage units and various other multi-capacity units have provided performance between that of single-speed units and variable-speed units, regarding efficiency and noise, but again, in order to replace a two-speed unit or another multi-capacity unit with a variable-speed unit, replacement of the thermostat and thermostat wiring was typically required. Further, when single-speed, two-speed, or other multiple-capacity units have been replaced with variable-speed units, for example, replacement of the indoor fan (i.e., blower), indoor fan motor, expansion valve, or a combination thereof, often needed to be replaced as well. In split systems, the complete indoor portion often needed to be replaced in order to convert to a variable-speed system, which often substantially increased cost.

Needs or potential for benefit exist for equipment and methods that allow single-speed and two-speed units (e.g., packaged units, spit system units, or just outdoor portions of split systems), as well as various multi-capacity units to be replaced with variable-speed units or units having more speeds than the preexisting system offered without requiring that the thermostat, thermostat wiring, indoor fan, indoor fan motor, or a combination thereof (e.g., among other things), be replaced as well. Further, needs or potential for benefit exist for equipment and methods that allow thermostats for discrete-speed (e.g., single-speed or two-speed) units to be used to control variable-speed HVAC units or units having more speeds without requiring that the thermostat, thermostat wiring, or both, be replaced.

In addition, in the past, discrete-speed units, and especially single-speed units, have often operated at a substantially higher capacity than necessary for the particular installation or the particular conditions present. This has resulted in a unit operating at a high speed for a short time rather than, more efficiently and less obtrusively, operating for a longer time at a lower speed. Consequently, needs or potential for benefit exist for equipment and methods that allow HVAC units to detect when it is appropriate to operate at a lower speed for a longer time and to automatically do so. Furthermore, since conditions under which HVAC units operate change over time, often in a fairly short time, needs or potential for benefit exist for equipment and methods that allow HVAC units to return to a higher speed when needed to maintain the set point temperature, and to automatically do so when appropriate.

Moreover, traditional discrete-speed heat pumps have been used for both cooling (e.g., in the summer) and heating (e.g., in the winter). Compressors have typically been operated at the same speed whether in the heating or the cooling mode, and heat pumps have typically had correspondingly similar capacity ratings whether in the cooling or heating mode. Even multiple-speed heat pumps and variable-speed heat pumps have traditionally operated at the same selection of (e.g., compressor motor) speeds, or over the same range of speeds, whether in the cooling or the heating mode.

In many climates, however, the demand for cooling or heating is substantially unequal, For example, in warm climates, there may be a much greater demand for cooling than for heating, and a heat pump that is selected to meet the demand cooling may be oversized in the heating mode. Such a unit may operate at a higher speed than needed in the heating mode, may cycle more frequently than desired, may be noisier than necessary, may be less efficient than optimal in the heating mode, or a combination thereof, as examples. On the other hand, in colder climates, there may be a much greater demand for heating than for cooling, and a heat pump that is selected to meet the demand heating may be oversized in the cooling mode. Such a unit may operate at a higher speed than needed in the cooling mode, may cycle more frequently than desired, may be noisier than necessary, may be less efficient than optimal in the cooling mode, or a combination thereof, as examples.

As an alternative, in colder climates, a heat pump can be sized to meet the cooling demand, and a supplemental heat source can be used when the heat pump is inadequate to meet demand in colder weather. Such a supplemental heat source may be, or include, electrical resistance heating, or a furnace, as examples. Electrical resistance heating, however, is not very efficient, and as a result, increases energy consumption. Further, adding a furnace substantially increases equipment cost.

As a result, needs or potential for benefit exist for equipment and methods of adapting and distributing heat pumps to provide improved efficiency performance, lower equipment cost, or both, in different climates where demand for cooling and heating are substantially unequal. In addition, needs or potential for benefit exist for heat pumps that are adapted to provide improved efficiency performance in different climates where demand for cooling and heating are substantially unequal.

Further, needs or potential for benefit or improvement exist for methods of manufacturing such heat pumps, HVAC equipment, and HVAC units, as well as systems and buildings having such devices. Other needs or potential for benefit or improvement may also be described herein or known in the HVAC or control industries. Room for improvement exists over the prior art in these and other areas that may be apparent to a person of ordinary skill in the art having studied this document.

References that may provide useful background information include WO 2008/097743 (Chen et al.; PCT/US2008/052110), and US 2008/0041081 (Tolbert; Ser. No. 11/464, 586).

SUMMARY OF PARTICULAR EMBODIMENTS OF THE INVENTION

Figure 1:
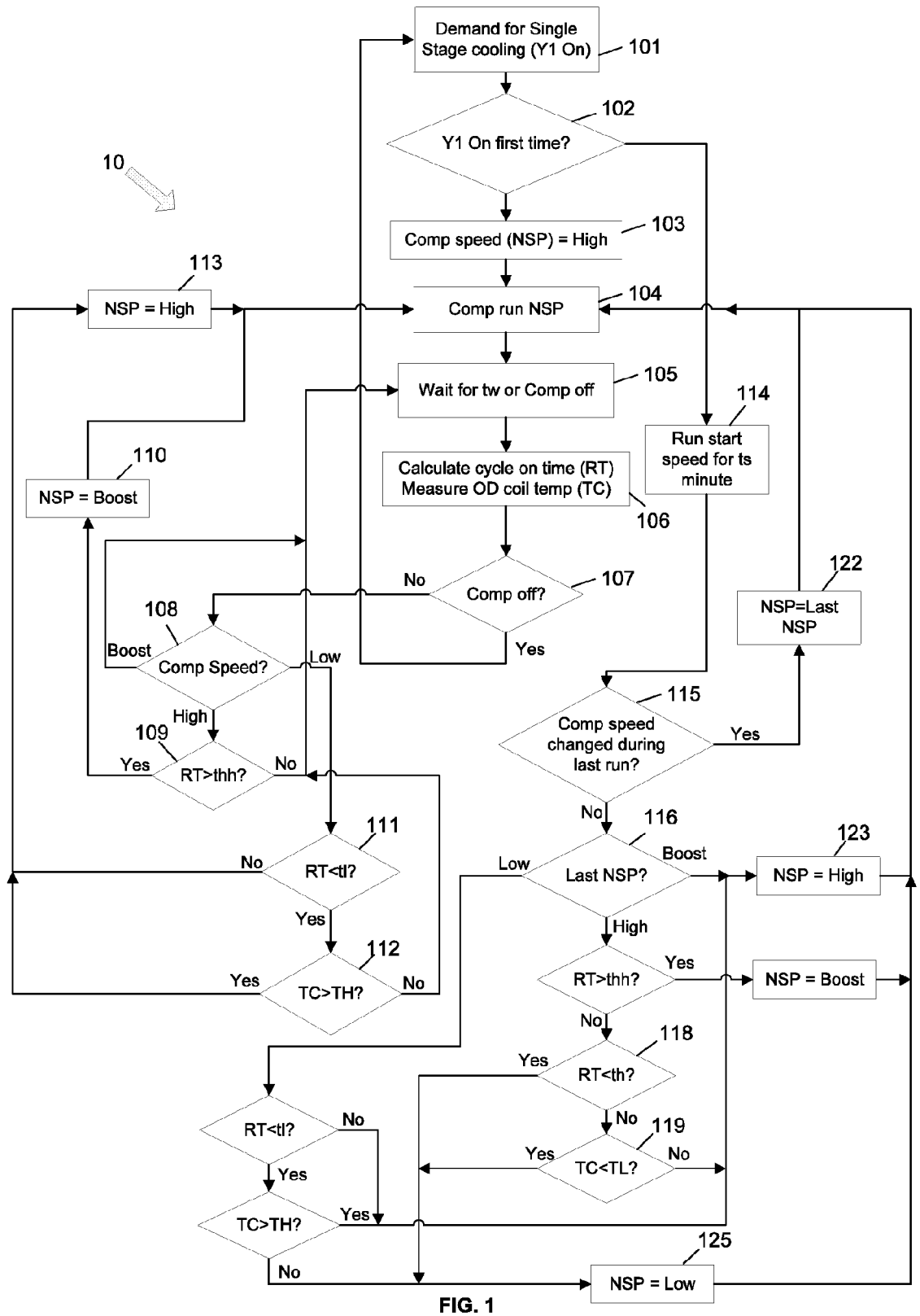
FIG. 1 is a flow chart illustrating an example of a method of controlling an air conditioning unit or a heat pump operating in a cooling mode using a single-stage thermostat, in which the unit selects between a low speed, a high speed, and a boost speed.

This invention provides, among other things, various heat pumps for providing improved efficiency performance in climates where demand for cooling and heating are substantially unequal, and methods of adapting and distributing heat pumps to provide improved efficiency performance in different climates where demand for cooling and heating are substantially unequal.

Various embodiments provide, for example, as an object or benefit, that they partially or fully address or satisfy one or more needs, potential areas for benefit, or opportunities for improvement described herein, or known in the art, as examples.

Certain embodiments provide, for example, heat pumps, and methods of adapting and distributing heat pumps, that provide improved efficiency performance in different climates where demand for cooling and heating are substantially unequal Further, certain embodiments may reduce the number of different heat pumps (e.g., hardware models) that are required to efficiently match the cooling and heating loads in different climates.

Specific embodiments of the invention include various heat pumps, for instance, for providing improved efficiency performance in climates where demand for cooling and heating are substantially unequal. Such a heat pump may include, for example, a compressor, a compressor motor mechanically connected to the compressor and driving the compressor, a variable-speed drive electrically connected to the compressor motor, powering the compressor motor, and changing speed of the compressor motor, and a controller in communication with the variable-speed drive.

In particular embodiments, the controller operates the compressor motor at multiple constant cooling speeds in a cooling mode and multiple constant heating speeds in a heating mode. In fact, in certain embodiments, the controller includes, for instance, a non-volatile memory storing at least one set of the constant cooling speeds and at least one set of the constant heating speeds. In some embodiments, at least one of the at least one set of constant cooling speeds or the at least one set of constant heating speeds includes, for instance, multiple sets of constant speeds stored in the memory. Further, in a number of embodiments, each set of constant speeds includes, for instance, a maximum speed and a minimum speed, and for at least one set of the multiple sets of constant speeds stored in the memory, the maximum speed in the cooling mode is substantially different than the maximum speed in the heating mode. Various embodiments further include at least one field input device allowing a person to select one selected set of constant speeds from the multiple sets of constant speeds. In a number of such embodiments, the controller then operates the compressor at the selected set of constant speeds in the cooling mode or in the heating mode.

In certain such embodiments, the field input device includes, for instance, multiple dipswitches that the person can switch to select the selected set of constant speeds from the multiple sets of constant speeds, multiple jumpers that the person can connect or disconnect to select the selected set of constant speeds from the multiple sets of constant speeds, or a combination of dip switches and jumpers. Further, in particular embodiments, the controller is configured to check a pass code entered by the person through the field input device and allow the person to change which set of constant speeds is selected only if the person inputs a correct pass code.

In some embodiments, the multiple sets of constant speeds stored in the memory each have the same minimum speed. In some embodiments, however, the multiple sets of constant cooling speeds stored in the memory each have a different maximum speed, the multiple sets of constant heating speeds stored in the memory each have a different maximum speed, or both. Moreover, in particular embodiments, for each of the multiple sets of constant speeds stored in the memory, the at least one intermediate speed includes, for instance, multiple intermediate speeds, and the intermediate speeds are substantially evenly spaced between the maximum speed and the minimum speed. Furthermore, in certain embodiments, for example, each of the multiple sets of constant speeds stored in the memory has an equal number of intermediate speeds.

In various specific embodiments, in a heat pump that includes, for example, a compressor, a compressor motor, a variable-speed drive and a controller, the controller may include, for example, instructions to operate the compressor motor at multiple different speeds in each of a cooling mode and a heating mode. Such embodiments may include at least one field input device arranged to allow a person to select at least one operating speed of the compressor motor in the cooling mode and arranged to allow the person to select at least one operating speed of the compressor motor in the heating mode. In a number of such embodiments, the controller and the field input device may be connected and configured so that the person can select a substantially different operating speed of the compressor motor in the cooling mode than the operating speed of the compressor motor in the heating mode such that the operating speed in the cooling mode is substantially different than the operating speed in the heating mode. Moreover, in a number of such embodiments, a lesser of the operating speed in the cooling mode and the operating speed in the heating mode provides a higher efficiency of the heat pump than a greater of the operating speed in the cooling mode and the operating speed in the heating mode.

In a number of embodiments, the at least one operating speed of the compressor motor in the cooling mode that the person can select includes, for instance, a maximum speed of the compressor motor in the cooling mode, and the at least one operating speed of the compressor motor in the heating mode that the person can select includes, for instance, a maximum speed of the compressor motor in the heating mode. Further, in various such embodiments, the instructions to operate the compressor motor at multiple different speeds in the cooling mode include, for example, instructions to operate the compressor at the maximum speed of the compressor motor in the cooling mode and instructions to operate the compressor at a minimum speed of the compressor motor in the cooling mode. Even further, in some embodiments, the instructions to operate the compressor motor at multiple different speeds in the heating mode include, for example, instructions to operate the compressor at the maximum speed of the compressor motor in the heating mode and instructions to operate the compressor at a minimum speed of the compressor motor in the heating mode.

Furthermore, in some embodiments, the minimum speed of the compressor motor in the cooling mode does not change when the maximum speed of the compressor motor in the cooling mode is changed by the person selecting another of the multiple different speeds, the minimum speed of the compressor motor in the heating mode does not change when the maximum speed of the compressor motor in the heating mode is changed by the person selecting another of the multiple different speeds, or both.

Moreover, in certain embodiments, the instructions to operate the compressor motor at multiple different speeds in the cooling mode include, for example, instructions to operate the compressor at multiple intermediate speeds of the compressor motor in the cooling mode, the instructions to operate the compressor motor at multiple different speeds in the heating mode include, for example, instructions to operate the compressor at multiple intermediate speeds of the compressor motor in the heating mode, or both. In various such embodiments, the intermediate speeds of the compressor motor in the cooling mode are substantially evenly spaced between the maximum speed of the compressor motor in the cooling mode and the minimum speed of the compressor motor in the cooling mode, the intermediate speeds of the compressor motor in the heating mode are substantially evenly spaced between the maximum speed of the compressor motor in the heating mode and the minimum speed of the compressor motor in the heating mode, or a combination thereof, as examples.

Various embodiments may further include, for example, an outdoor fan and an outdoor fan motor mechanically connected to the outdoor fan to drive the outdoor fan. In a number of such embodiments, the controller may be configured to operate the outdoor fan motor of the heat pump, for instance. In particular embodiments, the controller may be configured to operate the outdoor fan motor, for example, at different speeds for different compressor speeds, at a speed that is substantially proportional to a concurrent compressor speed, or both, for instance.

In still other specific embodiments, the invention provides various methods, for example, of adapting and distributing heat pumps, for instance, to provide improved efficiency performance in different climates where demand for cooling and heating are substantially unequal. Such a method may include, for example, at least certain acts, which may be performed in the order indicated here or in another order. Such acts may include, for example, an act of obtaining or manufacturing an inventory of heat pumps having, at least, substantially identical compressors, compressor motors, variable-speed drives for the compressor motors, outdoor heat exchangers, outdoor fans, and outdoor fan motors. Another act that may be included in such methods is an act of obtaining or providing controllers for each of the heat pumps.

Each controller may include, for example, instructions to operate the compressor motor at multiple different speeds in each of a cooling mode and a heating mode. Other acts that may be included in some methods include acts of dividing the inventory of heat pumps in to multiple groups of multiple heat pumps and assigning different ratings to each group of heat pumps. These different ratings may differ in capacity in at least one of the cooling mode or the heating mode, and for at least one of the groups, a rating in the cooling mode is substantially different than a rating in the heating mode. Another act that such methods may include is an act of configuring the controllers of each group of heat pumps to operate the compressor motors of the heat pumps in that group at selected speeds that provide performance that corresponds to the rating of the group. In various such embodiments, for at least one of the groups, a selected speed of the compressor motor in the cooling mode is substantially different than any selected speed of the compressor motor in the heating mode, and a higher efficiency of the heat pumps in the cooling mode or in the heating mode is achieved by at least one of the groups in comparison with at least one other of the groups.

Particular methods may include, for example, acts of advertising the different ratings of each group of heat pumps, the advertising including advertising the higher efficiency. Moreover, various methods may include, for example, selling the heat pumps in the different groups for use in different applications having different unequal demands for cooling and heating. Further, in some embodiments, the act of obtaining or manufacturing an inventory of heat pumps includes, for instance, obtaining or manufacturing heat pumps that include, for example, variable-speed drives for the outdoor fan motors, and the controllers in such embodiments may be configured to operate the outdoor fan motors of the heat pumps at different speeds for different compressor speeds.

Further, in some embodiments, the act of obtaining or providing controllers for each of the heat pumps may include, for instance, obtaining or providing substantially identical controllers for each of the heat pumps, the act of dividing the inventory of heat pumps in to multiple groups of multiple heat pumps occurs after the act of obtaining or providing controllers for each of the heat pumps, the act of configuring the controllers occurs after the act of dividing the inventory of heat pumps in to multiple groups of multiple heat pumps, or a combination thereof. Moreover, in particular embodiments, the act of configuring the controllers is performed for each heat pump before the heat pump is shipped to an installation site.

Furthermore, in some methods, the act of obtaining or providing substantially identical controllers for each of the heat pumps includes, for instance, obtaining or providing controllers that are each configured to operate the compressor motor at a first number of different selected speeds in the cooling mode and a second number of different selected speeds in the heating mode. In certain embodiments, the first number and the second number are both whole numbers, and the act of configuring the controllers of each group of heat pumps includes, for instance, lowering multiple of the first number of different selected speeds in the cooling mode, the act of configuring the controllers of each group of heat pumps includes, for instance, lowering multiple of the second number of different selected speeds in the heating mode, or a combination thereof.

In certain embodiments, the act of configuring the controllers of each group of heat pumps includes, for instance, lowering at least one selected speed in the cooling mode proportionally to a reduction of rated capacity in the cooling mode, the act of configuring the controllers of each group of heat pumps includes, for instance, lowering at least one selected speed in the heating mode proportionally to a reduction of rated capacity in the heating mode, or a combination thereof, as examples. Moreover, particular embodiments, may further include, for example, an act of obtaining or providing at least one field input device arranged to allow a person to select at least one of an operating speed of the compressor motor in the cooling mode, or an operating speed of the compressor motor in the heating mode. In certain methods, the act of obtaining or providing at least one field input device includes, for instance, obtaining or providing multiple dipswitches or multiple jumper wires electrically connected to the controller so that the person can select at least one of the operating speed of the compressor motor in the cooling mode or the operating speed of the compressor motor in the heating mode by changing the dipswitches or the jumper wires.

In addition, various other embodiments of the invention are also described herein, and other benefits of certain embodiments may be apparent to a person of ordinary skill in the art.

Detailed Description of Examples of Embodiments

The subject matter described herein includes, as examples, various apparatuses for cooling a space, HVAC units, heat pumps, HVAC equipment, HVAC controllers, and the like. As used herein, the term "HVAC unit" includes air conditioning units and heat pumps, which may be packaged units or split systems, for example. Further, as used herein, the term "HVAC unit" includes outdoor portions of split systems (e.g., absent the indoor portion, thermostat, or both). Similarly, as used herein, the term "heat pump" includes outdoor portions of split system heat pumps (e.g., absent the indoor portion, thermostat, or both). Moreover, other embodiments include various buildings containing such devices, companies performing one or more of the methods described herein, computer-readable storage media, computers programmed to perform at least one method described herein, and computer software, as examples. Methods described herein include methods of improving HVAC units, methods of replacing HVAC equipment (e.g., which may provide better performance, efficiency, or both); methods of controlling HVAC units (e.g., air conditioning units), methods of providing HVAC equipment described herein, and methods of adapting and distributing HVAC equipment (e.g., heat pumps), for instance, for use in different climates.

In a number of embodiments, a thermostat for (i.e., designed for) a discrete-speed (e.g., one, two, or three speed) unit is used to control a variable-speed unit, for example, which may provide an increased number of available speeds, may improve efficiency, or both, as examples. In a number of embodiments, use of a thermostat for a discrete-speed unit, use of existing wiring for such a thermostat, use of an existing indoor portion of a split-system, use of an existing indoor fan, use of an existing indoor fan motor, or a combination thereof, may reduce installation cost, particularly where a discrete-speed unit is being replaced with a variable-speed unit, for example.

In various embodiments, a controller measures how much time passes between changes in thermostat signals or how long a unit operates (e.g., before shutting off), and these measurements are used (e.g., by the controller) to determine the speed at which to operate the compressor, for example. Additionally, in certain embodiments, an outdoor temperature, such as an outdoor coil or heat exchanger temperature, may be used to select between available speeds, for instance. In other embodiments, however, temperature may not be measured or used to determine speed, and the control algorithm may work satisfactorily without measuring or using an outdoor temperature. Further, in some embodiments, heat pumps are configured to operate at reduced speeds in either a cooling or a heating mode in order to provide improved efficiency performance, for example, in climates where demand for cooling and heating are substantially unequal.

In particular embodiments, various apparatuses for cooling a space (e.g., within a building) may include, for example, a compressor, a variable-speed compressor motor for driving the compressor (e.g., in driving relation to the compressor), a variable-speed drive for powering the compressor motor (e.g., a variable-frequency drive or a variable-voltage DC power supply), and a controller for controlling the variable-speed drive and thereby controlling speed of the compressor motor, as examples. Many such embodiments may include, in addition, other components of such an apparatus as well. Variable-speed drives, motors, and systems may provide continuously-variable speeds, for example, over a range of speeds. In some embodiments, however, particular speeds across the range may be selected, which may be spaced apart, for example, and may avoid points of resonance, for instance. In some embodiments, the range may be divided into about 20 particular speeds, for instance, which may be fairly evenly spaced, and the motor may be ramped (i.e., gradually, but continuously changed, for instance, at a constant rate of change of speed) between these particular speeds and held at the particular speeds. In a number of embodiments, for a particular application, a subset of these particular speeds may be used or selected and made available for use under appropriate demand conditions.

In some embodiments, the controller may be configured (e.g., via programming or software) to operate the variable-speed drive at multiple non-zero compressor speeds using an on-off thermostat signal from a thermostat configured to control a single-speed HVAC unit by providing an on-off thermostat signal, for example. As used herein, if a device is "configured" to perform a certain task or function, the term "configured" means that the device has been adapted specifically to perform that particular task or function, not merely that the device could be used for that particular task or function if doing so had been contemplated. As used herein, a controller is "configured" to perform a particular task or function if the controller has been programmed with instructions that will, if executed, perform that specific task or function. A controller simply being made to control similar equipment and being capable of being programmed to perform the particular task or function is not enough, absent the software instructions to do so or other specific adaptation to accomplish the particular task or function recited.

Further, in a number of embodiments, the controller may be configured to measure time between changes in the on-off thermostat signal, for instance, and select the compressor speed based on the time between changes in the on-off thermostat signal, for example. In some embodiments, the controller may be configured, for example, to operate the variable-speed drive at two non-zero compressor speeds. As used herein, a controller is configured to perform a task or act if the controller is configured to output a signal that instructs another piece of equipment to perform that task or act. Further, in certain embodiments, the controller may be configured, for another example, to operate the variable-speed drive at more than two non-zero compressor speeds using at least two on-off thermostat signals from a thermostat configured to control a two-speed HVAC unit by providing two on-off thermostat signals, as another example. In particular embodiments, the controller may be configured, for instance, to operate the variable-speed drive at three non-zero compressor speeds, at four non-zero compressor speeds, at five non-zero compressor speeds, at six non-zero compressor speeds, at seven non-zero compressor speeds, or at more than seven non-zero compressor speeds, as examples.

In some embodiments, the controller may be configured, for example, to select the compressor speed utilizing a time between a thermostat on signal and a thermostat off signal, utilizing a time between a thermostat on signal and a present time, or both, as examples. For instance, in some embodiments, the controller may be configured to select a lower compressor speed if a time that the compressor has run was below a minimum time threshold. For example, if during one cycle (e.g., on-signal from the thermostat), the compressor runs less than the minimum time before the thermostat calls for the unit to shut off, then the controller may select a lower compressor speed the next time the thermostat calls for the unit to turn on. In different embodiments, such a minimum time may be, for example, about 10 minutes, about 12 minutes, about 14 minutes, about 17 minutes, about 20 minutes, about 24 minutes, about 29 minutes, about 35 minutes, about 42 minutes, about 51 minutes, or about 62 minutes, as examples. As used herein, unless indicated otherwise, "about" means plus or minus 10 percent.

Further, in some embodiments, the controller may be configured, for another example, to select a higher compressor speed if a time that the compressor has run exceeds a maximum time threshold. For example, if during operation at one steady non-zero speed, the compressor runs more than the maximum time before the thermostat calls for the unit to shut off, then the controller may change the compressor speed (e.g., during that same on-signal from the thermostat) to a higher compressor speed. In some embodiments, the compressor may maintain that higher speed the next time the thermostat calls for the unit to turn on, for example. In different embodiments, such a maximum time may be, for example, about 21 minutes, about 25 minutes, about 30 minutes, about 35 minutes, about 40 minutes, about 45 minutes, about 50 minutes, about 55 minutes, about 60 minutes, about 70 minutes, or about 85 minutes, as examples.

In particular embodiments, the controller may be configured to select the compressor speed utilizing a time between a thermostat off signal and a thermostat on signal. For example, in some embodiments, if the time between the last thermostat off signal and the current thermostat on signal exceeds a longer off-period threshold, then the controller may select a lower speed (e.g., because less capacity may be needed to maintain the set point temperature). On the other hand, if the time between the last thermostat off signal and the current thermostat on signal is less than a shorter off-period threshold, then the controller may select a higher speed (e.g., because more capacity may be needed to maintain the set point temperature or because a user may have changed the thermostat set point temperature and may want or expect a rapid corresponding change in temperature of the occupied space). In different embodiments, such a longer off-period threshold may be, for instance, about 40 minutes, about 45 minutes, about 50 minutes, about 60 minutes, about 70 minutes, about 80 minutes, about 90 minutes, about 100 minutes, about 120 minutes, or about 140 minutes, as examples. In various embodiments, a shorter off-period threshold may be, for instance, about 5 minutes, about 6 minutes, about 8 minutes, about 10 minutes, about 12 minutes, about 15 minutes, about 18 minutes, about 21 minutes, about 25 minutes, or about 30 minutes, as examples.

In various embodiments, a temperature sensor may be included or provided which may be positioned and configured to measure an outdoor temperature, for instance. In some embodiments, the controller may be configured, for example, to select the compressor speed based (e.g., among other things) on, or using, the outdoor temperature. In particular embodiments, the temperature sensor may be positioned and configured to measure an outdoor heat exchanger temperature, for example, and the controller may be configured to select the compressor speed based on the outdoor heat exchanger temperature. Specifically, in some embodiments, the controller may be configured, for example, so that when the HVAC unit is operating in a cooling mode, the controller will select a higher compressor speed if the outdoor heat exchanger temperature exceeds a first (e.g., preset) temperature threshold. In various embodiments, the first threshold temperature may be approximately 80 degrees, approximately 89 degrees, approximately 92 degrees, or approximately 95 degrees F. (i.e., Fahrenheit), as examples. As used herein, "approximately", when referring to temperature, means within plus or minus 5 degrees F.

Further, in some embodiments, the controller may be configured, for example, so that when the HVAC unit is operating in a heating mode, the controller will select a higher compressor speed if the outdoor heat exchanger temperature is below a second preset temperature threshold. In different embodiments, the second threshold temperature may be approximately 30 degrees, approximately 34 degrees, approximately 37 degrees, approximately 40 degrees approximately 50 degrees, or approximately 60 degrees (F.), as examples.

In some embodiments, the apparatus may be an outdoor portion of a split system HVAC system, while in other embodiments, the apparatus may be a packaged HVAC unit or may include both indoor and outdoor portions of a split HVAC system. In a number of embodiments, the apparatus includes, for example, an outdoor heat exchanger (e.g., which acts as a condenser when operating in a cooling mode and may act as an evaporator when operating in a heating mode), an outdoor fan positioned and configured to move outdoor air through the outdoor heat exchanger, an outdoor fan motor, an outdoor portion housing, or a combination thereof, for example. In some embodiments, the outdoor fan motor is a multiple-speed motor and in particular embodiments, the controller may be configured, for instance, to operate the outdoor fan motor at multiple non-zero outdoor fan speeds. In certain embodiments, for example, the apparatus may include a variable-speed drive for the outdoor fan motor, and the controller may be configured, for instance, to operate the outdoor fan motor at multiple non-zero outdoor fan speeds. In some embodiments, for example, there may be a different outdoor fan speed corresponding to each available compressor speed.

In some embodiments (e.g., packaged units or split systems with both indoor and outdoor portions), the apparatus further includes, for example, an indoor air heat exchanger (e.g., which acts as an evaporator when operating in a cooling mode and may act as a condenser when operating in a heating mode), an indoor air fan positioned and configured to move indoor air through the indoor air heat exchanger, an indoor air fan motor, or a combination thereof, for instance. In some embodiments, the indoor air fan motor may be a multiple-speed motor and the controller may be configured, for example, to operate the indoor air fan motor at multiple speeds. In particular embodiments, the apparatus may include, for example, a variable-speed drive for the indoor air fan motor, and the controller may be configured, for instance, to operate the indoor air fan motor at multiple speeds. In some embodiments, for example, there may be a different indoor fan speed corresponding to each available compressor speed.

In a range of embodiments, the controller may include various hardware components such as one or more circuit boards, microprocessors, memory, logic controllers, user interface devices, displays, and the like. In particular embodiments, the controller may include, for example, an inverter board, a relay board or interface board electrically connected between the inverter board and the thermostat (e.g., for a single-speed or two-speed unit), or both, for example.

In an example of an embodiment, the inverter board input and output to the relay (interface) board, for single stage and two-stage thermostat applications are as follows:

| | Terminals | |
|---|---|---|
| Pin 1 | Y1 | Cool single stage input |
| Pin 2 | Y2 | Cool two stage input |
| Pin 3 | W2 | Heat output |
| Pin 4 | O | Heat/Cool input |
| Pin 5 | Spare 1 | Spare output |
| Pin 6 | Spare 2 | Spare output |
| Pin 7 | L | Fault code output |
| Pin 8 | Spare | Spare input |
| Pin 9 | Spare | Spare Output |
| Pin 10 | GND | Board ground |

Control outputs may be able to source and sink 5 mA minimum and may be 5 VDC logic. In this embodiment, the Y1 Input is active logic, level high (5 VDC). This is a control input for the single stage cooling mode in this embodiment. Further, the Y2 Input is active logic, in this embodiment, level high (5 VDC), and is a control input for the second stage cooling mode. Y1 input, in this embodiment, will also be logic level high at this time. Moreover, W2 Output is active logic, level high (5 VDC). This output is active logic level high when the control has determined there is a defrost cycle active, in this embodiment. Furthermore, O Input is active logic, level high (5 VDC). This is a control input for the reversing valve operation in this embodiment. When this input is active logic level high, the reversing valve is energized. This input is active logic level high for cooling mode.

Further, Spare 1 output is active logic, level high (5 VDC). This output is a spare control output that is not defined (yet) in this embodiment. In addition, Spare 2 output is active logic, level high (5 VDC). This output is a spare control output that is not defined yet in this embodiment. Even further, L Output is normally high. This output is used to inform an external interface board of faults that have occurred. This output will output low pulses in this embodiment. The pulse width will be 1 mSec with a 1 mSec high time and a minimum of 200 mSec high time between fault codes in this embodiment.

In some embodiments, the interface board may be configured, for example, to read 24 V AC signals from the thermostat, to communicate with the inverter board using 5 V signals, or both, for instance. In certain embodiments, the interface board may be configured, for example, to communicate with the inverter board through a communications bus, through an RS-232 line, or through an RS-485 line, as examples. In some embodiments, the relay or interface board may have a display, may be used to perform diagnostic functions, or both, as examples.

Various embodiments of the subject matter described herein are HVAC units, HVAC systems, or buildings comprising an apparatus, HVAC unit, or HVAC system as described herein. Buildings may include one or more floor, walls, and ceiling, which may fully or partially enclose a space that may be cooled or heated by an apparatus, HVAC unit, or HVAC system as examples. In some embodiments, a building may substantially enclose a space, for example. As used herein, "substantially" enclosing a space means blocking at least 90 percent of the surface area surrounding the space. In a situation where HVAC equipment, for example, is being replaced, wiring for a preexisting thermostat may run through the floor, walls, or between the ceiling and a roof, as examples. Access to such wiring may be limited or difficult and replacement of the wiring with a different type of wiring may be difficult, expensive, or both, in many situations.

A number of embodiments include heat pumps that are adapted for providing improved efficiency performance in different climates where demand for cooling and heating are substantially unequal. As used herein, "unequal" means unequal by at least 5 percent, and "substantially unequal" means unequal by at least 15 percent. In various such embodiments, such a heat pump may be an outdoor portion of a split system HVAC system, may include an indoor portion of a split system HVAC system, or may be a packaged HVAC unit, as examples. In different embodiments, these heat pumps may include some or all of the features or functionality described above, or may lack such features or functionality. For example, in some embodiments, such a heat pump may include, for instance, a compressor, a compressor motor (e.g., mechanically connected to the compressor to drive the compressor), and a variable-speed drive (e.g., electrically connected to the compressor motor to power the compressor motor and change speed of the compressor motor). Such a heat pump may also include a controller (e.g., in communication with or in control of the variable-speed drive), which may include instructions (e.g., programming or software) to operate the compressor motor at multiple different speeds in each of a cooling mode and a heating mode. As used herein, if speeds are indicated to be "different" (i.e., with no modifier before "different") then the speeds are at least five percent different. Moreover, as used herein, if speeds are indicated to be "substantially different" then the speeds are at least 15 percent different.

Certain embodiments may reduce the number of different heat pumps (e.g., hardware models) that are required to efficiently match the cooling and heating loads in different climates. For example, a heat pump that has a maximum capacity of three tons may be configured to provide a maximum of three tons in a cooling mode, but may be configured to provide a maximum of 3, 2.5, 2, 1.5, or 1 tons of capacity in a heating mode, depending on the climate that the heat pump is designed for. Similarly, the same heat pump that has a maximum capacity of three tons may be configured to provide a maximum of three tons in a heating mode, but may be configured to provide a maximum of 3, 2.5, 2, 1.5, or 1 tons of capacity in a cooling mode.

These embodiments may also include at least one user input device which may be arranged to allow a person to select at least one operating speed of the compressor motor in the cooling mode and arranged to allow the person to select at least one operating speed of the compressor motor in the heating mode. The user input device may be, or include, for example, one or more dials, knobs, buttons, keyboards, keypads, jumpers or dip switches, or the like, as examples, and may include a display, in some embodiments. In various embodiments, the controller and the user input device may be connected (e.g., via a cable) and configured so that the person can select a substantially different operating speed of the compressor motor in the cooling mode than the operating speed of the compressor motor in the heating mode, for instance, such that all selected speeds of the compressor motor in the cooling mode or all selected speeds of the compressor motor in the heating mode are substantially below a maximum capable compressor motor speed for the heat pump. As used herein, at least when referring to speed, "below" means at least five percent below, and "substantially below" means at least 15 percent below. The selected speeds are speeds that are actually used (i.e., in a steady state condition or other than ramping through). The maximum capable compressor motor speed is the greatest speed that can be selected, for example, the rated speed of the motor, drive, or other limiting component.

In a number of embodiments, multiple (e.g., some, all except for one, all except for the lowest speed, or all) selected speeds of the compressor motor in the cooling mode or multiple (e.g., some, all except for one, all except for the lowest speed, or all) selected speeds of the compressor motor in the heating mode (or both) are reduced proportionally from the maximum capable compressor motor speed for the heat pump. In some embodiments, the lowest speed may remain unchanged, and the other speeds may be reduced proportionally from the maximum capable compressor motor speed for the heat pump, for instance. As used herein, "proportionally", when referring to speeds, means proportional to within five percent. Moreover, as used herein, "substantially proportionally", when referring to speeds, means proportional within 15 percent. Further, in some embodiments, at least one selected speed of the compressor motor may be substantially below a maximum capable compressor motor speed for the heat pump. Even further, in particular embodiments, at least one selected speed of the compressor motor (e.g., that is substantially below a maximum capable compressor motor speed for the heat pump) may provide a higher efficiency of the heat pump than the maximum capable compressor motor speed.

In some embodiments, the heat pump may be configured for the input device to be used to select at least one operating speed of the compressor motor in the cooling mode and in the heating mode before the heat pump is shipped to the installation site, before the heat pump is installed, or specifically, in some embodiments, in a factory where the heat pump is assembled, as examples. In other embodiments, the heat pump may be configured for the input device to be used to select at least one operating speed of the compressor motor in the cooling mode and in the heating mode when the heat pump is installed (e.g., by the installer). Moreover, in particular embodiments, the building owner or his representative may use the input device to set one or more speed, for example, at the preference of the owner or occupant of the building.

In some embodiments, the controller may be configured, for example, to operate the compressor motor at a first number of different selected speeds in the cooling mode and a second number of different selected speeds in the heating mode. In some embodiments, the first number and the second number are both whole numbers. In a number of embodiments, the controller may be configured, for example, to proportionally lower multiple (e.g., some, all except for one, all except for the lowest speed, or all) of the first number of different selected speeds in the cooling mode (e.g., for climates where more heating capacity is needed than cooling capacity). On the other hand, in some embodiments, the controller may be configured, for example, to proportionally lower multiple (e.g., some, all except for one, all except for the lowest speed, or all) of the second number of different selected speeds in the heating mode (e.g., for climates where more cooling capacity is needed than heating capacity). In many embodiments, the controller may be configured to operate the heat pump in either of these ways, depending on what is appropriate for the climate where the heat pump is to be used.

In various embodiments, the heat pump may be operated at the same number of speeds in the cooling mode as in the heating mode (e.g., the first number is equal to the second number), but these speeds may differ or substantially differ depending on whether the heat pump is operating in the cooling mode or the heating mode. On the other hand, in some embodiments, the heat pump may operate at a greater number of speeds in the cooling mode than in the heating mode (e.g., the first number may be greater than the second number), or the heat pump may operate at a greater number of speeds in the heating mode than in the cooling mode (e.g., the second number may be greater than the first number). In various embodiments, the first number is greater than two, the first number is less than ten, the second number is greater than two, the second number is less than ten, or a combination thereof, as examples. In certain embodiments, the first number, the second number, or both, may be, for example, 3, 4, 5, 6, 7, 8, or 9.

In a number of embodiments, the controller may be configured to lower multiple (e.g., some, all except for one, all except for the lowest speed, or all) selected speeds in the cooling mode proportionally to a reduction of rated capacity in the cooling mode, may be configured to lower multiple (e.g., some, all except for one, all except for the lowest speed, or all) selected speeds in the heating mode proportionally to a reduction of rated capacity in the heating mode, or both, as examples. Further, in some embodiments, the controller may be configured to operate the outdoor fan motor of the heat pump at different speeds for different compressor speeds, or specifically to operate the outdoor fan motor of the heat pump at a speed that is proportional to a concurrent compressor speed. Similarly, in some embodiments, the controller may be configured to operate the indoor fan motor of the heat pump at different speeds for different compressor speeds, or specifically, to operate the indoor fan motor of the heat pump at a speed that is proportional to a concurrent compressor speed.

In addition to apparatuses, such as HVAC equipment, HVAC units, heat pumps, HVAC systems, HVAC controllers, and buildings, various embodiments of the subject matter are or include various methods, which include (e.g., in any order except where order is apparent or is indicated) at least certain acts. For example, a number of embodiments are or include various methods of improving an HVAC unit. Such methods may include, for instance, acts of replacing at least a compressor motor or at least a compressor and a compressor motor in an outdoor portion of a split-system HVAC unit. In some embodiments, additional components, up to and including the complete outdoor portion of the unit may be replaced. A number of embodiments may include, for example, providing at least a new compressor, a new compressor motor, a new variable-speed drive for the compressor motor, and a new controller. Some embodiments may further include connecting refrigerant lines between the new compressor of the split-system HVAC unit and a preexisting indoor portion of the split-system HVAC unit, which may include, for instance, a preexisting indoor heat exchanger, a preexisting indoor fan positioned and configured to move indoor air through the indoor heat exchanger, a preexisting indoor fan motor, and a preexisting indoor portion housing, as examples.

In a number of cases, the preexisting indoor fan motor may be a discrete-speed motor having a first number of discrete non-zero operating speeds. For instance, the first number may be no more than two. In other words, the preexisting indoor fan motor may be a single-speed motor or a two-speed motor, in many instances. In other embodiments, the preexisting indoor fan motor may be a three-speed motor, as another example.

The preexisting HVAC unit may further include, for example, a preexisting thermostat configured to control the preexisting discrete-speed HVAC unit, for instance, by providing an on-off thermostat signal for each discrete speed. Various embodiments of methods, which are described herein, include acts of reusing preexisting electrical wiring to the preexisting thermostat, connecting the preexisting electrical wiring to the new controller, or both, as examples. Further, various methods may include operating the HVAC unit at a second number of non-zero compressor speeds using the on-off thermostat signal from a thermostat configured to control a discrete-speed HVAC unit by providing an on-off thermostat signal for each discrete speed. In different embodiments, this thermostat may be the preexisting thermostat, for example, or may be a different (e.g., new) thermostat configured to control similar units. In some embodiments, the second number may be at least one more than the first number, thus increasing the number of speeds that the unit can operate at. Further, a number of methods may include measuring time between changes in the on-off thermostat signal, selecting the compressor speed based (e.g., among other things) on the time between changes in the on-off thermostat signal, or both.

Some methods may include replacing an outdoor portion of a split-system HVAC unit, for instance, which may include, as might be expected, providing a new outdoor portion of the split-system HVAC unit. Such an outdoor portion may include, for example, (e.g., in addition to some or all of the new components mentioned above), a new outdoor heat exchanger, a new outdoor fan positioned and configured to move outdoor air through the outdoor heat exchanger, a new outdoor fan motor, a new outdoor portion housing, or a combination thereof, as examples.

In some embodiments, the preexisting indoor fan motor may be a single-speed motor, for example, having one discrete non-zero operating speed, and the thermostat may be configured, for example, to control the preexisting HVAC unit by providing an on-off thermostat signal for turning the HVAC unit on or off. In particular embodiments, the method includes operating the HVAC unit at more than one non-zero compressor speed using the on-off thermostat signal from the thermostat and, in a number of embodiments, selecting the compressor speed based on the time between changes in the on-off thermostat signal. On the other hand, in some embodiments, the preexisting indoor fan motor is a two-speed motor having two discrete non-zero operating speeds, and the thermostat may be configured, for example, to control the preexisting discrete-speed HVAC unit by providing two distinct on-off thermostat signals for turning the HVAC unit on or off and for selecting between a high and a low speed, for instance. In certain embodiments, the method may include operating the HVAC unit at more than two non-zero compressor speeds using the on-off thermostat signals from the two-speed or two-stage thermostat and selecting the compressor speed based on (in some embodiments, among other things) the on-off thermostat signals and the time between changes in the on-off thermostat signal.

In some embodiments, the act of selecting the compressor speed based on the time between changes in the on-off thermostat signal may include, for example, selecting a lower compressor speed if a time that the compressor has run is below a minimum time threshold, selecting a higher compressor speed if a time that the compressor has run exceeds a maximum time threshold, or both, as examples. Further, in some embodiments, the act of operating the HVAC unit at the second number of non-zero compressor speeds may include operating the outdoor fan motor at multiple non-zero outdoor fan speeds (e.g., two, three, four, five, or more different speeds).

Various methods may further include, for example, acts of measuring an outdoor temperature and selecting the compressor speed based on (e.g., among other things) the outdoor temperature. In some embodiments, the outdoor temperature may be a heat exchanger temperature, for example. For instance, in a number of embodiments, when the HVAC unit is operating in a cooling mode, the act of selecting the compressor speed based on the outdoor temperature may include selecting a higher compressor speed if the outdoor temperature exceeds a first preset temperature threshold. In addition, or instead, in some embodiments, when the HVAC unit is operating in a heating mode, the act of selecting the compressor speed based on the outdoor temperature may include selecting a higher compressor speed if the outdoor temperature is below a second preset temperature threshold. In embodiments where the outdoor temperature is a coil temperature, a certain amount of time may be allowed to pass after the compressor starts before the temperature is measured or considered, in order to allow steady state conditions to be reached. This certain amount of time may be, for example, about five minutes, about six minutes, about seven minutes, about eight minutes, about nine minutes, about ten minutes, about eleven minutes, about twelve minutes, about thirteen minutes, or about fifteen minutes, as examples. In other embodiments, temperature readings may be disregarded unless changes between successive readings fall below a threshold. Further, in other embodiments, refrigerant pressure (e.g., at the outdoor heat exchanger), refrigerant temperature (e.g., after the outdoor heat exchanger, or both, may be measured instead of (or in addition to) air or coil temperature, as other examples.

Another example of a method of improving an HVAC unit includes, for example, providing new HVAC hardware for a split-system HVAC system, the new HVAC hardware including, for example, at least a new compressor, a new compressor motor, a new variable-speed drive for the compressor motor, and a new controller. In this embodiment, the new controller may be configured to operate the new variable-speed drive at a second number of non-zero compressor speeds using at least one on-off thermostat signal from a thermostat configured to control a discrete-speed HVAC unit by providing the on-off thermostat signal for each discrete speed, measure time between changes in the on-off thermostat signal, and select the compressor speed based on the time between changes in the on-off thermostat signal, as examples. Further, this embodiment may include instructing an installer to connect the new HVAC hardware to a preexisting indoor portion of the split-system HVAC system.

The preexisting indoor portion may include, for example, a preexisting indoor fan motor that is a discrete-speed motor having a first number of discrete non-zero operating speeds. In some embodiments, the first number is no more than two, and in some embodiments, the second number is greater than the first number, as examples. In a number of embodiments, such a method may further include acts of instructing the installer that they may use a preexisting thermostat configured to control the preexisting discrete-speed HVAC unit, instructing the installer that they may reuse preexisting electrical wiring to the preexisting thermostat, instructing the installer that they may connect the preexisting electrical wiring to the new controller, or a combination thereof, as examples.

Such instructions (or other instructions for an installer, purchaser, or owner) may be provided, for example, on product packaging, in an installation manual or written installation instructions, through stickers placed on the product, on an Internet website, through an instructional video, through training courses, or the like, as examples, Such instructions may include text, which may be in one or more languages, drawings, pictures, audio, video, or a combination thereof, as examples.

Further, in some embodiments, the act of providing new HVAC hardware may include providing a new outdoor heat exchanger, a new outdoor fan positioned and configured to move outdoor air through the outdoor heat exchanger, a new outdoor fan motor, a new outdoor portion housing, or a combination thereof, as examples. In some embodiments, the preexisting indoor fan motor may be a single-speed motor having one discrete non-zero operating speed, for example, and the thermostat may be configured to control the preexisting HVAC unit by providing an on-off thermostat signal for turning the HVAC unit on or off. In some embodiments, the method includes operating the HVAC unit at more than one non-zero compressor speed using the on-off thermostat signal from the thermostat and selecting the compressor speed based on the time between changes in the on-off thermostat signal, for example (or obtaining or providing a controller configured or having instructions to do so).

On the other hand, in some embodiments, the preexisting indoor fan motor may be a two-speed motor having two discrete non-zero operating speeds, and the thermostat may be configured, for example, to control the preexisting discrete-speed HVAC unit by providing two distinct on-off thermostat signals for turning the HVAC unit on or off and for selecting between a high and a low speed. In some embodiments, the method includes operating the HVAC unit at more than two non-zero compressor speeds using the on-off thermostat signals from the thermostat and selecting the compressor speed based on the on-off thermostat signals and the time between changes in the on-off thermostat signal, as another example (or obtaining or providing a controller configured or having instructions to do so).

In various embodiments, the new controller may be configured, for example, so that, when the HVAC unit is operating in a cooling mode, the controller selects a higher compressor speed if the outdoor temperature exceeds a first preset temperature threshold. In addition, or instead, in some embodiments, the new controller may be configured, for example, so that, when the HVAC unit is operating in a heating mode, the controller selects a higher compressor speed if the outdoor temperature is below a second preset temperature threshold. In some embodiments, the new controller may be configured, for example, to select a lower compressor speed if a time that the compressor has run is below a minimum time threshold. And in some embodiments, the new controller may be configured, for example, to select a higher compressor speed if a time that the compressor has run exceeds a maximum time threshold.

In some embodiments, the new controller may be configured, for example, to operate the outdoor fan motor at different outdoor fan speeds at different compressor speeds. Additionally, in a number of embodiments, such a method may further include, for example, an act of providing an outdoor sensor, for instance, positioned and configured to measure an outdoor temperature. In some embodiments, the new controller may be configured, for example, to receive input from the outdoor sensor and to select the compressor speed based on (e.g., among other things) the outdoor temperature. In particular embodiments, the outdoor sensor, for example, may be positioned and configured to sense outdoor heat exchanger temperature specifically, and the new controller may be configured, for instance, to select the compressor speed based on the outdoor heat exchanger temperature (e.g., once steady state conditions have been reached).

Yet another example of methods are methods of reducing the cost of replacing preexisting HVAC hardware having a first number of discrete non-zero compressor speeds with new HVAC hardware having a greater number of compressor speeds. Such methods may include, similar to previously-described methods, an act of providing new HVAC hardware, which may include, for example, at least a new compressor, a new compressor motor, a new variable-speed drive for the compressor motor, and a new controller, for example. In some embodiments, the new controller may be configured, for example, to operate the new variable-speed drive at a second number of non-zero compressor speeds using at least one on-off thermostat signal from a thermostat configured to control a discrete-speed HVAC unit by providing the on-off thermostat signal for each discrete speed. In some embodiments, the second number may be greater than the first number, for instance. Further, in some embodiments, the new controller may be configured to measure time between changes in the on-off thermostat signal, and select the compressor speed based on the time between changes in the on-off thermostat signal.

In various embodiments, the first number may be one, the first number may be two, the second number may be two, the second number may be three, the second number may be four, the second number may be five, the second number may be greater than two, the second number may be greater than five, or the second number may be greater than ten, as examples. In some embodiments, the act of providing new HVAC hardware may further include providing (e.g., at least) a new outdoor air heat exchanger, a new outdoor air fan positioned and configured to move outdoor air through the outdoor air heat exchanger, a new outdoor air fan motor, and a new housing containing the new compressor, the new compressor motor, the new outdoor air heat exchanger, the new outdoor air fan, and the new outdoor air fan motor, for example (or a subset thereof). In certain embodiments, the act of providing new HVAC hardware may further include providing a new variable-speed drive for the new outdoor air fan motor, and in some embodiments, the new controller may be configured, for example, to operate the new outdoor air fan motor at multiple speeds. In some embodiments, the act of providing new HVAC hardware may involve providing a new outdoor portion of a split system HVAC system, for example.

In particular embodiments, such a method may further include, for example, an act of instructing the installer that they may reuse a preexisting indoor portion of the split system HVAC system with the new outdoor portion of a split system HVAC system. On the other hand, in some embodiments, the act of providing new HVAC hardware may further include providing a new indoor air heat exchanger, a new indoor air fan positioned and configured to move indoor air through the indoor air heat exchanger, a new indoor air fan motor, and a new housing containing the new indoor air heat exchanger, the new indoor air fan, and the new indoor air fan motor. Specifically, in some embodiments, the act of providing new HVAC hardware may further include providing a packaged HVAC unit. Further, in some embodiments, the act of providing new HVAC hardware may further include providing a new multi-speed indoor air fan motor. In some embodiments, the new controller may be configured, for example, to operate the new indoor air fan motor at multiple speeds. And in particular embodiments, the act of providing new HVAC hardware may further include providing a new variable-speed drive for the new indoor air fan motor.

In some embodiments, the preexisting indoor fan motor may be a single-speed motor having one discrete non-zero operating speed, and the thermostat may be configured, for example, to control the preexisting HVAC hardware by providing an on-off thermostat signal for turning the HVAC hardware on or off. Further, in some embodiments, the method includes operating the HVAC hardware at more than one non-zero compressor speed using the on-off thermostat signal from the thermostat and selecting the compressor speed based on the time between changes in the on-off thermostat signal, for example. In other embodiments, the preexisting indoor fan motor may be a two-speed motor having two discrete non-zero operating speeds, and the thermostat may be configured, for example, to control the preexisting discrete-speed HVAC hardware by providing two distinct on-off thermostat signals for turning the HVAC hardware on or off and for selecting between a high and a low speed, as another example.

These on-off thermostat signals may be, for example, 24 volt AC signals, which may be 24 volts to indicate on, and 0 volts to indicate off, for example. For a single-speed unit (e.g., having a singe-stage thermostat), a pair of wires may have a voltage when the unit is to be on, and may lack voltage when the unit is to be off. For a two-speed unit (e.g., having a two-stage thermostat), there may be three wires. One may be a common wire, one may have voltage when the unit is on, and may lack voltage when the unit is off, and the third wire may have voltage when the unit is at high speed and may lack voltage at low speed, as an example. In some embodiments, the thermostat may act as a switch and may provide continuity (i.e., a closed switch) for on or high speed, and may provide lack of continuity (i.e., an open switch) for off or low speed, as examples. In a number of embodiments, a thermostat (e.g., for a preexisting unit or a discrete-speed unit) may have an additional wire or pair of wires for signaling whether the blower is to be on (run all of the time, whether the compressor is running or not) or on auto (run only when the compressor motor is running). Some thermostats may have or use additional wires for additional speeds or for other functions.

Various methods involve operating the HVAC hardware at more than two non-zero compressor speeds using the on-off thermostat signals from the thermostat and selecting the compressor speed based on the on-off thermostat signals and the time between changes in the on-off thermostat signal. Further, a number of embodiments include providing an outdoor sensor positioned and configured to measure an outdoor temperature (e.g., outdoor air heat exchanger). In some embodiments, the new controller may be configured, for example, so that, when the HVAC hardware is operating in a cooling mode, the controller selects a higher compressor speed if the outdoor temperature exceeds a first preset temperature threshold, or selects a higher compressor speed if the outdoor temperature is below a second preset temperature threshold, as examples. In some embodiments, the new controller may be configured, for example, to select a lower compressor speed if a time that the compressor has run may be below a minimum time threshold, or to select a higher compressor speed if a time that the compressor has run exceeds a maximum time threshold, for instance.

Some such methods may further include, for example, an act of instructing an installer that they may reuse a preexisting thermostat configured to control the preexisting HVAC hardware having the first number of discrete compressor speeds, an act of instructing the installer that they may reuse preexisting electrical wiring to the preexisting thermostat, an act of instructing the installer that they may connect the preexisting electrical wiring to the new controller, or a combination thereof, as examples. In some embodiments, the act of providing new hardware may include providing a controller that may be configured, for example, to select the compressor speed utilizing a time between a thermostat on signal and a thermostat off signal. In certain embodiments, the controller may be configured, for example, to select the compressor speed utilizing a time between a thermostat on signal and a present time. Further, in some embodiments, the act of providing new hardware may include providing a controller that may be configured, for example, to select the compressor speed utilizing (e.g., among other things) a time between a thermostat off signal and a thermostat on signal.

People, such as an organization or a company, may perform many of the methods described herein. Other methods may be performed by equipment such as a controller (e.g., an HVAC unit controller), or a unit as another example. Some embodiments include various methods of controlling an air conditioning unit to limit use of electricity while maintaining space temperature within a desired range, for example. In some embodiments, the air conditioning unit may be a heat pump, for instance, and may be controlled in a heating mode (e.g., as well as in a cooling mode), for example.

Such methods may include, for instance, (e.g., in the following order) at least the acts of receiving an on-signal from a thermostat located within the space, operating the unit at an operating speed (e.g., including running a compressor motor driving a compressor at a compressor speed, running an evaporator fan motor at a blower speed, the evaporator fan motor driving an evaporator fan that moves indoor air through an evaporator and to the space, and running a condenser fan motor at a condenser fan speed, the condenser fan motor driving a condenser fan that moves outdoor air through a condenser), and measuring how long the unit operates. In a number of embodiments, if the unit operates for longer than a predetermined maximum desired operating time, and if the unit is not already operating at a maximum operating speed, the method may include increasing the operating speed (e.g., increasing the compressor speed). In various embodiments, the predetermined maximum desired operating time may be about 21 minutes, about 25 minutes, about 30 minutes, about 35 minutes, about 40 minutes, about 45 minutes, about 50 minutes, about 55 minutes, about 60 minutes, about 70 minutes, or about 85 minutes, as examples.

Such methods may further include an act of receiving an off-signal from the thermostat located within the space, and after receiving the off-signal, stopping operation of the unit. In various embodiments, the act of stopping operation of the unit may mark an end to an operating cycle having a final compressor speed at the time the off-signal is received. As used herein, an operating cycle, on cycle, or run (e.g., prior run or immediate prior run) extends from when the thermostat provides an on-signal until when the thermostat instructs the unit to turn off (e.g., by no longer providing the on-signal). In many embodiments, the act of stopping operation includes turning off the compressor motor, turning off the evaporator fan motor, and turning off the condenser fan motor, as examples. In some embodiments, turning off of one or more of these pieces of equipment may be delayed, for example, for a specific amount of time. For instance, in some embodiments, the evaporator fan or indoor air fan may run for a number of seconds or minutes after the compressor and the condenser fan or outdoor fan turn off.

Various such methods further include receiving an on-signal from the thermostat (e.g., located within the space), and operating the unit at the operating speed. In some embodiments, for example, if the compressor speed was changed during an immediately previous operating cycle, the compressor speed may be set at the final compressor speed of the immediately previous operating cycle. As used herein, in evaluating whether the compressor speed changed during an immediately previous operating cycle, starting and stopping of the compressor, and operation of the compressor at a start speed (in embodiments having a start speed), are not considered. In other words, as used herein, the compressor speed is only considered to have been changed during the immediately previous operating cycle, if during the immediately previous operating cycle, the compressor speed was set (e.g., by the controller) at one steady non-zero compressor speed (other than the start speed) and then the compressor speed was changed to a different steady non-zero compressor speed, during the same operating cycle. Further, as used herein, the final compressor speed of the immediately previous operating cycle is the non-zero speed at which compressor was operating when the thermostat provided the off signal (e.g., stopped providing an on signal).

On the other hand, if the compressor speed was not changed during the immediately previous operating cycle, if the unit operated for less than a predetermined minimum desired operating time during the immediately previous operating cycle, if the unit did not operate at a minimum non-zero operating speed during the immediately previous operating cycle, or a combination thereof, an act may be performed of decreasing the compressor speed from the final compressor speed of the immediately previous operating cycle, for instance. In various embodiments, the predetermined minimum desired operating time may be, about 12 minutes, about 14 minutes, about 17 minutes, about 20 minutes, about 24 minutes, about 29 minutes, about 35 minutes, about 42 minutes, about 51 minutes, or about 62 minutes, as examples.

Further, in a number of embodiments, if the compressor speed was not changed during the immediately previous operating cycle, if the unit operated for more than the predetermined minimum desired operating time during the immediately previous operating cycle, if the unit did not operate at a maximum non-zero operating speed during the immediately previous operating cycle, or a combination thereof, for example, the compressor speed may be set at the final compressor speed of the immediately previous operating cycle. Such methods may also include returning to the act above of measuring how long the unit operates, and repeating (e.g., indefinitely) that act and the acts that follow (e.g., until the unit is turned off by the operator).

In some embodiments, available non-zero compressor speeds consist of (i.e., only) a low speed, a high speed, and a boost speed, for example. In variable-speed embodiments, motors may ramp up (e.g., gradually or at a controlled rate) from stop or between speeds, but may operate at a constant speed (e.g., in steady state) only at the available speeds (e.g., once such available speeds are selected). In some embodiments having these available three speeds, the low speed may be the minimum non-zero speed and the boost speed may be the maximum speed. These speeds may be selected speeds, for example. In a number of embodiments, the unit may be more efficient at the low speed than at the high speed. Further, in many embodiments, the unit may be more efficient at the high speed than at the boost speed. Moreover, units are generally quieter at lower speeds.

In some embodiments, the blower speed may be constant (i.e., the same) for all (e.g., non-zero) compressor speeds, for example, in applications where a preexisting blower, evaporator fan, or indoor fan is used. In such embodiments, if the compressor is operated too slowly (e.g., if low speed or the minimum available or selected speed is too low), efficiency may drop because fan energy (i.e., of the indoor fan at least) does not decrease as the capacity of the unit decreases. This may limit the number of speeds that can be used or how low the speeds can become. On the other hand, in some embodiments, for different operating speeds, the blower or indoor fan speed may change as the compressor speed changes. Similarly, in a number of embodiments, for different operating speeds, the condenser fan (i.e., outdoor fan) speed may change as the compressor speed changes. Embodiments having multiple or variable-speed fans may benefit from a greater number of available speeds or lower minimum available speeds in comparison to units that have single-speed fans, for example.

In various embodiments, the act of operating the unit at the operating speed may include instructing a variable-speed drive to operate the compressor at one of a discrete number of predetermined speeds. In some embodiments, these predetermined speeds include the maximum compressor speed and the minimum non-zero compressor speed. In some embodiments, the maximum speed and the minimum non-zero speed are selected at the time of installation of the unit. On the other hand, in some embodiments, the maximum speed and the minimum non-zero speed may be selected at the factory. Besides the three-speed embodiment described above, in other embodiments, available non-zero compressor speeds may consist of two discrete non-zero speeds, consist of four discrete non-zero speeds, consist of five discrete non-zero speeds, consist of six discrete non-zero speeds, consist of seven discrete non-zero speeds, or may include at least eight discrete non-zero speeds, as other examples.

In some embodiments, the air conditioning unit may be a split system, and in some embodiments, at least the compressor motor and the compressor may have been replaced with a new compressor motor and a new compressor that are being used with a preexisting evaporator fan motor and a preexisting evaporator fan. In a number of embodiments, the new compressor motor may be a variable-speed motor driven by a variable-speed drive and the preexisting evaporator fan (i.e., indoor fan or blower) motor may be a single-speed motor. In other embodiments, the evaporator fan motor may be a multiple-speed motor configured to operate at multiple discrete non-zero blower speeds. For example, in certain embodiments, the evaporator fan motor may be a two-speed motor configured to operate at two discrete non-zero blower speeds.

In a number of embodiments, at least the compressor motor and the compressor have been replaced with a new compressor motor and a new compressor that are being used with a thermostat configured to control a discrete-speed HVAC unit by providing an on-off thermostat signal for each discrete speed. Specifically, in some embodiments, at least the compressor motor and the compressor have been replaced with a new compressor motor and a new compressor that are being used with a preexisting thermostat that provides the on-signal and the off-signal. In some embodiments, the thermostat (e.g., new or preexisting) may be electrically connected to the air conditioning unit through preexisting thermostat wiring.

In particular embodiments, if the compressor speed was not changed during the immediately previous operating cycle, and if the unit operated at the maximum non-zero operating speed (e.g., the boost speed) during the immediately previous operating cycle, the method may decrease the operating speed from the immediately previous operating cycle, for example (e.g., to the high speed). In some embodiments, the act of decreasing the operating speed includes decreasing the compressor speed, for example.

Further, in some embodiments, (e.g., if the unit did not operate at a minimum non-zero operating speed during the immediately previous operating cycle, if the unit operated for more than the predetermined minimum desired operating time during the immediately previous operating cycle, or both) the act of stopping operation of the unit may include decreasing the compressor speed to a reduced non-zero compressor speed and operating the unit for a third period of time at the reduced non-zero compressor speed. In some such embodiments, if an on-signal has not been received from the thermostat located within the space during the third period of time, the method may include turning off the compressor motor after completion of the third period of time.

This may allow the unit to be operated at a higher-efficiency and lower-noise speed for at least part of the time. In embodiments having three available speeds (e.g., low, high, and boost), the reduced speed may be the low speed, for example. In other embodiments, the reduced speed may be a different speed, which may be selected, for example, to provide a greater efficiency, reduced noise, or both, but may be low enough so as to not be able to maintain the set point temperature (e.g., usually). In some embodiments, such a feature may cause the unit to cycle between a high speed or boost speed and the reduced speed rather than cycling between the high speed or boost speed and off, for example. In some embodiments, the reduced speed may only be implemented following reception of a thermostat off-signal if the unit was operating at the boost speed. In other embodiments, the third period of time may be longer if the unit was operating in the boost speed than if the unit was operating at the high speed.

In various embodiments, the third period of time may be, for example, about 12 minutes, about 14 minutes, about 17 minutes, about 20 minutes, about 24 minutes, about 29 minutes, about 35 minutes, about 42 minutes, about 51 minutes, or about 62 minutes, as examples, which may be measured from the thermostat off signal, for example. In some embodiments, a provision may be made to allow the user to turn off the unit completely if the unit is operating at the reduced speed. For example, in some embodiments, if, when operating at the reduced speed during the third period of time, the unit receives an on-signal and then an off-signal (e.g., in quick succession), then the unit may shut off completely. As a result, an operator can shut the unit off completely (i.e., without operating at the reduced speed for the third period of time) by turning the unit off, then on, and then off, in quick succession, at the thermostat.

In some embodiments, if the thermostat calls for the unit to operate at the maximum speed or boost speed for longer than a fourth period of time, the speed may be reduced (e.g., to the high speed or to the low speed) for a fifth period of time. This may spare the compressor, compressor motor, variable-speed drive, or a combination thereof, from stress and wear associated with continuous operation at the maximum speed or boost speed for longer than the fourth period of time. In some embodiments, if the thermostat still calls for the unit to operate, the unit may return to the maximum or boost speed after the fifth time. In some embodiments, the fourth period of time may be about 60 minutes, about 72 minutes, about 86 minutes, about 100 minutes, about 120 minutes, about 140 minutes, about 170 minutes, or about 200 minutes, as examples. Further, in some embodiments, the fifth period of time may be about 5 minutes, about 6 minutes, about 7 minutes, about 8 minutes, about 9 minutes, about 10 minutes, about 12 minutes, or about 15 minutes, as examples.

With some compressors, it may be necessary or beneficial to avoid sustained operation at a low speed in order to assure proper lubrication of the compressor. Some embodiments may provide for an increase in speed, even if for a short time, to provide such a benefit. Some embodiments provide as a solution to this problem that the compressor speed automatically increases (e.g., after the predetermined maximum desired operating time described above). Some embodiments may provide for one or more additional transient increases in speed within the predetermined maximum desired operating time, (e.g., if operating at a low speed) which may last, for example, about 1 minute, about 2 minutes, about 3 minutes, about 4 minutes, about 5 minutes, about 6 minutes, about 7 minutes, about 8 minutes, about 9 minutes, about 10 minutes, or about 12 minutes, as examples.

Various methods may further include, for example, an act of measuring a temperature, for instance, at the condenser. For example, in some embodiments, the act of measuring a temperature at the condenser may include measuring a coil temperature. Further, in some embodiments, the act of operating the unit at the operating speed may include (e.g., among other things) selecting a higher compressor speed if the temperature exceeds a first threshold temperature, selecting a lower compressor speed if the temperature is below the first threshold temperature, or both (e.g., depending on the temperature). Such acts may occur in a cooling mode, for example. In some embodiments, the first threshold temperature may be approximately 80 degrees F., approximately 89 degrees F., approximately 92 degrees F., approximately 95 degrees F., or approximately 105 degrees F., as examples.

In some embodiments, the act of operating the unit at the operating speed may include selecting a higher compressor speed if the temperature is below a second threshold temperature, and selecting a lower compressor speed if the temperature exceeds the second threshold temperature. Such acts may occur in a heating mode (e.g., of a heat pump), for example. In certain embodiments, the second threshold temperature may be approximately 30 degrees F., approximately 34 degrees F., approximately 37 degrees F., approximately 40 degrees F., or approximately 50 degrees F., as examples.

In some specific examples of embodiments, when the inverter board is powered on, the compressor speed (NSP) is set to High. Further, in this embodiment, when the compressor is turned on for the first time, the compressor speed is set to High. The speed may change while the compressor is running or at the next on cycle, for example. Furthermore, in this example, NSP represents the compressor speed at any given moment and can be Boost (highest speed), High, or Low (lowest speed). In a number of embodiments, for each compressor speed, there is a corresponding condenser fan speed. The inverter controller, in this embodiment, determines whether or not to change the compressor speed every tw minutes or when the compressor is turned off by the thermostat.

In a number of embodiments, the inverter controller first measures the outdoor coil temperature (TC), in this example, and compressor run time (RT). RT is defined, in this embodiment, as the compressor run time without speed change. Right after compressor speed changes during run time, RT is reinitiated (set to zero) in this example.

Further, if the compressor is turned off before tw has passed, and compressor speed is changed during run time, (but the stage did not change, in embodiments having multiple stages), in this embodiment, NSP will not change (within the same stage) when the compressor is turned on again by the thermostat. On the other hand, if the compressor is turned off before tw has passed and compressor speed is not changed during run time, in this example, the inverter controller selects the next compressor speed (NSP) based on the previous speed. In this embodiment, if the previous compressor speed is Boost, NSP is set to High. But if the previous compressor speed is High, and run time (RT) is longer than thh, in this embodiment, NSP is set to Boost. If the previous compressor speed is High and RT is shorter than thh, on the other hand, then if RT is longer than th and TC is greater than TL, the next compressor speed is not changed in this example. Further, if the previous compressor speed is High and RT is shorter than thh, then if RT is longer than th and TC is less than TL, the next compressor speed is set to Low in this embodiment. In addition, if the previous compressor speed is High and RT is shorter than thh, then if RT is shorter than th, the next compressor speed is set to Low. On the other hand, in this example, if the previous compressor speed is Low and RT is longer than tl, the next compressor speed is set to High. In addition, if the previous compressor speed is Low and RT is shorter than tl, then if TC is greater than TH, the next compressor speed is set to High. And if the previous compressor speed is Low and RT is shorter than tl, then if TC is less than TH, the next compressor speed is not changed (Low).

Moreover, in this embodiment, if tw has passed and the compressor is still on, the inverter controller selects the next compressor speed based on the current compressor speed (NSP). If NSP is Boost, the compressor will not change speed. In addition, if NSP is High and RT is shorter than thh, in this example, the compressor will not change speed. But if NSP is High, and RT is longer than thh, the compressor speed will be changed to Boost (and RT will be reinitiated). Similarly, if NSP is Low and RT is longer than tl, the compressor speed will be changed to High. But if NSP is Low and RT is shorter than tl, then if TC is less than TH, the compressor speed will not change (Low). And if NSP is Low and RT is shorter than tl, then if TC is greater than TH, the compressor speed will be set to High in this embodiment.

In some embodiments, the compressor speed may be limited by other factors as well. For example, when outdoor ambient is above a certain temperature, the compressor speed may be limited for reliability reasons. In those cases, all the compressor speeds (Boost, High or Low) may be checked against the speed limit. If an intended compressor speed is higher than the speed limit, the speed (e.g., NPS) may be set to match the speed limit, in such embodiments. In some embodiments, parameter values and ranges may be as follows: TL=89° F. (±5° F.); TH=95° F. (±5° F.); tl=90 minutes (±30 minutes); th=45 minutes (±30 minutes); thh=60 minutes (±30 minutes); tw=10 minutes (±10 minutes, but not including tw=0), as examples.

In some embodiments, when the inverter board is powered on, the compressor speed (NSP) is set to High. Further, when the compressor is turned on for the first time, the compressor speed is High. In particular embodiments, the speed may change while the compressor is running or at the next on cycle. Further, in some embodiments, NSP represents compressor speed at any given moment and can be Boost (highest speed), High, or Low (lowest speed), but these compressor speeds may be different from the cooling speeds. For each compressor speed, there may be a corresponding condenser fan speed, in a number of embodiments. The inverter controller may determine whether or not to change the compressor speed every tw minutes or when the compressor is turned off by the thermostat, in this embodiment. The inverter controller may first measure the outdoor coil temperature (TC) and compressor run time (RT). RT may be defined as the compressor run time without speed change, for example. Right after compressor speed changes during run time, for example, RT may be reinitiated (set to zero) in some embodiments.

In a number of embodiments, if the compressor is turned off before tw has passed and compressor speed is changed during run time, NSP will not change when the compressor is turned on again by the thermostat. Further, if the compressor is turned off before tw has passed and compressor speed is not changed during run time, the inverter controller may select the next compressor speed (NSP) based on the previous speed. If the previous compressor speed was Boost, for example, NSP is set to High. On the other hand, if the previous compressor speed is High, and run time (RT) is longer than thh, NSP is set to Boost. Further, if the previous compressor speed is High and RT is shorter than thh, then if RT is longer than th and TC is less than TL, the next compressor speed is not changed (High). Further, if the previous compressor speed is High and RT is shorter than thh, then if RT is longer than th and TC is greater than TL, however, the next compressor speed is set to Low. In addition, if the previous compressor speed is High and RT is shorter than thh, then if RT is shorter than th, the next compressor speed is set to Low. But if the previous compressor speed is Low and RT is longer than tl, the next compressor speed is set to High. But if the previous compressor speed is Low and RT is shorter than tl, then if TC is less than TH, the next compressor speed is set to High. Further, if the previous compressor speed is Low and RT is shorter than tl, then if TC is greater than TH, the next compressor speed is not changed (Low).

If tw has passed and the compressor is still on, in this embodiment, the inverter controller selects the next compressor speed based on the current compressor speed (NSP). If NSP is Boost, the compressor will not change speed. In addition, if NSP is High and RT is shorter than thh, the compressor will not change speed. But if NSP is High, and RT is longer than thh, the compressor speed will be changed to Boost (and RT will be reinitiated). On the other hand, if NSP is Low and RT is longer than tl, the compressor speed will be changed to High. And if NSP is Low and RT is shorter than tl, then if TC is greater than TH, the compressor speed will not change (Low). However, if NSP is Low and RT is shorter than tl, then if TC is less than TH, the compressor speed will be set to High. In this example of an embodiment, parameter values and ranges may be as follows: TL=40° F. (±5° F.); TH=34° F. (±5° F.); tl=90 minutes (±30 minutes); th=45 minutes (±30 minutes); thh=60 minutes (±30 minutes); tw=10 minutes (±10 minutes, but not including tw=0), as examples.

In a number of embodiments, a stage two cooling algorithm may be the same, or similar to, a single stage cooling algorithm. As used herein, the number of "stages" (e.g., one or two) refers to the number of speed signals (not including off) that the thermostat provides, as opposed to the number of different non-zero speeds that the compressor is actually operated at under different circumstances in the particular embodiment being described. In some embodiments, when the inverter board is powered on, the compressor speed (NSP) may be set to H high. When the thermostat calls for stage two cooling, the compressor speed is H high. The speed may change while the compressor is running or at the next on cycle. NSP represents compressor speed at any given moment and can be Boost (highest speed), H high, or H low (lowest speed). In a number of embodiments, for each compressor speed, there may be a corresponding condenser fan speed. In some embodiments, the inverter controller determines whether or not to change the compressor speed every tw minutes or when the compressor is turned off by the thermostat. The inverter controller may first measure the outdoor coil temperature (TC) and compressor run time (RT). Again, RT is defined as the compressor run time without speed change. Right after compressor speed changes during run time, RT is reinitiated (set to zero) in this embodiment.

Moreover, if the compressor is turned off before tw has passed and compressor speed is changed during run time, in this embodiment, NSP will not change when the compressor is turned on again by the thermostat. If the compressor is turned off before tw has passed and compressor speed is not changed during run time, however, the inverter controller selects the next compressor speed (NSP) based on the previous speed. If the previous compressor speed is Boost, NSP is set to H high. On the other hand, if the previous compressor speed is H high, and run time (RT) is longer than Hthh, NSP is set to Boost. Further, if the previous compressor speed is H high and RT is shorter than Hthh, then if RT is longer than Hth and TC is greater than HTL, the next compressor speed is not changed. Moreover, in this embodiment, if the previous compressor speed is H high and RT is shorter than Hthh, then if RT is longer than Hth and TC is less than HTL, the next compressor speed is set to H low. In addition, if the previous compressor speed is High and RT is shorter than Hthh, then if RT is shorter than Hth, the next compressor speed is set to H low. But if the previous compressor speed is H low and RT is longer than Htl, the next compressor speed is set to H high. In addition, if the previous compressor speed is H low and RT is shorter than Htl, then if TC is greater than HTH, the next compressor speed is set to H high. But if the previous compressor speed is H low and RT is shorter than Htl, then if TC is less than HTH, the next compressor speed is not changed (H low).

Additionally, in this embodiment, if tw has passed and the compressor is still on, the inverter controller selects the next compressor speed based on the current compressor speed (NSP). If NSP is Boost, the compressor will not change speed. In addition, if NSP is H high and RT is shorter than Hthh, the compressor will not change speed. Further, if NSP is H high, and RT is longer than Hthh, the compressor speed will be changed to Boost (and RT will be reinitiated). If NSP is H low and RT is longer than Htl, however, the compressor speed will be changed to H high. On the other hand, if NSP is H low and RT is shorter than Htl, then if TC is less than HTH, the compressor speed will not change (H low). But if NSP is H low and RT is shorter than Htl, then if TC is greater than HTH, the compressor speed will be set to H high.

Again, in a number of embodiments, the compressor speed may be limited by other factors as well. For example, when outdoor ambient is above certain temperature, the compressor speed may be limited for reliability reasons. In those cases, all the compressor speeds (Boost, H high or H low) may be checked against the speed limit. If any compressor speed is higher than the speed limit, it may be set to match the speed limit instead. In certain embodiments, parameter values and ranges may be as follows: HTL=89° F. (±5° F.); HTH=95° F. (±5° F.); Htl=90 minutes (±30 minutes); Hth=45 minutes (±30 minutes); Hthh=60 minutes (±30 minutes); tw=10 minutes (±10 minutes, but not including tw=0), as examples.

In stage one cooling (e.g., low speeds), the stage one cooling algorithm may be similar to the stage two cooling algorithm, for example, except that, in some embodiments, the stage one cooling does not have a Boost speed. In this embodiment, when the thermostat calls for stage one cooling, the compressor speed may start at L high (e.g., ramp steadily up to L high). The speed may change, however, while the compressor is running or at the next on cycle. NSP represents compressor speed at any given moment and can be L high, or L low, for example. In some embodiments, for each compressor speed, there is a corresponding condenser fan speed. The inverter controller may determine whether or not to change the compressor speed every tw minutes or when the compressor is turned off by the thermostat, for example. In this embodiment, the inverter controller first measures the outdoor coil temperature (TC) and compressor run time (RT). Further, in this embodiment, RT is defined as the compressor run time without speed change. Right after compressor speed changes during run time, RT is be reinitiated (set to zero) in this embodiment.

In this embodiment, if the compressor is turned off before tw has passed and compressor speed is changed during run time, NSP will not change (L high) when the compressor is turned on again by the thermostat. If the compressor is turned off before tw has passed and compressor speed is not changed during run time, however, the inverter controller selects the next compressor speed (NSP) based on the previous speed. If the previous compressor speed is L high, RT is longer than Lth, and TC is greater than LTL, the next compressor speed is not changed. But if the previous compressor speed is L high, RT is longer than Lth, and TC is less than LTL, the next compressor speed is set to L low. In addition, if the previous compressor speed is L high and RT is shorter than Lth, the next compressor speed is set to L low. But if the previous compressor speed is L low and RT is longer than Ltl, the next compressor speed is set to L high. In addition, if the previous compressor speed is L low and RT is shorter than Ltl, then if TC is greater than LTH, the next compressor speed is set to L high. But if the previous compressor speed is L low and RT is shorter than Ltl, then if TC is less than LTH, the next compressor speed is not changed (L low) in this embodiment.

Furthermore, if tw has passed and the compressor is still on, the inverter controller selects the next compressor speed based on the current compressor speed (NSP). If NSP is L high, the compressor will not change speed. But if NSP is L low and RT is longer than Ltl, the compressor speed will be changed to L high. If NSP is L low and RT is shorter than Ltl, then if TC is less than LTH, the compressor speed will not change (L low). But if NSP is Low and RT is shorter than Ltl, then if TC is greater than LTH, the compressor speed will be set to L high.

In some embodiments, the compressor speed may be limited by other factors as well. For example, when outdoor ambient is above certain temperature, the compressor speed may be limited by reliability reasons. In those cases, all the compressor speeds (L high or L low) may be checked against the speed limit, for example. If any compressor speed is higher than the speed limit, it may be set to match the speed limit. In particular embodiments, parameter values and ranges may be as follows: LTL=77° F. (±5° F.); HTH=83° F. (±5° F.); Htl=90 minutes (±30 minutes); Hth=45 minutes (±30 minutes); tw=10 minutes (±10 minutes, but not including tw=0), as examples.

In stage two heating (e.g., high speeds), the stage two heating algorithm may be the same as the single stage heating algorithm, for example. When the inverter board is powered on, in this embodiment, the compressor speed (NSP) may be set to High. When the thermostat calls for stage two heating, the compressor speed may initially be set to High. The speed may change, however, while the compressor is running or at the next on cycle. Again, NSP represent compressor speed at any given moment and can be Boost (highest speed), High, or Low (lowest speed). These compressor speeds may be different from the cooling speeds, in some embodiments. Further, for each compressor speed, there is a corresponding condenser fan speed, in some embodiments. Similar to other stages, the inverter controller may determine whether or not to change the compressor speed every tw minutes or when the compressor is turned off by the thermostat. The inverter controller may first measure the outdoor coil temperature (TC) and compressor run time (RT). In this embodiment, RT is also defined as the compressor run time without speed change. Right after compressor speed changes during run time, RT is reinitiated (set to zero) in this embodiment.

If the compressor is turned off before tw has passed and compressor speed is changed during run time, in this embodiment, NSP will not change when the compressor is turned on again by the thermostat. But if the compressor is turned off before tw has passed and compressor speed is not changed during run time, the inverter controller selects the next compressor speed (NSP) based on the previous speed. If the previous compressor speed is Boost, NSP is set to High. But if the previous compressor speed is High, and run time (RT) is longer than Hthh, NSP is set to Boost. Moreover, if the previous compressor speed is High and RT is shorter than Hthh, then if RT is longer than Hth and TC is less than HTL, the next compressor speed is not changed (High) in this embodiment. But if the previous compressor speed is High and RT is shorter than Hthh, then if RT is longer than Hth and TC is greater than HTL, the next compressor speed is set to Low. In addition, if the previous compressor speed is High and RT is shorter than Hthh, then if RT is shorter than Hth, the next compressor speed is set to Low. On the other hand, if the previous compressor speed is Low and RT is longer than Htl, the next compressor speed is set to High. If the previous compressor speed is Low and RT is shorter than Htl, then if TC is less than HTH, the next compressor speed is set to High. But if the previous compressor speed is Low and RT is shorter than Htl, then if TC is greater than HTH, the next compressor speed is not changed (Low).

In a number of embodiments, if tw has passed and the compressor is still on, the inverter controller may select the next compressor speed based on the current compressor speed (NSP), for example. If NSP is Boost, the compressor will not change speed. In addition, if NSP is High and RT is shorter than Hthh, the compressor will not change speed. But if NSP is High, and RT is longer than Hthh, the compressor speed will be changed to Boost (and RT will be reinitiated) in this embodiment. On the other hand, if NSP is Low and RT is longer than Htl, the compressor speed will be changed to High. And if NSP is Low and RT is shorter than Htl, then if TC is greater than HTH, the compressor speed will not change (Low). But if NSP is Low and RT is shorter than Htl, then if TC is less than HTH, the compressor speed will be set to High. In particular embodiments, parameter values and ranges may be as follows: HTL=40° F. (±5° F.); HTH=34° F. (±5° F.); Htl=90 minutes (±30 minutes); Hth=45 minutes (±30 minutes); Hthh=60 minutes (±30 minutes); tw=10 minutes (±10 minutes, but not including tw=0), as examples.

In stage one heating (e.g., low speeds) the algorithm may be similar to the stage two heating algorithm, for example, except that the stage one heating may not have a Boost speed. When the thermostat calls for stage one heating, the compressor speed may be set to L high. The speed may change, however, while the compressor is running or at the next on cycle. NSP represents the compressor speed at any given moment and can be L high, or L low in this embodiment. These compressor speeds may be different from the cooling speeds, in some embodiments, and for each compressor speed, there may be a corresponding condenser fan speed. The inverter controller may determine whether or not to change the compressor speed every tw minutes or when the compressor is turned off by the thermostat. The inverter controller may first measure the outdoor coil temperature (TC) and compressor run time (RT). In this embodiment, RT is defined as the compressor run time without speed change. Right after compressor speed changes during run time, RT will be reinitiated (set to zero) in this embodiment.

If the compressor is turned off before tw has passed and compressor speed is changed during run time, NSP may not change (L high) when the compressor is turned on again by the thermostat. On the other hand, if the compressor is turned off before tw has passed and compressor speed is not changed during run time, the inverter controller may select the next compressor speed (NSP) based on the previous speed. If the previous compressor speed is L high, RT is longer than Lth, and TC is less than LTL, the next compressor speed is not changed (L high). But if the previous compressor speed is L high, RT is longer than Lth, and TC is greater than LTL, the next compressor speed is set to L low. In addition, if the previous compressor speed is L high and RT is shorter than Lth, the next compressor speed is set to L low. However, if the previous compressor speed is L low and RT is longer than Ltl, the next compressor speed is set to L high. Additionally, if the previous compressor speed is L low and RT is shorter than Ltl, then if TC is less than LTH, the next compressor speed is set to L high. But if the previous compressor speed is L low and RT is shorter than Ltl, then if TC is greater than LTH, the next compressor speed is not changed (L low).

In various embodiments, if tw has passed and the compressor is still on, the inverter controller selects the next compressor speed based on the current compressor speed (NSP). If NSP is L high, for example, the compressor will not change speed. But if NSP is L low and RT is longer than Ltl, the compressor speed will be changed to L high. And if NSP is L low and RT is shorter than Ltl, then if TC is greater than LTH, the compressor speed will not change (L low). But if NSP is L low and RT is shorter than Ltl, then if TC is less than LTH, the compressor speed will be set to L high. In particular embodiments, parameter values and ranges may be as follows: HTL=50° F. (±5° F.); HTH=44° F. (±5° F.); Htl=90 minutes (±30 minutes); Hth=45 minutes (±30 minutes); tw=10 minutes (±10 minutes, but not including tw=0), as examples.

Yet other examples of methods include various methods of adapting and distributing heat pumps, for example, to provide improved efficiency performance in different climates where demand for cooling and heating are substantially unequal. In various embodiments, such methods may include (e.g., in any order) at least the acts of obtaining or manufacturing an inventory of heat pumps having (at least) substantially identical compressors, compressor motors, variable-speed drives for the compressor motors, outdoor heat exchangers, outdoor fans, outdoor fan motors, and variable-speed drives for the outdoor fan motors, and obtaining or providing substantially identical controllers for each of the heat pumps, each controller including, for example, instructions to operate the compressor motor at multiple different speeds in each of a cooling mode and a heating mode. As used herein, "substantially identical" means similar enough in dimensions and performance so as to be interchangeable in mass production.

In a number of embodiments, such methods may also include dividing the inventory of heat pumps in to multiple groups of multiple heat pumps, and assigning different ratings to each group of heat pumps. The different ratings (i.e., between groups) may differ in capacity in at least one of the cooling mode or the heating mode, and in some embodiments, for at least one of the groups, a rating in the cooling mode may be substantially different than a rating in the heating mode, for example. Further, such methods may include an act of configuring (e.g., programming or inputting selections) the controllers of each group of heat pumps to operate the compressor motors of the heat pumps in that group at selected speeds that provide performance that corresponds to the rating of the group (e.g., in both cooling and heating modes).

In many embodiments, for at least one of the groups, a selected speed of the compressor motor in the cooling mode may be substantially different than any selected speed of the compressor motor (e.g., of the same unit) in the heating mode, for example. In some embodiments, for at least one of the groups, all selected speeds of the compressor motor in the cooling mode or all selected speeds of the compressor motor in the heating mode may be substantially below a maximum capable compressor motor speed for the heat pump, as examples. In some embodiments, at least one selected speed of the compressor motor that may be substantially below a maximum capable compressor motor speed for the heat pump provides a higher efficiency of the heat pump than the maximum capable compressor motor speed, for instance.

Various embodiments further include acts of advertising the different ratings of each group of heat pumps. Such advertising may include, for example, advertising the higher efficiency, for example. Advertising may be performed, for example, through the media (e.g., television or radio), over the Internet (e.g., Internet advertisements, e-mails, or one or more web sites), through flyers, on product packaging, on displays where products are sold, through the mail, using sales representatives, through telephone calls, by text messaging, at trade shows, or the like, as examples. Advertising may be made to distributors, dealers, installation contractors, or directly to the pubic, building owners, or building managers. A number of embodiments may further include selling the heat pumps in the different groups for use in different applications (e.g., for buildings located in different locations having different climates) having different unequal demands for cooling and heating. Sales may be made, for example, to distributors, dealers, installation contractors, or directly to the pubic, building owners, or building managers, for instance. In some embodiments, heat pumps may be priced differently depending on the ratings (e.g., higher rated units may be sold at higher prices than lower rated units, even though the only differences lie in the controls. In some situations, lower rated units may have greater efficiencies, and therefore, may qualify for incentives that higher rated units do not qualify for. In a number of embodiments, such incentives may be advertised.

In certain embodiments, units may be derated (e.g., the selected speeds being below or substantially below the maximum capable compressor motor speed) in both the cooling and heating modes. Units that are derated in both the cooling and heating modes may be more efficient, may provide one or more capacities without designing, building, and inventorying different size units or components, may last longer, may be suitable for more severe ambient conditions (e.g., higher summer temperature climates), or a combination thereof, as examples (e.g., in comparison with units that operate at the maximum capable compressor motor speed). In some embodiments, deratings and the speed changes associated therewith may be made in the factory, and may be difficult to change in the field (e.g., physically difficult or may require information that may be kept secret such as codes, software, or know how). Derated units may be sold at different prices (e.g., lower prices) than full rated units, may qualify for incentives due to their higher efficiency, may have different warranties, may have lower noise ratings, or a combination thereof, as examples, which may be advertised. In other embodiments, deratings may be easier to make and may be made by the installer or even by the owner (e.g., home owner).

In some embodiments, the act of configuring the controllers may be performed for each heat pump before the heat pump is shipped to an installation site or before the heat pump is installed, such as in a factory where the heat pump is assembled, for example. In some embodiments, the heat pump may be an outdoor portion of a split system HVAC system. On the other hand, in some embodiments, the heat pump may be a packaged HVAC unit or a complete split system (e.g., both outdoor and indoor portions). In certain embodiments, the act of obtaining or manufacturing the inventory of heat pumps may include obtaining or manufacturing an inventory of heat pumps having, at least, (e.g., in addition to other components) substantially identical indoor heat exchangers, indoor fans, indoor fan motors, variable-speed drives for the indoor fan motors, or a combination thereof, as examples.

In various embodiments, the act of obtaining or providing substantially identical controllers for each of the heat pumps may include obtaining or providing controllers that are each configured to operate the compressor motor at a first number of different selected speeds in the cooling mode and a second number of different selected speeds in the heating mode. In some embodiments, the first number and the second number are both whole numbers, and in some embodiments, the act of configuring the controllers of each group of heat pumps may include proportionally lowering multiple, some, all except for one, or all, of the first number of different selected speeds in the cooling mode, for example.

In some embodiments, the lowest speed may remain unchanged, and the other speeds may be reduced proportionally (e.g., from the maximum capable compressor motor speed for the heat pump) for instance. In addition, or instead, in some embodiments, the act of configuring the controllers of each group of heat pumps may include proportionally lowering multiple, some, all except for one (e.g., all except for the lowest speed), or all, of the second number of different selected speeds in the heating mode, for instance.

In some embodiments, the first number may be equal to the second number, while in other embodiments, the first number may not be equal to the second number. In particular embodiments, the first number may be greater than two, the first number may be less than ten, the second number may be greater than two, the second number may be less than ten, or a combination thereof, as examples. Further, in certain embodiments, the act of configuring the controllers of each group of heat pumps may include lowering multiple (e.g., some, all except for one, or all) selected speeds in the cooling mode proportionally to a reduction of rated capacity in the cooling mode or lowering multiple (e.g., some, all except for one, or all) selected speeds in the heating mode proportionally to a reduction of rated capacity in the heating mode (or both, in some embodiments).

Further, in some embodiments, the act of configuring the controllers of each group of heat pumps may include configuring the controllers to operate the outdoor fan motors of the heat pumps at different speeds for different compressor speeds, configuring each of the controllers to operate the outdoor fan motor of the heat pump at a speed that may be proportional to a concurrent compressor speed, or both, as examples. Similarly, in some embodiments, the act of configuring the controllers of each group of heat pumps may include configuring the controllers to operate indoor fan motors of the heat pumps at different speeds for different compressor speeds configuring each of the controllers to operate the indoor fan motor of the heat pump at a speed that may be proportional to a concurrent compressor speed, or both, as further examples.

Moreover, in some embodiments, the act of selecting the compressor speed based on the time between changes in the on-off thermostat signal may include utilizing a time between a thermostat on signal and a thermostat off signal. In addition, or instead, in particular embodiments, the act of selecting the compressor speed based on the time between changes in the on-off thermostat signal may include utilizing a time between a thermostat on signal and a present time. Further, in some embodiments, the act of selecting the compressor speed based on the time between changes in the on-off thermostat signal may include utilizing a time between a thermostat off signal and a thermostat on signal.

Other examples of methods includes some or all of the following acts:

1. Test a variable speed system (compressor, fan motor, blower motor) at different speeds and ambient conditions.

2. Measure its capacities and energy efficiency.

3. Determine a speed set SPH (e.g., compressor, fan motor, blower motor speeds) at which the heat pump provides its highest cooling and heating capacities. The cooling compressor speed set=CoolH1 (lowest speed), CoolH2, . . . CoolHN (highest speed). The heating compressor speed set=HeatH1 (lowest speed), HeatH2, . . . HeatHN (highest speed). The indoor blower and outdoor fan motors may have similar speed sets.

4. Determine another speed set SPL (compressor, fan motor, blower motor speeds) at which the heat pump provide its lowest cooling and heating capacities. The cooling compressor speed set=CoolL1 (lowest speed), CoolL2, . . . CoolLN (highest speed). The heating compressor speed set=HeatL1 (lowest speed), HeatL2, . . . HeatLN (highest speed). The indoor blower and outdoor fan motors may have similar speed sets.

5. Determine a ratio "Rc" (Cooling) and Rh (heating) between 0 and 1.

6. Calculate new speeds NS for the heat pump rated at a different cooling and heating capacities where
   a. $CoolNS1=Rc*CoolL1+(1-Rc)*CoolH1$ . . . $CoolNSN=Rc*CoolLN+(1-Rc)*CoolHN$.
   b. $HeatNS1=Rh*HeatL1+(1-Rh)*HeatH1$ . . . $HeatNSN=Rh*HeatLN+(1-Rh)*HeatHN$.

7. Use the same method to calculate the cooling and heating outdoor fan speed sets using Rc and Rh.

8. Use the same method to calculate the cooling and heating indoor blower speed sets using Rc and Rh.

9. Test the heat pump with the new speed sets.

10. Evaluate the new cooling, heating capacities, and energy efficiency.

11. Repeat 5 to 10 with different Rc and Rh.

12. Create a cooling and heating table.

13. Store the high and low speed sets (SPH and SPL) in the controller memory.

14. Reserve memory space for Rc set and Rh set.

15. If a set of Rc and Rh is selected, the compressor speed can be determined as follows:
   a. $CoolNS1=Rc*CoolL1+(1-Rc)*CoolH1$ . . . . $CoolNSN=Rc*CoolLN+(1-Rc)*CoolHN$.
   b. $HeatNS1=Rh*HeatL1+(1-Rh)*HeatH1$ . . . $HeatNSN=Rh*HeatLN+(1-Rh)*HeatHN$.

16 Use the same method to calculate the cooling and heating outdoor fan speed sets using Rc and Rh.

17 Use the same method to calculate the cooling and heating indoor blower speed sets using Rc and Rh.

18 Program the controller in the factory to allow the same heat pump hardware to be rated at different cooling and heating capacity combinations.

19. Alternatively, allow the installer to select different cooling and heating capacities in the field by using dipswitches, jumpers, keypad, or equivalent means.

Turning now to the figures, and the particular embodiments illustrated therein, FIG. 1 illustrates an example of a method, method 10, of controlling an HVAC unit, which may be an air conditioning unit or a heat pump operating in a cooling mode, for example, using a signal from a single-speed or single-stage thermostat. In this embodiment, the HVAC unit has a compressor, and the HVAC unit is configured to operate the compressor at multiple compressor speeds. Specifically, the multiple compressor speeds include a low speed, a high speed, and a boost speed, in this embodiment, and the HVAC unit (e.g., the controller thereof) is configured to operate the compressor using a signal from a single-speed or single-stage thermostat and to select a current compressor speed from the multiple compressor speeds.

In this embodiment, method 10 includes, for example, when a current run signal is received from the thermostat (e.g., detected in act 101), an act of starting the compressor (e.g., act 103). As used herein, certain acts are described as conditional, for example, "when" a condition is present, or "if" a condition exists. Such language means and requires that the existence of the condition stated be evaluated, and that the described action is taken if the condition exists. Further, as used herein, "when" means while the condition exists, but does not require that the action necessarily be taken instantaneously.

In the embodiment illustrated, method 10 also includes an act of evaluating whether the compressor speed changed during an immediate prior run (e.g., act 115). In a number of embodiments, the immediate prior run may have had a prior run final compressor speed and a prior run time, for example, which may have been measured (e.g., in act 106), and stored (e.g., in computer memory). In this embodiment, if the compressor speed changed during the immediate prior run (e.g., evaluated in act 115), method 10 includes an act of operating the compressor at the prior run final compressor speed (e.g., act 122) during the current run signal (e.g., act 104). In other words, the unit is operated, at least initially, at the same speed as at the end of the prior run, if the speed changed during the prior run.

Further, if the compressor speed did not change during the immediate prior run (e.g., evaluated in act 115), method 10 includes an act of evaluating whether the prior run final compressor speed was the boost speed (e.g., in act 116), and if the prior run final compressor speed was the boost speed, method 10 includes operating the compressor at the high speed (e.g., act 123 and 104) during the current run signal. (For example, the change in speed is made in act 123, and the unit is operated at that speed in act 104.)

Still further, if the compressor speed did not change during the immediate prior run (e.g., evaluated in act 115), method 10 includes an act of evaluating whether the prior run final compressor speed (NSP) was the high speed (e.g., act 116). If the prior run final compressor speed was the high speed, method 10 includes evaluating whether the prior run time (RT) was less than a predetermined high speed minimum desired operating time (e.g., th in act 118), and if the prior run time was less than the predetermined high speed minimum desired operating time (e.g., evaluated in act 118), method 10 includes an act of operating the compressor at the low speed (e.g., act 125 and 104) during the current run signal.

Moreover, if the compressor speed did not change during the immediate prior run (e.g., evaluated in act 115), if the prior run final compressor speed was the high speed (e.g., evaluated in act 116), and if the immediate prior run time was more than the predetermined high speed minimum desired operating time (e.g., evaluated in act 118), method 10 includes an act of operating the compressor at the high speed (e.g., act 123 and 104) during the current run signal. Thus, under these conditions, high speed operation is repeated, at least initially.

Method 10 further includes an act of measuring a current speed operating time during the current run signal (e.g., act 106), and if the current compressor speed is the low speed (e.g., evaluated in act 108) and if the current speed operating time is greater than a predetermined low speed maximum desired operating time (e.g., evaluated in act 111), method 10 includes increasing the compressor speed to the high speed (e.g., act 113) during the current run signal. Unless stated otherwise, as used herein the "current speed operating time" is the time at one constant speed (e.g., low, high, or boost). Still further, method 10 includes an act of measuring the current speed operating time during the current run signal (e.g., act 106), and if the current compressor speed is the high speed (e.g., evaluated in act 108) and if the current speed operating time is greater than a predetermined high speed maximum desired operating time (e.g., evaluated in act 109), increasing the compressor speed to the boost speed (e.g., in act 110) during the current run signal. In the embodiment illustrated, method 10 also includes, after the current run signal is no longer received from the thermostat (e.g., 105), stopping the compressor (e.g., act 107) and repeating the above acts (e.g., starting with act 101) when the run signal (e.g., from the single-stage thermostat) is restored.

Method 10, in the embodiment illustrated, also includes, when the current run signal is first received from the thermostat (e.g., evaluated in act 102), an act of starting the compressor, ramping the compressor up to a start speed, and operating the compressor for a predetermined desired start time (e.g., ts) at the start speed (e.g., act 114). This may be beneficial for the compressor, the variable-speed drive, or both, and may make the starting of the unit less obtrusive to people (e.g., in the building). In a number of embodiments, the start speed is substantially the same regardless of the prior run final compressor speed (e.g., NSP evaluated in act 116). Additionally, in a number of embodiments, the start speed (e.g., of act 114) is within a range extending from the low speed to the high speed, inclusive. In particular embodiments, the start speed (e.g., of act 114) may be the low speed, for instance. In other embodiments, the start speed may be a different speed, however. Further, the start time (e.g., ts) may be, for example, 10, 15, 20, 25, 30, 35, 40, 45 or 50 seconds, or 1, 1.25, 1.5, 2, 2.5, 3, 4, or 5 minutes, as examples, or within ranges between two such time periods.

The appropriate acts of method 10 may be repeated or cycled through at regular intervals of time, for example (e.g., tw in act 105). Such an interval may be (e.g., tw) every two (2) minutes, for example. Further, in some embodiments, when the current run signal is first received from the thermostat (e.g., act 101), the method (e.g., 10) includes an act of evaluating whether the current run signal resulted from a user turning the HVAC unit on at the thermostat (e.g., act 102). In particular embodiments, if the current run signal resulted from a user turning the HVAC unit on at the thermostat (e.g., determined in act 102), the method includes operating the compressor during the current run signal at the high speed (e.g., act 103, 104, or both). In some embodiments, this speed may be selected regardless of the prior run final compressor speed (e.g., evaluated in act 116). This may make the unit seem more responsive to the user, and may result in the temperature within the space responding more quickly when the user changes the thermostat (e.g., compared to if the unit operated at the low speed until act 109 changed the speed).

In the embodiment illustrated, if the compressor speed did not change during the immediate prior run (e.g., evaluated in act 116), method 10 includes an act of evaluating whether the prior run final compressor speed was the high speed (e.g., in act 116), and if the prior run final compressor speed was the high speed (e.g., evaluated in act 116), evaluating whether an outdoor temperature parameter is beyond a first threshold (e.g., act 119). In this embodiment, if the outdoor temperature parameter is beyond the first threshold (e.g., below 100 degrees F., as evaluated in act 119), method 10 includes operating the compressor at the low speed (e.g., act 125 and 104) during the current run signal. Further, in this embodiment, method 10, includes an act of evaluating whether an outdoor temperature parameter is beyond a second threshold (e.g., act 112), and if the current compressor speed is the low speed (e.g., evaluated in act 108), if the outdoor temperature is beyond the second threshold (e.g., above 105 degrees F., as evaluated in act 112), method 10 includes an act of increasing the compressor speed to the high speed (e.g., act 113) during the current run signal.

In this embodiment, the outdoor temperature parameter may be the temperature of the outdoor coil (e.g., the condenser coil), for example. Further, the first threshold (e.g., TL) may be 100 degrees F., and the second threshold (e.g., TH) may be 105 degrees, F, as examples. In other embodiments, the outdoor temperature parameter may be outside air temperature, or a pressure dependent on the outdoor temperature, such as condenser pressure, as examples. Still further, some embodiments may include an act of varying the boost speed as a function of an outdoor temperature parameter. For example, in a cooling mode, it may be possible to run at a higher boost speed, without overstressing equipment, if the outdoor air temperature, or specifically, if the condenser coil temperature, is lower.

Further, in method 10, if the compressor speed did not change during the immediate prior run (e.g., evaluated in act 115), and if the prior run final compressor speed was the boost speed (e.g., evaluated in act 116), the act of operating the compressor during the current run signal at the high speed (e.g., act 123 and 104) may be performed regardless of an outdoor temperature parameter (e.g., TC). Even further, in some embodiments, including in method 10, if the compressor speed did not change during the immediate prior run (e.g., evaluated in act 115), and if the prior run final compressor speed was the boost speed (e.g., evaluated in act 116), the act of operating the compressor during the current run signal at the high speed (e.g., act 123 and 104) is performed regardless of the prior run time (e.g., RT).

In various embodiments, the HVAC unit has a variable-speed drive for the compressor, but the HVAC unit operates the compressor at only a limited whole number of steady compressor speeds. These steady compressor speeds may include the low speed and the high speed, for example. Further, in a number of embodiments, the high speed is higher than the low speed and the boost speed is higher than the high speed. In certain embodiments, the predetermined high speed minimum desired operating time (e.g., th used in act 118) may be less than the predetermined low speed maximum desired operating time (e.g., tl used in act 111). Further, in a number of embodiments, the predetermined high speed minimum desired operating time (e.g., th used in act 118) may be less than the predetermined high speed maximum desired operating time (e.g., thh used in act 109). For instance, the predetermined high speed minimum desired operating time (e.g., th used in act 118) may be about 15 minutes, the predetermined low speed maximum desired operating time (e.g., tl used in act 111) may be about 60 minutes, and the predetermined high speed maximum desired operating time (e.g., thh used in act 109) may be about 90 minutes, as examples.

Figure 2:
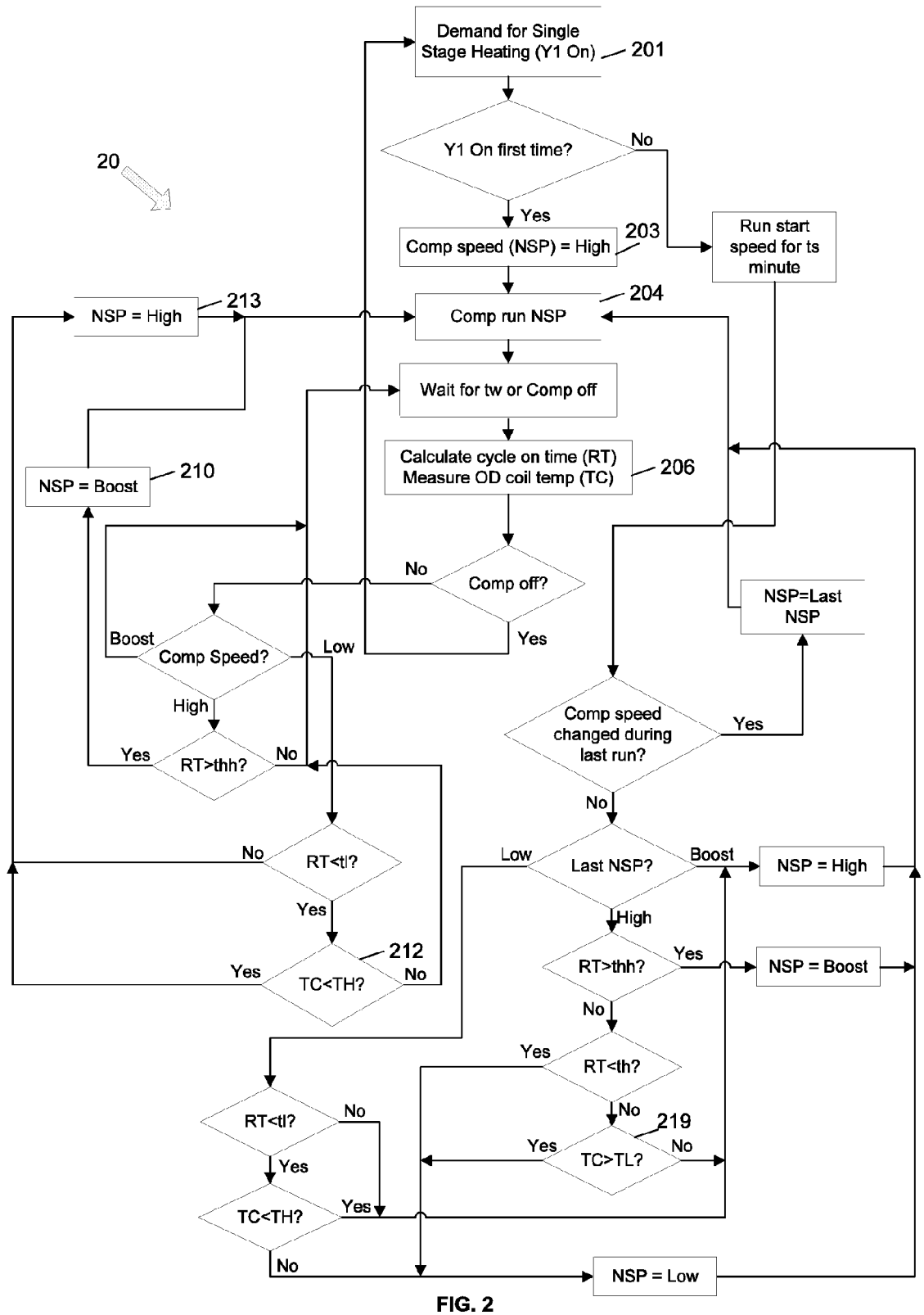
FIG. 2 is a flow chart illustrating an example of a method of controlling a heat pump operating in a heating mode using a single-stage thermostat, in which the unit selects between a low speed, a high speed, and a boost speed.

Method 10 illustrated in FIG. 1 may be performed by an air conditioning unit that is not a heat pump, or by a heat pump operating in a cooling mode (e.g., operating as an air conditioning unit). FIG. 2 illustrates a similar method, method 20, being performed by a heat pump operating in a heating mode. In method 20, however, TL (e.g., of act 219) may be about 30 degrees F., and TH (e.g., of act 212) may also be about 30 degrees F. In addition, in acts 212 and 219 of method 20, the greater than sign, or less than sign, is reversed from corresponding acts 112 and 119 of method 10. Various methods described herein may be performed either in a heating mode or in a cooling mode.

Figure 3:
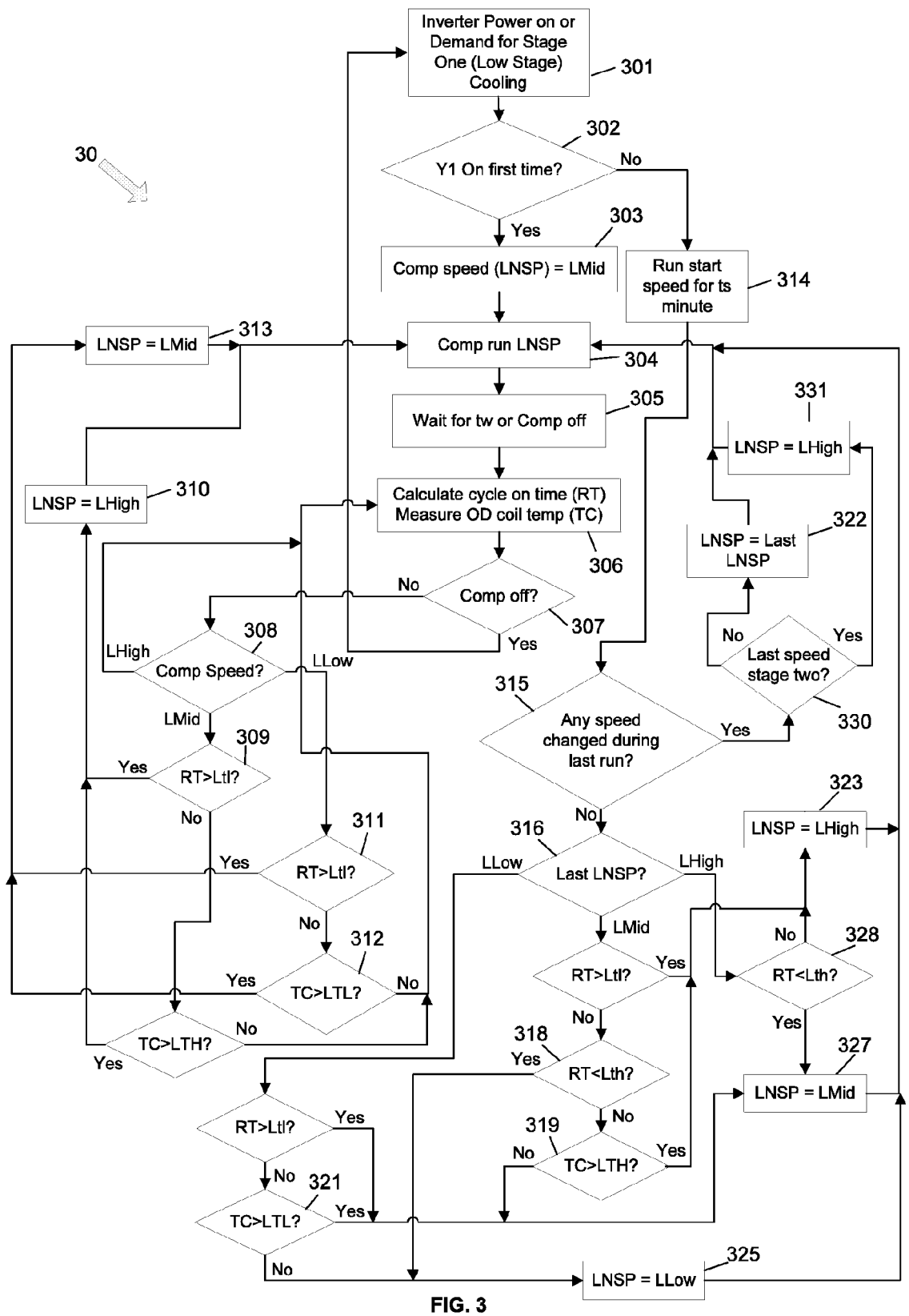
FIG. 3 is a flow chart illustrating an example of a method of controlling an air conditioning unit or a heat pump operating in a cooling mode using a two-stage thermostat, wherein stage one cooling is called for, and in which the unit selects between an L low speed, an L mid speed, and an L high speed.
Figure 4:
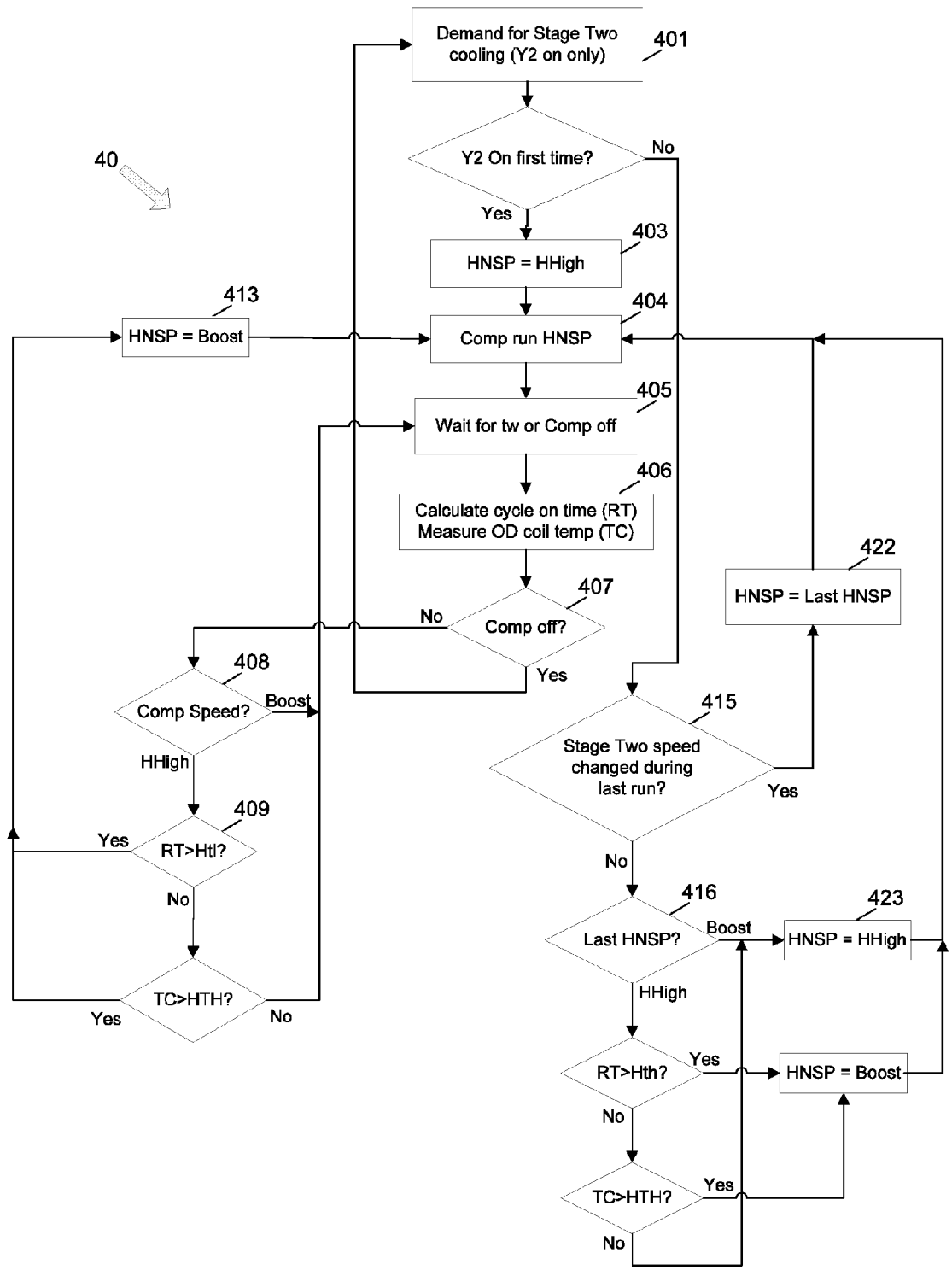
FIG. 4 is a flow chart illustrating an example of a method of controlling an air conditioning unit or a heat pump operating in a cooling mode using a two-stage thermostat, wherein stage two cooling is called for, and in which the unit selects between an H high speed and a boost speed.

FIGS. 3-6 illustrate examples of methods that use a two-stage thermostat to control an HVAC unit. Specifically, FIG. 3 illustrates method 30 that uses a two-stage thermostat to control an HVAC unit operating in a cooling mode, when stage one is demanded by the thermostat, and FIG. 4 illustrates method 40 that uses a two-stage thermostat to control an HVAC unit operating in a cooling mode, when stage two is demanded by the thermostat. As another example, method 30 and method 40 may be combined to provide a method that uses a two-stage thermostat to control an HVAC unit operating in a cooling mode, when either stage one or stage two is demanded by the thermostat.

Figure 5:
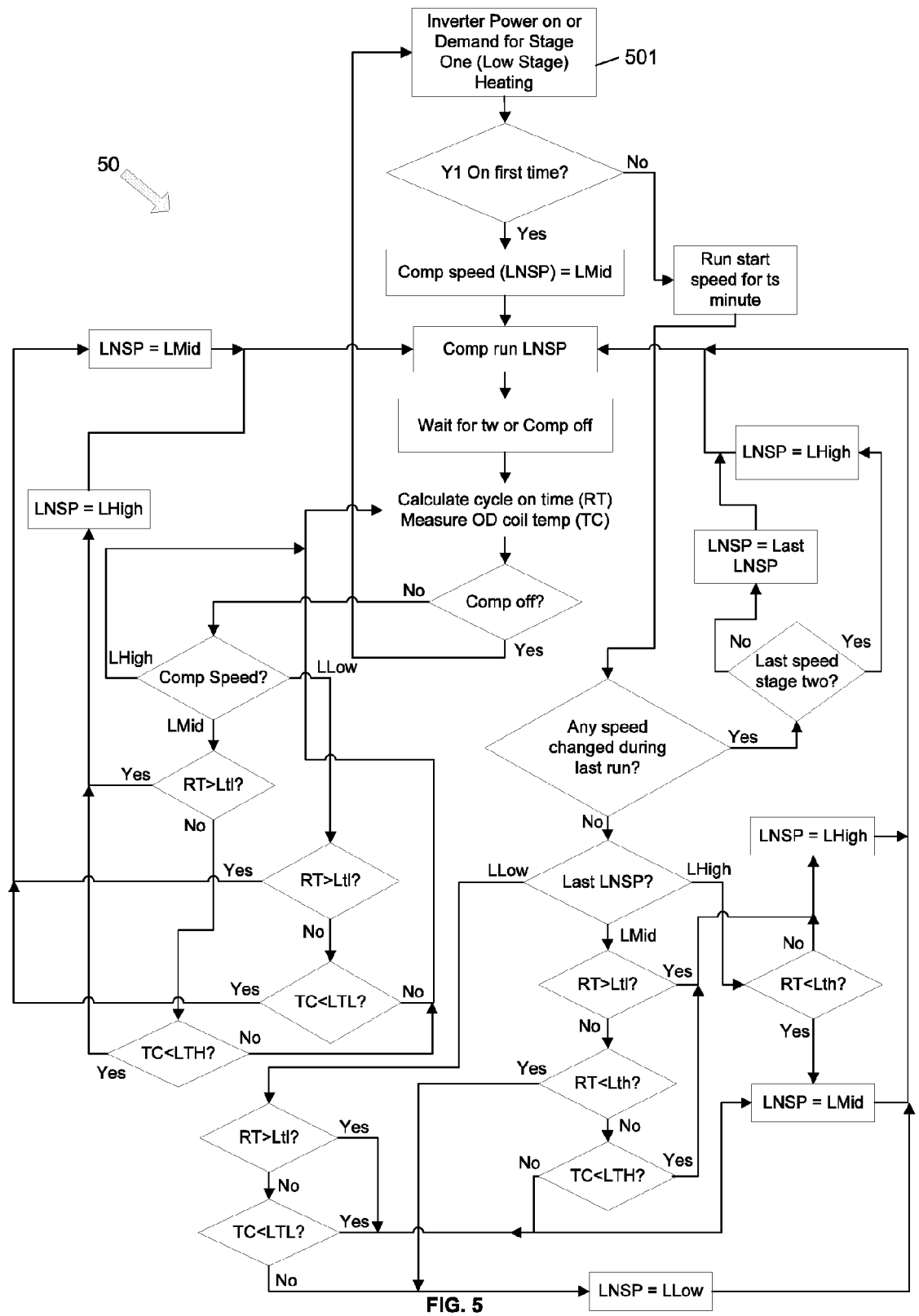
FIG. 5 is a flow chart illustrating an example of a method of controlling a heat pump operating in a heating mode using a two-stage thermostat, wherein stage one heating is called for, and in which the unit selects between an L low speed, an L mid speed, and an L high speed.
Figure 6:
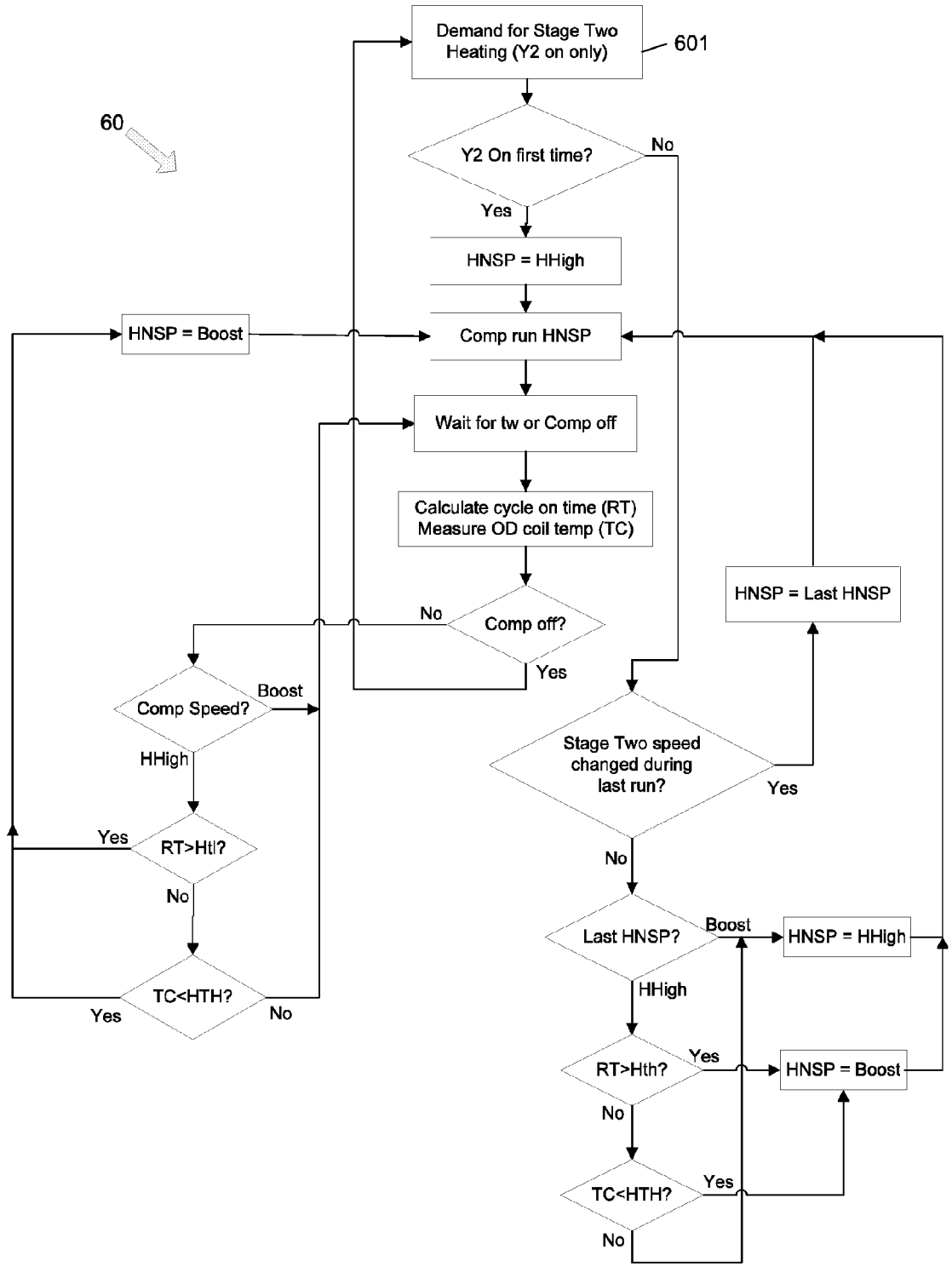
FIG. 6 is a flow chart illustrating an example of a method of controlling a heat pump operating in a cooling mode using a two-stage thermostat, wherein stage two heating is called for, and in which the unit selects between an H high speed and a boost speed

Moreover, FIG. 5 illustrates method 50 that uses a two-stage thermostat to control an HVAC unit operating in a heating mode, when stage one is demanded by the thermostat, and FIG. 6 illustrates method 60 that uses a two-stage thermostat to control an HVAC unit operating in a heating mode, when stage two is demanded by the thermostat. As another example, method 50 and method 60 may be combined to provide a method that uses a two-stage thermostat to control an HVAC unit operating in a heating mode, when either stage one or stage two is demanded by the thermostat. As yet another example, methods 30, 40, 50, and 60 may be combined to provide a method that uses a two-stage thermostat to control an HVAC unit operating in either a cooling mode or a heating mode, when either stage one or stage two is demanded by the thermostat.

Specifically, FIGS. 3-6 illustrate various methods of controlling an HVAC unit (e.g., having a compressor), that operate the compressor at multiple compressor speeds, the multiple compressor speeds including an L low speed, an L mid speed, an L high speed, an H high speed, and a boost speed. In such embodiments, the HVAC unit (e.g., the controller of the HVAC unit) may be configured to operate the compressor using a signal from a two-speed or two-stage thermostat, for example, and to select a current compressor speed from the multiple compressor speeds.

In the embodiment illustrated, method 30 includes, for example, at least certain acts, which include, for example, when a current run signal is received from the thermostat (e.g., in act 301), starting the compressor (e.g., in act 303 or 304), and evaluating whether the thermostat is calling for stage one or stage two. If the thermostat is calling for stage one (e.g., detected in act 301), method 30 includes an act of evaluating whether the thermostat called for stage two after a start of an immediate prior run (e.g., in act 315 or 330), and if the thermostat called for stage two after the start of the immediate prior run (e.g., during the immediate prior run), the method includes operating the compressor at the L High speed during the current run signal (e.g., act 331 and 304).

Further, if the thermostat is calling for stage one, and if the thermostat has not called for stage two since before the immediate prior run (e.g., determined in act 315 or 330), the method includes an act of evaluating whether the compressor speed changed during the immediate prior run (e.g., determined in act 315 or 330, for instance, wherein the immediate prior run had a prior run final compressor speed and a prior run time). If the compressor speed changed during the immediate prior run, the method includes operating the compressor at the prior run final compressor speed during the current run signal (e.g., in act 322 or 304). Thus, if the speed changed during the prior run, then the unit is operated (at least initially) during the current run at the same speed as the end of the prior run.

Furthermore, if the thermostat is calling for stage one (e.g., determined in act 301), if the thermostat has not called for stage two since before the immediate prior run (e.g., determined in act 330), and if the compressor speed did not change during the immediate prior run (e.g., determined in act 315), method 30 includes an act of evaluating whether the prior run final compressor speed was the L low speed, the L mid speed, or the L high speed (e.g., act 316). If the prior run final compressor speed was the L mid speed (e.g., determined in act 316), method 30 includes evaluating whether the prior run time (e.g., RT) was less than a predetermined L mid speed minimum desired operating time (e.g., in act 318, for instance, 20 minutes). If the prior run time was less than the predetermined L mid speed minimum desired operating time (e.g., determined in act 318), the method includes operating the compressor at the L low speed during the current run signal (e.g., act 325 and 304).

Even further, if the thermostat is calling for stage one (e.g., determined in act 301), if the thermostat has not called for stage two since before the immediate prior run (e.g., determined in act 315 or 330), if the compressor speed did not change during the immediate prior run (e.g., determined in act 315), and if the prior run final compressor speed was the L high speed (e.g., determined in act 316), method 30 includes an act of evaluating whether the prior run time was less than a predetermined L high speed minimum desired operating time (e.g., act 328). If the prior run time (e.g., RT) was less than the predetermined L high speed minimum desired operating time (e.g., 20 minutes, as determined in act 328), method 30 includes an act of operating the compressor at the L mid speed during the current run signal (e.g., act 327 and 304).

In FIG. 4, if the thermostat is calling for stage two (e.g., determined in act 401), and if the thermostat did not call for stage two during the immediate prior run (e.g., determined in act 415), method 40 includes an act of operating the compressor at the H high compressor speed during the current run signal (e.g., act 423 and 404). Still further, method 30 includes measuring a current speed operating time during the current run signal (e.g., act 306), and if the current compressor speed is the L low speed (e.g., determined in act 308), and if the current speed operating time is greater than a predetermined L low speed maximum desired operating time (e.g., determined in act 311), method 30 includes an act of increasing the compressor speed to the L mid speed during the current run signal (e.g., in act 313). Further, if the current compressor speed is the L mid speed (e.g., determined in act 308), and if the current speed operating time is greater than a predetermined L mid speed maximum desired operating time (e.g., determined in act 309, for example, 60 minutes), method 30 includes an act of increasing the compressor speed to the L high speed during the current run signal (e.g., act 310). Turning to FIG. 4, in some embodiments, if the current compressor speed is the H high speed (e.g., determined in act 408), and if the current speed operating time is greater than a predetermined H high speed maximum desired operating time (e.g., determined in act 409), method 40 includes increasing the compressor speed to the boost speed during the current run signal (e.g., in act 413). In a number of embodiments, after the current run signal is no longer received from the thermostat (e.g., in act 307, 407), such a method may further include acts of stopping the compressor and repeating the above acts when the run signal is restored (e.g., in act 301, or 401).

In certain embodiments, a method includes, for example, when the current run signal is first received from the thermostat (e.g., in act 301, or determined in act 302), acts of starting the compressor, ramping the compressor up to a start speed, and operating the compressor for a predetermined desired start time (e.g., ts) at a particular start speed (e.g., in act 314). In some embodiments, for example, the start speed is always substantially the same, for instance, regardless of the prior run final compressor speed. Further, in a number of embodiments, the HVAC unit has a variable-speed drive for the compressor, and the HVAC unit operates the compressor at only a limited whole number of steady compressor speeds. The steady compressor speeds may include, for example, the L low speed, the L mid speed, the L high speed and the H high speed. In some embodiments, the start speed may be another steady compressor speed.

In particular embodiments, the L mid speed may be higher than the L low speed, the L high speed may be higher than the L mid speed, the H high speed may be higher than the L high speed, and the boost speed may be higher than the H high speed, for example. In different embodiments, the boost speed may also be one of the limited number of steady compressor speeds, or in some embodiments, the boost speed may change (e.g., depending on the outdoor temperature parameter or the temperature of the outdoor coil). In other words, some embodiments, the method may include an act of varying the boost speed as a function of the outdoor temperature parameter.

In certain embodiments, the method includes, for example, operating the compressor at no steady speeds other than the L low speed, the L mid speed, the L high speed, the H high speed, the boost speed, and the start speed. In method 30, for example, the start speed (e.g., run in act 314) is the L mid speed. In other embodiments, however, the start speed may be the L low speed, the L high speed, between the L low speed and the L mid speed, between the L low speed and the L high speed, or between the L mid speed and the L high speed, as other examples.

In some embodiments, the HVAC unit may have a two-speed indoor air fan, for example, configured to operate at a low speed and at a high speed, and the method may include, for instance, operating the indoor air fan at the low speed when the compressor is operating at the L low speed, and operating the indoor air fan at the low speed when the compressor is operating at the L mid speed. Such a method may also include operating the indoor air fan at the high speed when the compressor is operating at the H high speed, and operating the indoor air fan at the high speed when the compressor is operating at the boost speed. In some embodiments, the indoor air fan may be operated at the low speed when the compressor is operating at the L high speed. On the other hand, in other embodiments, the indoor air fan may be operated at the high speed when the compressor is operating at the L high speed.

Further, in some embodiments, such a method may further include, for example, if the compressor speed did not change during the immediate prior run (e.g., determined in act 315), evaluating whether an outdoor temperature parameter is beyond a first threshold (e.g., act 319 or 321, for example, above 100 degrees F.). If the outdoor temperature parameter is beyond the first threshold, such a method (e.g., 30) may include operating the compressor at a higher speed during the current run signal (e.g., at the L high speed, in act 323, or at the L mid speed, in act 327). In particular embodiments, the HVAC unit has an outdoor coil and the outdoor temperature parameter is a temperature of the outdoor coil. In other embodiments, the outdoor temperature parameter may be outside air temperature, or a pressure dependent on the outdoor temperature, such as condenser pressure, as examples.

Moreover, in some embodiments, such a method may further include, for example, if the thermostat is calling for stage two, if the thermostat called for stage two during the immediate prior run (e.g., determined in act 330), and if the compressor speed did not change during stage two of the immediate prior run (e.g., as determined in act 415), an act of operating the compressor at the H high speed during the current run signal (e.g., acts 423 and 404), in this embodiment, regardless of the outdoor temperature parameter.

In some methods, if the thermostat is calling for stage two, if the thermostat called for stage two during the immediate prior run, and if the compressor speed changed (e.g., determined in act 415) during stage two of the immediate prior run (e.g., from H high to the boost speed), the method includes an act of operating the compressor at the boost speed during the current run signal (e.g., act 422). In some embodiments, this may be done, for example, without first operating the compressor at the H high speed for the predetermined H high speed maximum desired operating time (e.g., through act 409 and 413). Further, in some embodiments, if the thermostat is calling for stage two, if the thermostat called for stage two during the immediate prior run, and if the compressor speed did not change during stage two of the immediate prior run (e.g., determined in act 415), the method (e.g., method 40) includes operating the compressor (e.g., at least initially) at the H high speed during the current run signal (e.g., in act 423). In particular embodiments, for instance, the act of operating the compressor during the current run signal at the H high speed may be performed regardless of the prior run time.

Methods 50 and 60 shown in FIGS. 5 and 6 are similar to methods 30 and 40 except that the HVAC unit is operating in a heating mode rather than a cooling mode. In method 50, LHL and LTH may be 30 degrees F., Ltl may be 60 minutes, Lth may be 20 minutes, and tw may be two minutes, or about such values, as examples. In method 60, HTH may be 25 degrees F., Htl may be 60 minutes, Hth may be 20 minutes, and tw may be two minutes, or about such values, as examples. In different embodiments tw may be 1, 2, 3, 4, 5, 10, 15, 20, 25, 30, 35, 40, 45 or 50 seconds, or 1, 1.25, 1.5, 2, 2.5, 3, 4, or 5 minutes, as examples. In a number of embodiments, tw may be between one second and 20 minutes, between one second and 10 minutes, between one second and 5 minutes, between one second and 2 minutes, between one second and 1 minutes, between ten seconds and 2 minutes, or between thirty seconds and 5 minutes, as examples.

The appropriate acts of methods 30, 40, 50, and 60 may be repeated or cycled through at regular intervals of time, for example (e.g., tw in act 305 or 405). Such an interval may be (e.g., tw) every two (2) minutes, for example. Further, the run times used, (e.g., in acts 306, 309, 311, 318, and 409) may be a time at a particular compressor speed, rather than a total run time of the compressor at different speeds. Further, some methods apply to either single stage thermostat control, or two-stage thermostat control. In fact, some embodiments may apply to other numbers of stages of thermostats, such as three stages or four stages, as examples. Such methods may include acts from various of the methods shown in the drawings or described herein, as examples.

Although, FIGS. 3-6 illustrate various methods of controlling an HVAC unit that operate the compressor at multiple compressor speeds including an L low speed, an L mid speed, an L high speed, an H high speed, and a boost speed, other embodiments may have a different number of compressor speeds. For example, in a number of embodiments, there may be additional compressor speeds besides these specific speeds. In particular embodiments, there may be additional stage one speeds, for instance. For example, in some embodiments, there may be multiple L mid speeds, for instance, between the L low speed and the L high speed. For instance, different embodiments may have 1, 2, 3, 4, 5, 6, 7, 8, 9, or 10 different L mid speeds, for example, between the L low speed and the L high speed. In some embodiments, multiple L mid speeds may be spaced (e.g., evenly or proportionally) between the L low and L high speeds, for example. In various such embodiments, the system, method, or controller may change between different L mid speeds similarly to the description herein of the changes between the L low, L mid, and L high speeds, for example.

Furthermore, various embodiments include methods of controlling an air conditioning unit or HVAC unit, for example, to reduce the use of electricity while maintaining space temperature within a desired range. Such a method may include, for example, certain acts, which may be performed, for example, in the order indicated. Such acts may include, in a number of embodiments, receiving an on-signal from a thermostat located within the space (e.g., act 101, 201, 301, 401, 501, or 601), operating the unit at an operating speed (e.g., 103, 104, 203, 204, 303, 304, 403, or 404), measuring how long the unit operates (e.g., 106, 206, 306, or 406), increasing the operating speed (e.g., act 110, 113, 210, 213, 310, or 313), receiving an off-signal (e.g., in act 107, 207, 307, or 407), and stopping operation of the unit. Such acts may also include receiving another on-signal from the thermostat (e.g., act 101, 201, 301, 401, 501, or 601), setting the compressor speed (e.g., in act 122, 123, 322, 323, 327, 331, 422, or 423) returning to the act of measuring how long the unit operates (e.g., 106, 206, 306, or 406), and repeating that act and the acts stated above that follow.

In particular, the act of operating the unit at an operating speed (e.g., 103, 104, 203, 204, 303, 304, 403, or 404) may include running a compressor motor driving a compressor at a compressor speed, and running an (e.g., evaporator) fan motor at a blower speed. The fan motor may drive an evaporator fan, for example, that moves indoor air through an evaporator and to the space. Further the act of operating the unit may include running an outdoor or condenser fan motor at a condenser fan speed, for example. The condenser fan motor may drive a condenser fan that moves outdoor air through a condenser, for example.

Further, after the act of measuring how long the unit operates (e.g., 106, 206, 306, or 406), if the unit operates for longer than a predetermined maximum desired operating time (e.g., as determined in act 109, 111, 309, 311, or 409, for example, a 60 or 90 minutes), and if the unit is not already operating at a maximum operating speed (e.g., boost), the method may include increasing the operating speed (e.g., in act 110, 113, 210, 213, 310, 313, or 413), which may include increasing the compressor speed. In a number of embodiments, the act (e.g., after receiving the off-signal) of stopping operation of the unit, marks an end to an operating cycle having a final compressor speed at the time the off-signal is received. Furthermore, the act of stopping operation may include turning off the compressor motor, turning off the evaporator fan motor, and turning off the condenser fan motor, for instance.

Furthermore, after receiving an (e.g., another) on-signal from the thermostat located within the space (e.g., in act 101, 201, 301, 401, 501, or 601), various methods may include operating the unit at the operating speed (e.g., act 104, 204, 304, or 404). If the compressor speed was changed during an immediately previous operating cycle (e.g., determined in act 115, 315, or 415), the compressor speed may be set at the final compressor speed of the immediately previous operating cycle (e.g., act 122, 322, or 422). On the other hand, if the compressor speed was not changed during the immediately previous operating cycle (e.g., determined in act 115, 315, or 415), if the unit operated for less than a predetermined minimum desired operating time during the immediately previous operating cycle (e.g., determined in act 118, 318, or 328) and if the unit did not operate at a minimum non-zero operating speed during the immediately previous operating cycle (e.g., low or L low), the method may include decreasing the compressor speed from the final compressor speed of the immediately previous operating cycle (e.g., in act 125, 325, or 327).

Moreover, in a number of embodiments, if the compressor speed was not changed during the immediately previous operating cycle (e.g., determined in act 115, 315, or 415), if the unit operated for more than the predetermined minimum desired operating time during the immediately previous operating cycle (e.g., evaluated in act 118, 318, or 328), and if the unit did not operate at a maximum non-zero operating speed during the immediately previous operating cycle (e.g., the boost speed, as determined in act 116 or 416), the compressor speed may be set at the final compressor speed of the immediately previous operating cycle (e.g., in act 123, 323, 325, or 327). After such acts, the method may return to the act described above of measuring how long the unit operates (e.g., act 106, 306, or 406), and repeating that act and the acts that follow.

In particular embodiments, the available non-zero compressor speeds may include, or consist of, a low speed, a high speed, and a boost speed, and the low speed may be the minimum non-zero speed, while the boost speed is the maximum speed. Method 10 in FIG. 1 is an example of such an embodiment. Further, in some embodiments, such a method may further include, for example, an act of measuring a coil temperature at the condenser (e.g., act 106). In various embodiments, for example, the act of operating the unit at the operating speed may include, for instance, selecting a higher compressor speed (e.g., in acts 112 and 113) if the coil temperature exceeds a first threshold temperature, and selecting a lower compressor speed (e.g., act 112 to act 105) if the coil temperature is below the first threshold temperature.

In other embodiments, however, temperature may not be measured (e.g., in act 106, 206, 306, or 406) or used to determine speed (e.g., in act 112, 119, 212, 219, 312, 319, 321 or a combination thereof). Further, in a number of embodiments, the control algorithm (e.g., method 10, 20, 30, 40, 50, 60, or a combination thereof) may work satisfactorily without measuring or using an outdoor temperature. Some embodiments may omit act 112, 119, 212, 219, 312, 319, 321 or a combination thereof, and some embodiments may omit measuring a temperature (e.g., in act 106, 206, 306, or 406), or a combination thereof.

Further, in some embodiments, if the compressor speed was not changed during the immediately previous operating cycle (e.g., determined in act 115), and if the unit operated at the maximum non-zero operating speed during the immediately previous operating cycle (e.g., the boost speed, for instance, as determined in act 116), the operating speed may be decreased from the immediately previous operating cycle, including decreasing the compressor speed (e.g., to the high speed, for instance, in act 123). In some embodiments, this may occur, for example, even if the unit operated for longer than the predetermined minimum desired operating time (e.g., th, for instance, 15 minutes) during the immediately previous operating cycle, or in certain embodiments, even if the unit operated for longer than the predetermined maximum desired operating time (e.g., thh, for instance, 90 minutes) during the immediately previous operating cycle.

Other specific embodiments include various methods of controlling an HVAC unit and HVAC units that have controllers configured to perform such methods. Such an HVAC unit may have a compressor that the HVAC unit, or the controller therefore, operates at multiple compressor speeds, for example, the multiple compressor speeds including a low speed, a high speed, and a boost speed. In a number of embodiments, the HVAC unit, or a controller therefore, is configured to operate the compressor using a signal from a discrete-speed thermostat (e.g., a single-stage, two-stage, or three-stage thermostat) and to select a current compressor speed from the multiple compressor speeds. Such a method may include, for example, at least certain acts that may be commanded or performed, for instance, by a controller of the HVAC unit.

Such acts may include, for example, when a current run signal is received from the thermostat (e.g., act 101, 201, 301, 401, 501, or 601), starting the compressor, and performing certain acts of evaluating particular conditions and operating the compressor or changing the compressor speed based on those conditions. In particular, such acts may include evaluating (e.g., in act 115, 315, 330, or 415) whether the compressor speed changed during the immediate prior run. In a number of embodiments, the immediate prior run may have had a prior run final compressor speed and a prior run time, which may be used in some embodiments (e.g., automatically, by the controller) to determine a speed to operate the compressor, (e.g., at least initially) during a current run signal or on cycle). In various embodiments, for example, if the compressor speed changed (e.g., determined in act 115, 315, 330, or 415) during the immediate prior run, such a method may include operating the compressor at the prior run final compressor speed during the current run signal (e.g., act 122, 322, or 422).

Another such act involves evaluating whether the prior run final compressor speed was the high speed (e.g., act 116 or 316), and if the prior run final compressor speed was the high speed, and if the compressor speed did not change during the immediate prior run, evaluating whether the prior run time was less than a predetermined high speed minimum desired operating time (e.g., in act 118 or 328). Further, if the prior run time was less than the predetermined high speed minimum desired operating time, the method may include operating the compressor at a lower speed during the current run signal (e.g., in act 125 and 104, 325 and 304, or 327 and 304).

Another such act may include measuring a current speed operating time during the current run signal (e.g., in act 106, 206, 306, or 406), and if the current compressor speed is the low speed (e.g., determined in act 108 or 308), and if the current speed operating time is greater than a predetermined low speed maximum desired operating time (e.g., determined in act 111 or 311), increasing the compressor speed during the current run signal (e.g., in act 113 or 313). Yet another such act involves measuring the current speed operating time during the current run signal, and if the current compressor speed is the high speed (e.g., determined in act 108 or 408), and if the current speed operating time is greater than a predetermined high speed maximum desired operating time (e.g., determined in act 109 or 409), increasing the compressor speed during the current run signal (e.g., in act 110 or 413, for instance, to the boost speed). Such a method may further include, after the current run signal is no longer received from the thermostat (e.g., as determined in act 107, 307, or 407), stopping the compressor and repeating the above acts when the run signal is restored (e.g., in act 101, 301, or 401).

In a number of embodiments, the high speed is higher than the low speed, and the boost speed is higher than the high speed. Further, in some embodiments, the HVAC unit may be configured to operate the compressor using a signal from a single-speed thermostat. Method 10 in FIG. 1 is an example of such an embodiment. In this embodiment, method 10 further includes, for instance, act 116 of evaluating whether the prior run final compressor speed was the boost speed. Moreover, if the prior run final compressor speed was the boost speed, and if the compressor speed did not change during the immediate prior run (e.g., determined in act 115), method 10 includes operating the compressor at the high speed (e.g., in act 123 and 104) during the current run signal, for example, regardless of the prior run time (e.g., RT). Other embodiments may differ in this regard. Other embodiments, for example, may repeat operation at the boost speed (e.g., in subsequent run signals), for instance, until the prior run time drops below a predetermined boost speed minimum desired operating time. In some such embodiments, the predetermined high speed minimum desired operating time may be more than the predetermined boost speed minimum desired operating time, however.

FIGS. 3-6 illustrate other embodiments wherein the low speed is an L low speed, the high speed may be an L high speed or an H high speed, and the multiple compressor speeds further include an L mid speed, and an L high speed or an H high speed. In many such embodiments, the L mid speed is higher than the L low speed, the L high speed is higher than the L mid speed, the H high speed is higher than the L high speed, and the boost speed is higher than the H high speed, for example. Further, the HVAC unit may be configured to operate the compressor using a signal from a two-speed or two-stage thermostat. Such methods may include acts of evaluating whether the thermostat is calling for stage one or stage two (e.g., in acts 301 and 401), and if the thermostat is calling for stage one (e.g., determined in act 301), evaluating whether the thermostat called for stage two after a start of an immediate prior run (e.g., act 315 or 330). Further, if the thermostat called for stage two after the start of the immediate prior run (e.g., determined in act 330), the method may include operating the compressor at the L High speed (e.g., in act 331) during the current run signal.

Moreover, in some embodiments, if the thermostat is calling for stage two, and if the thermostat did not call for stage two during the immediate prior run, the method may include operating the compressor at the H high compressor speed during the current run signal. Even further, in some embodiments, if the thermostat is calling for stage two (e.g., determined in act 401), if the thermostat called for stage two during the immediate prior run, and if the compressor speed changed during stage two of the immediate prior run (e.g., determined in act 415), the method includes operating the compressor at the boost speed during the current run signal (e.g., act 422 and 404).

Such methods may also include measuring the current speed operating time during the current run signal (e.g., in act 306 or 406). In a number of embodiments, if the current compressor speed is the L mid speed (e.g., determined in act 308) and if the current speed operating time (e.g., RT) is greater than a predetermined L mid speed maximum desired operating time (e.g., Ltl, for instance, 60 minutes, for example, determined in act 309), the method includes increasing the compressor speed to the L high speed during the current run signal (e.g., in act 310). Such a method may also include measuring the current speed operating time during the current run signal (e.g., in act 406 shown in FIG. 4), and if the current compressor speed is the H high speed (e.g., determined in act 408), and if the current speed operating time (e.g., RT) is greater than a predetermined H high speed maximum desired operating time (e.g., Htl, for instance, 60 minutes, for example, determined in act 409) increasing the compressor speed to the boost speed during the current run signal (e.g., in act 413).

In a number of embodiments, the HVAC unit may have a two-speed indoor air fan configured to operate at a low speed and at a high speed, and the method includes, for instance, operating the indoor air fan at the low speed when the compressor is operating at the L low speed, and operating the indoor air fan at the low speed when the compressor is operating at the L mid speed. Such a method may also include, for example, operating the indoor air fan at the high speed when the compressor is operating at the H high speed, and operating the indoor air fan at the high speed when the compressor is operating at the boost speed. In some embodiments, the indoor air fan may be operated at the low speed when the compressor is operating at the L high speed, while in other embodiments, the indoor air fan may be operated at the high speed when the compressor is operating at the L high speed.

Furthermore, in certain embodiments, if the thermostat is calling for stage two (e.g., determined in act 401), if the thermostat called for stage two during the immediate prior run, and if the compressor speed did not change during stage two of the immediate prior run (e.g., determined in act 415), the method includes operating the compressor at the H high speed (e.g., in act 423 and 404) during the current run signal. In some embodiments, this act of operating the compressor during the current run signal at the H high speed (e.g., in act 423 and 404) may be performed regardless of the prior run time (e.g., RT), for example. Such acts may be performed, for example, by a controller of an HVAC unit, and various embodiments include an HVAC unit with a controller configured to perform such acts. Other embodiments may differ, examples of which are described herein.

FIGS. 3-6 and methods 30, 40, 50, and 60, also illustrate examples of methods of controlling an HVAC unit (e.g., having a compressor that the HVAC unit operates at multiple compressor speeds) using a two-stage thermostat in which the multiple compressor speeds include at least two different non-zero compressor speeds for stage one, and at least one non-zero compressor speed for stage two. In the embodiment illustrated, the at least two different non-zero compressor speeds for stage one include the L low, L mid, and L high speeds, and the at least one non-zero compressor speed for stage two includes the H high and Boost (boost) speeds. Other embodiments, however, may have a different number of different non-zero compressor speeds for stage one, a different number of non-zero compressor speed for stage two, or both. For example, other embodiments may have 2, 4, 5, 6, 7, 8, 9, 10, 11, or 12 different non-zero compressor speeds for stage one, 1, 3, 4, 5, 6, 7, 8, 9, or 10 non-zero compressor speed for stage two, or a combination thereof, as examples.

In a number of embodiments, the at least two different non-zero compressor speeds for stage one may include a highest compressor speed for stage one (e.g., L high) and a lowest compressor speed for stage one (e.g., L low). Moreover, in various embodiments, the at least one non-zero compressor speed for stage two may includes a highest compressor speed for stage two (e.g., the boost speed). In certain embodiments, where there is only one non-zero compressor speed for stage two, the highest compressor speed for stage two (as used herein) is the only non-zero compressor speed for stage two. Further, in methods 30, 40, 50, and 60, as described, the HVAC unit is configured to operate the compressor using a signal from a two-stage thermostat (e.g., a thermostat configured for a two-speed discrete-speed HVAC unit) and to select a current compressor speed from the multiple compressor speeds (e.g., the at least two different non-zero compressor speeds for stage one and the at least one non-zero compressor speed for stage two).

In the embodiments illustrated, methods 30, 40, 50, and 60 include, for example, at least certain acts that include, when a current run signal is received from the thermostat (e.g., in act 301, 401, 501, or 601, or determined in act 302), starting the compressor, and performing certain acts of evaluating particular conditions and operating the compressor, selecting the compressor speed, or changing the compressor speed based on those conditions. In particular, such acts may include evaluating (e.g., determined in act 115, 315, or 415) whether the compressor stage changed (e.g., from stage one to stage two) during the immediate prior run. In a number of embodiments, the immediate prior run may have had a prior run final compressor speed and a prior run time, which may have been stored, for example, in digital memory. This act of evaluating whether the compressor stage changed during the immediate prior run may involve, for instance, recording whether the compressor stage changed during the immediate prior run, and accessing this information to make decisions, for example, concerning the compressor speed.

Further, in the embodiments illustrated, if the compressor stage changed (e.g., determined in act 115, 315, or 415, for instance, from stage one to stage two) during the immediate prior run, the method includes operating the compressor at the highest compressor speed for stage one (e.g., the L High speed; for example, in act 331 and 304) during the current run signal. The compressor may be operated, for example, at the highest compressor speed for stage one initially or after operating the compressor at a start speed, for instance. As described herein, however, in some embodiments, the compressor speed may be increased further, for example, after a period of time.

On the other hand, if the compressor stage did not change (e.g., stayed at stage one) during the immediate prior run (e.g., determined in act 115, 315, or 415), and if the prior run final compressor speed was not the lowest compressor speed for stage one (e.g., L Low), various methods may include evaluating (e.g., in act 318 or 328) whether the prior run time was less than a predetermined minimum desired operating time (e.g., Lth or 20 minutes), for example, for the prior run final compressor speed. For this purpose, the prior run time, or whether the prior run time was less than the predetermined minimum desired operating time may have been recorded, and this information may be accessed to make the determination or selection of the compressor speed, for example.

In some embodiments, the act of evaluating whether the prior run time was less than a predetermined minimum desired operating time may be performed only if the compressor stage did not change during the immediate prior run, and if the prior run final compressor speed was not the lowest compressor speed for stage one. In other embodiments, however, the act of evaluating whether the prior run time was less than a predetermined minimum desired operating time may be performed regardless of whether the compressor stage changed during the immediate prior run, regardless of whether the prior run final compressor speed was the lowest compressor speed for stage one, or both. In embodiments wherein the act of evaluating whether the prior run time was less than a predetermined minimum desired operating time is performed regardless of these other conditions, the other conditions may be used to determine the compressor speed, however.

In various embodiments, the predetermined minimum desired operating time may be the same for different speeds, may be different for stage one than for stage two (e.g., Lth and Hth), may be different for each different speed, or may be different for some speeds and the same for others. In particular embodiments, for example, the predetermined minimum desired operating time (e.g., for a particular compressor speed, Lth, or Hth) may be about 10, 15, 20, 25, 30, 35, or 40 minutes, as examples.

If (e.g., determined in act 318 or 328) the prior run time was greater than the predetermined minimum desired operating time (e.g., Lth, for instance, for the prior run final compressor speed), and, if the compressor stage did not change (e.g., stayed at stage one) during the immediate prior run, the method may include operating (e.g., in act 304) the compressor at a speed during the current run signal that is equal to, or the same as, the prior run final compressor speed. For example, if the prior run final compressor speed was the L high speed, then the compressor may be operated (e.g., at least initially, or after operation at a start speed) during the current run signal at the L high speed. Similarly, if the prior run final compressor speed was the L mid speed, then the compressor may be operated (e.g., at least initially, or after operation at a start speed) during the current run signal at the L mid speed. Moreover, if the prior run final compressor speed was the L low speed, then the compressor may be operated (e.g., at least initially, or after operation at a start speed) during the current run signal at the L low speed. Thus, in this embodiment, the compressor speed is selected (at least initially) to be the same as the prior run if the prior run time was greater than the predetermined minimum desired operating time.

In contrast, in this particular embodiment, if (e.g., in act 318 or 328) the prior run time was less than the predetermined minimum desired operating time (e.g., Lth, for instance, for the prior run final compressor speed), if the compressor stage did not change (e.g., stayed at stage one) during the immediate prior run, and if the prior run final compressor speed was not the lowest compressor speed for stage one (e.g., L Low), the method may include operating the compressor at a speed during the current run signal that is lower, for example, one step lower, than the prior run final compressor speed. For example, if the prior run final compressor speed was the L high speed, then the compressor may be operated (e.g., at least initially, or after operation at a start speed) during the current run signal at the L mid speed. Similarly, if the prior run final compressor speed was the L mid speed, then the compressor may be operated (e.g., at least initially, or after operation at a start speed) during the current run signal at the L low speed. Thus, under these circumstances, in this embodiment, the compressor speed is reduced from the prior run compressor speed, which may increase the run time, increase efficiency, reduce noise, provide a more stable temperature, or a combination thereof. As used herein, changing the compressor speed by one step, means raising or lowering the compressor speed to the closest speed (above or below) of the multiple compressor speeds that the HVAC unit or controller is configured to select from.

Another act that is illustrated, and that is found in some embodiments, involves measuring a current speed operating time during the current run signal (e.g., in act 306 or 406), and if the current compressor speed is not already the highest compressor speed for stage two (e.g., the boost speed, for example, determined in act 308 or 408)), and if the current speed operating time is greater than a predetermined maximum desired operating time (e.g., Ltl or Htl, for instance, in act 309, 311, or 409), for example, for the current speed (e.g., L low, L mid, or H high), increasing the compressor speed, for instance, by one step (e.g., in act 310, 313, or 413) during the current run signal.

In the embodiment illustrated, if the compressor speed is the L high speed (e.g., evaluated in act 308) or the highest compressor speed for stage one, the compressor speed does not increase further (e.g., to a stage two speed, such as H high) until and unless the thermostat calls for stage two. In other embodiments, on the other hand, the compressor speed may increase further (e.g., by one step, or to a stage two speed, such as H high) if a maximum desired operating time (e.g., for the particular current speed or for multiple or all of the speeds) is reached at the highest compressor speed for stage one (e.g., L high). In some embodiments, this speed increase may take place even if the thermostat does not call for stage two.

In various embodiments, the predetermined maximum desired operating time (e.g., Ltl or Htl) may be the same for different speeds, may be different for stage one and stage two (e.g., Ltl and Htl), may be different for each different speed, or may be different for some speeds and the same for others, as examples. In particular embodiments, for instance, the predetermined maximum desired operating time (e.g., for a particular compressor speed, Ltl, or Htl) may be about 30, 35, 40, 45, 50, 55, 60, 65, 70, 75, 80, 85, 90, 95, 100, 105, 110, 115, or 120 minutes, as examples. Further, in the embodiment illustrated, the method further includes, after the current run signal is no longer received from the thermostat (e.g., determined in act 307 or 407), stopping the compressor and repeating the above acts when the run signal is restored (e.g., in act 301, 401, 501, or 601).

In a number of embodiments, the highest compressor speed for stage two (e.g., the boost speed) is higher than (or in particular embodiments, higher than or equal to) the highest compressor speed for stage one (e.g., L high). Further, in a number of embodiments, the highest compressor speed for stage one (e.g., L high) is higher than the lowest compressor speed for stage one (e.g., L low). In the particular embodiment illustrated, L mid is higher than L low, L high is higher than L mid, H high is higher than L high, and Boost is higher than H high. Other embodiments may be similar or may differ.

In various embodiments, the HVAC unit may have a two-speed indoor air fan configured to operate at a low speed and at a high speed. Further, the method may include, for instance, operating the indoor air fan at the low speed when the compressor is operating at one of the at least two different non-zero compressor speeds for stage one. Even further, in certain embodiments, such a method may include for example, operating the indoor air fan at the high speed when the compressor is operating at the at least one non-zero compressor speed for stage two.

Further, in certain embodiments, the HVAC unit has an outdoor air fan that operates at multiple non-zero speeds. These speeds may include, for example, at least a first outdoor air fan speed and a second outdoor air fan speed. In different embodiments, the outdoor air fan may have a two or three speed motor, for example, or may have a variable-speed motor, or have a variable-speed drive, and may operate at different (e.g., steady) speeds, for instance, at different compressor speeds. In a number of embodiments, for example, the method may include operating the outdoor air fan at the first outdoor air fan speed when the compressor is operating at the lowest compressor speed for stage one. Further, various embodiments may include operating the outdoor air fan at the second outdoor air fan speed when the compressor is operating at the highest compressor speed for stage two. Even further, in a number of embodiments, the second outdoor air fan speed may be greater than the first outdoor air fan speed.

Moreover, in some embodiments, the method may include operating the outdoor air fan at the first outdoor air fan speed when the compressor is operating at the highest compressor speed for stage one. In contrast, in some embodiments, the method may include operating the outdoor air fan at the second outdoor air fan speed when the compressor is operating at the highest compressor speed for stage one. Whether the first outdoor air fan speed or the second outdoor air fan speed is used when the compressor is operating at the highest compressor speed for stage one may depend, for example, on which fan speed produces the highest efficiency at that compressor speed for that particular HVAC unit. On the other hand, in other embodiments, the method may include operating the outdoor air fan at a third outdoor air fan speed when the compressor is operating at the highest compressor speed for stage one. The third outdoor air fan speed may be greater than the first outdoor air fan speed but less than the second outdoor air fan speed, for example. In certain embodiments, the method may include operating the outdoor air fan at a different outdoor air fan speed for each different compressor speed, as another example.

Figure 7:
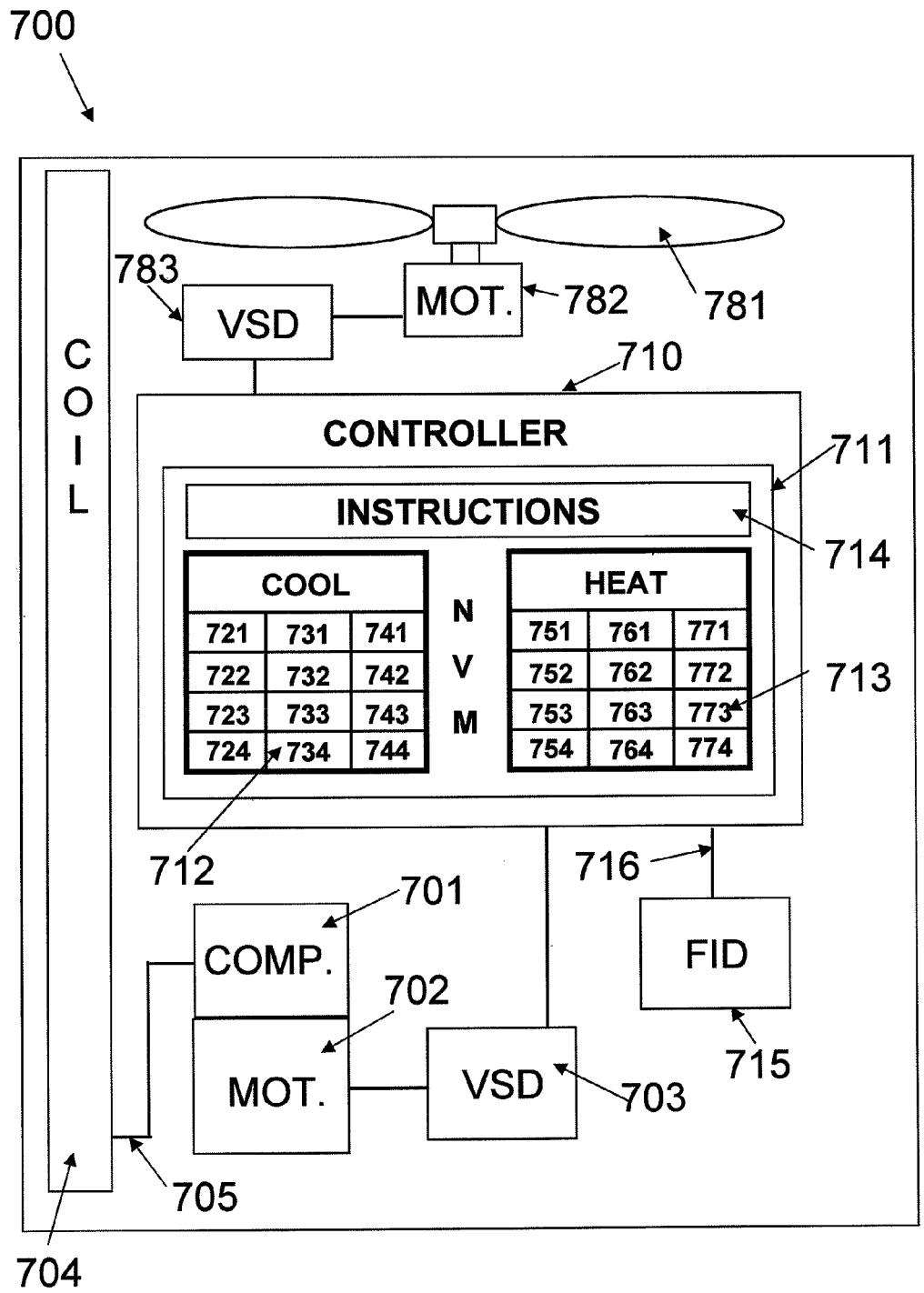
FIG. 7 is a block diagram illustrating an example of a heat pump that may provide improved efficiency performance in climates where demand for cooling and heating are substantially unequal.

FIG. 7 illustrates an example of a heat pump, heat pump 700, for instance, for providing improved efficiency performance in climates where demand for cooling and heating are substantially unequal. In the embodiment illustrated, heat pump 700 includes, for example, compressor 701 and compressor motor 702 that is mechanically connected to compressor 701 (e.g., via a common shaft). In the embodiment illustrated, heat pump 700 also includes variable-speed drive 703 (e.g., drive circuits), which is electrically connected to compressor motor 702, powering compressor motor 702. As used herein, a statement that a first component (e.g., variable-speed drive 703) of a heat pump (e.g., 700) acts or is acting on another component (e.g., "powering" compressor motor 702), means that the first component acts on the second component in that manner at least part of the time when the heat pump (e.g., 700) is in operation. Other examples of how a first component may act on another component, as used herein, include: changing speed, driving (e.g., compressor 701), operating a motor, storing data (e.g., particular speeds), allowing (e.g., a person to make certain selections), and checking (e.g., a pass code), as examples. As shown in FIG. 7, variable-speed drive 702 changes the speed of compressor motor 702, and thereby changes the speed of compressor 701.

Variable-speed drive 703 may be a variable-frequency drive or a variable-voltage power supply, as examples. In the embodiment illustrated, compressor motor 702 drives compressor 701. Further, in the embodiment shown, compressor 701 is connected (e.g., via refrigerant tubing 705) to outdoor coil 704. In the embodiment shown, heat pump 700 also includes controller 710 which is in communication with variable-speed drive 703. In this embodiment, controller 710 controls the output of variable-speed drive 703, and thereby controls the speed of compressor motor 702 and thereby, compressor 701. In different embodiments, controller 710 may also perform different functions described herein. On the other hand, some embodiments may include more than one controller that may perform different functions, and another controller (e.g., besides 710) may perform different functions described herein.

In a number of embodiments, controller 710 operates compressor motor 702 at multiple constant cooling speeds in a cooling mode (i.e., when heat pump 700 is operating in a cooling mode) and multiple constant heating speeds in a heating mode (i.e., when heat pump 700 is operating in a heating mode). In the embodiment shown, controller 710 includes, for instance, non-volatile memory 711 (e.g., EEPROM or flash memory) storing at least one set of constant cooling speeds 712 and at least one set of constant heating speeds 713. In fact, non-volatile memory 711 includes three sets of constant cooling speeds and three sets of constant heating speeds. In particular, speeds 721, 722, 723, and 724 are a first set of constant cooling speeds, speeds 731, 732, 733, and 734 are a second set of constant cooling speeds, and speeds 741, 742, 743, and 744 are a third set of constant cooling speeds, each set having four speeds. Similarly, in the embodiment shown, speeds 751, 752, 753, and 754 are a first set of constant heating speeds, speeds 761, 762, 763, and 764 are a second set of constant heating speeds, and speeds 771, 772, 773, and 774 are a third set of constant heating speeds, each set having four speeds. Other embodiments may have 1, 2, 3, 5, 6, 7, 8, 9, 10, 11, 12, 13, 14, 15, 16, 17, 18, 19, 20, 21, 22, 23, 24, or 25 constant speeds in each set (e.g., cooling, heating, or both). Further, other embodiments may have 1, 2, 4, 5, 6, 7, 8, 9, 10, 11, 12, 13, 14, 15, 16, 17, 18, 19, 20, 21, 22, 23, 24, or 25 sets of constant cooling speeds, 1, 2, 4, 5, 6, 7, 8, 9, 10, 11, 12, 13, 14, 15, 16, 17, 18, 19, 20, 21, 22, 23, 24, or 25 sets of constant heating speeds, or a combination thereof, as examples.

In some embodiments, at least one of the at least one set of constant cooling speeds 712 or the at least one set of constant heating speeds 713 includes, for instance, multiple sets of constant speeds stored in the memory (e.g., 711). In other words, in such embodiments, the at least one set of constant cooling speeds 712 includes multiple sets of constant speeds stored in the memory (e.g., 711), the at least one set of constant heating speeds 713 includes multiple sets of constant speeds stored in the memory (e.g., 711), or both. Heat pump 700 is an example of such an embodiment since non-volatile memory 711 stores three sets each of the constant cooling speeds 712 and the constant heating speeds 713. Further, in the embodiment shown, each set of constant speeds includes a maximum speed (e.g., speeds 721, 731, 741, 751, 761, and 771) and a minimum speed (e.g., speeds 724, 734, 744, 754, 764, and 774). In a number of embodiments, for at least one set of the multiple sets of constant speeds stored in the memory (e.g., 710), the maximum speed in the cooling mode (e.g., speed 721, 731, or 741) is substantially different than the maximum speed in the heating mode (e.g., speed 751, 761, or 771).

In the embodiment illustrated, heat pump 700 further includes (e.g., at least one) field input device 715 which allows a person to select one selected set of constant speeds from the multiple sets of constant speeds. For example, the person may select the set of speeds 721, 722, 723, and 724, the person may select the set of speeds 731, 732, 733, and 734, the person may select the set of speeds 741, 742, 743, and 744, the person may select the set of speeds 751, 752, 753, and 754, the person may select the set of speeds 761, 762, 763, and 764, the person may select the set of speeds 771, 772, 773, and 774, or a combination thereof. In some embodiments, for example, the person may select a set of constant cooling speeds (e.g., from sets 712), the person may select a set of constant heating speeds (e.g., from sets 713), or the person may make both such selections. Controller 710, field input device 715, or both, may be configured to allow the person to make such selections. In a number of such embodiments, controller 710 then operates compressor 701 (e.g., by controlling speed of motor 702 via variable-speed drive 703) at the selected set of constant speeds in the cooling mode, in the heating mode, or both.

As used herein, a person is considered to have selected speeds if the person selects a capacity (e.g., a maximum capacity in a cooling mode, in a heating mode, or both) and the HVAC unit or controller (e.g., 710) selects the speeds (e.g., selects a set of constant speeds) based on the capacity selected. Similarly, an HVAC unit, controller, or field input device is considered to be configured to allow a person to select speeds if the HVAC unit, controller, or field input device is configured to allow a person to select a capacity (e.g., a maximum capacity in a cooling mode, in a heating mode, or both) and the HVAC unit, controller or field input device (e.g., 710) selects the speeds (e.g., selects a set of constant speeds) based on the capacity selected.

For example, for an HVAC unit rated at up to 3.5 tons, controller 710, field input device 715, or both, may be configured to allow the person to select 3.5, 2.5, or 1.5 tons of cooling and controller 710, field input device 715, or both, may be configured to allow the person to select 3.5, 2.5, or 1.5 tons of heating. If the person selects 3.5 tons of cooling, controller 710 may operate the compressor at constant speeds 721, 722, 723, and 724 in the cooling mode, for example, but If the person selects 2.5 tons of cooling, controller 710 may operate the compressor at constant speeds 731, 732, 733, and 734 instead. Further, in some embodiments, the person may select a capacity or speed that is not identified in terms of units (e.g., units of speed in rpm or capacity in tons). For example, the person may select between low, medium, and high, in some embodiments, which may refer to a speed or a capacity (e.g., 1.5, 2.5, and 3.5 tons). In all such embodiments, as used herein, the person is considered to have selected speeds and the HVAC unit, controller, or field input device is considered to be configured to allow a person to select speeds.

Figure 8:
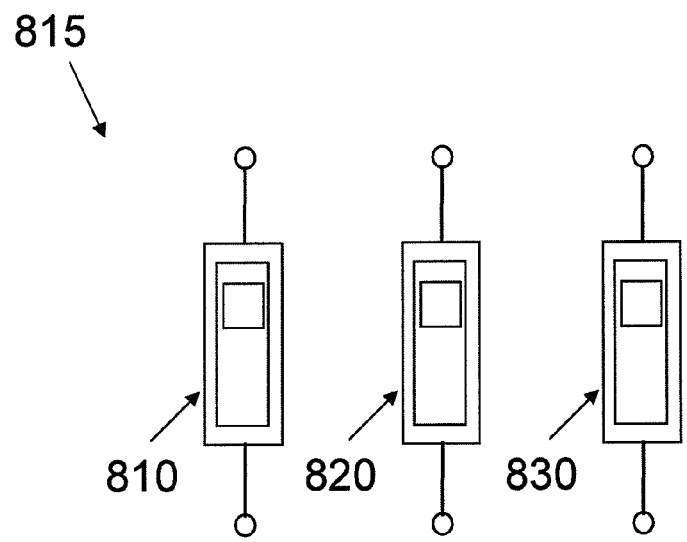
FIG. 8 is a block diagram illustrating an example of a field input device having dip switches that may be used with or part of the heat pump of FIG. 7.

In certain such embodiments, the field input device (e.g., 715) includes, for instance, multiple dipswitches that the person can switch to select the selected set of constant speeds from the multiple sets of constant speeds, multiple jumpers that the person can connect or disconnect to select the selected set of constant speeds from the multiple sets of constant speeds, or a combination of dip switches and jumpers. Accordingly, FIG. 8 illustrates field input device 815 that includes, for instance, multiple dipswitches 810, 820, and 830 that the person can switch to select the selected set of constant speeds from the multiple sets of constant speeds. Further, FIG. 9 illustrates field input device 915 that includes, for instance, multiple jumpers 910 and 920 that the person can connect or disconnect to select the selected set of constant speeds from the multiple sets of constant speeds.

Figure 9:
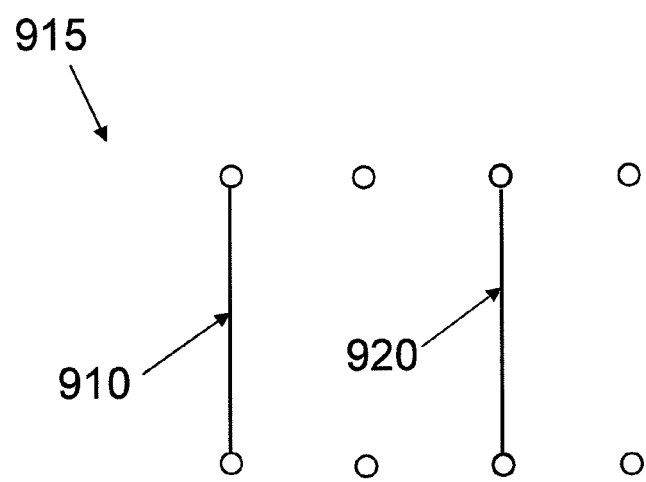
FIG. 9 is a block diagram illustrating an example of a field input device having jumper wires that may be used with or part of the heat pump of FIG. 7.

In some embodiments that have jumpers (e.g., as shown in FIG. 9), one of the jumpers (e.g., jumper 910) is used as a test jumper. During heat pump (e.g., 700) system start up, this jumper (e.g., 910) may be tested to determine whether capacity reconfiguration is demanded (e.g., whether to use speeds other than 721-724 and 751-754, or other than speeds 741-744 and 771-774). If capacity reconfiguration is demanded, certain (e.g., other) jumpers (e.g., 920) are checked against a pass code. (In some embodiments, there may me more jumpers than just 910 and 920 that are shown.) If the pass code is correct, some jumpers (e.g., the rest of the jumpers) may be used, in particular embodiments, to replace capacity settings (e.g., in non-volatile memory 711). On the other hand, if the pass code is not correct, then system capacities are not changed (e.g., from the default settings). In some embodiments, the default settings may be the minimum speeds (e.g., 741-744 and 771-774). In other embodiments, however, the default settings may be the maximum speeds (e.g., 721-724 and 751-754). To obtain the default settings, in such embodiments, the test jumper (e.g., 910) can be removed, the pass code jumpers can be removed or a combination thereof, for instance. In certain embodiments, dip switches (e.g., as shown in FIG. 8) may be used instead of jumpers.

In other embodiments, the field input device (e.g., 715) may be or include, a keyboard display, screen, touch pad, one or more rotary switches, or the like, as examples. In still other embodiments, the field input device (e.g., 715) may be or include a plug, receptacle, or connector that the person plugs a separate input device into, a receiver or transceiver that the person communicates with or provides instructions to using a separate input device, or a combination thereof. Such a separate input device may be or include a computer, a processor, a keyboard, a display, a mobile phone, a network such as a mobile phone or computer network (e.g., a local area network or wide area network), a USB port or cable, or a combination thereof, as examples. Further, in particular embodiments, controller 710 may be configured to check a pass code, for example, entered by the person or the separate input device, for instance, through the field input device (e.g., 715, 815, or 915) and allow the person to change which set of constant speeds is selected only if the person inputs a correct pass code.

In the embodiment illustrated in FIG. 7, field input device 715 is inside HVAC unit 700. In other embodiments, however, the field input device (e.g., corresponding to 715) may be separate from or remote from the HVAC unit (e.g., 700). In particular embodiments, for instance, the field input device (e.g., 715) is the thermostat for the unit. Such a thermostat, performing the roll of the field input device (e.g., 715), may be a digital thermostat, for example. In different embodiments or applications, the manufacturer, distributor, retailer, installer, owner, or user of the HVAC unit may use the thermostat to change which set of constant speeds is selected, and the thermostat (e.g., input device 715), controller (e.g., 710), or both, may be configured to do so. In certain embodiments, the person may have to enter a pass code into the thermostat (e.g., input device 715) in order to change which set of constant speeds is selected. In embodiments or situations where the owner or user has the pass code, the owner or user may change which set of constant speeds is selected. For example, in embodiments or situations where the owner or user has the ability to change which set of constant speeds is selected, in locations where the owner or user pays a monthly demand charge for electricity, the owner or user may select a lower set of constant speeds in order to reduce the monthly demand charge for electricity.

In some embodiments, the multiple sets of constant speeds (e.g., 712, 713, or both) stored in the memory (e.g., 710) each have a same minimum speed. For example, speeds 724, 734, and 744 may all be the same, speeds 754, 764, and 774 may all be the same, or all of speeds 724, 734, 744, 754, 764, and 774 may all be the same. As used herein, speeds are considered to be the "same" if they are within five (5) percent. In some embodiments, the minimum speed may be, for example, 900 revolutions per minute (rpm) or 15 Hertz (Hz), as examples. In certain embodiments, the minimum speed may be the most efficient speed, or close to the most efficient speed. As used herein, "close to the most efficient speed" means that the efficiency at that speed is within five percent of the efficiency at the most efficient speed. In other embodiments, the efficiency at the minimum speed may be, as other examples, within 0.5, 1, 2, 3, 4, 6, 7, 8, 9, 10, or 12 percent of the efficiency at the most efficient speed, as other examples. In some embodiments, the minimum speed or speeds (e.g., speeds 724, 734, 744, 754, 764, and 774) may be set as low as possible (e.g., but still above the maximum efficiency speed) while still providing adequate lubrication of the compressor (e.g., 701) or to meet other requirements of components of the heat pump (e.g., 700).

On the other hand, in various embodiments, the multiple sets of constant speeds (e.g., 712, 713, or both) stored in the memory (e.g., 710) each have a different maximum speed. In a number of embodiments, for example, the multiple sets of constant cooling speeds (e.g., 712) stored in the memory (e.g., 711) each have a different maximum speed and the multiple sets of constant heating speeds (e.g., 713) stored in the memory (e.g., 711) each have a different maximum speed. For example, speeds 721, 731, and 741 may all be different, speeds 751, 761, and 771 may all be different, or, in particular embodiments, all of speeds 721, 731, 741, 751, 761, and 771 may all be different. In a number of embodiments, however, speeds 721, 731, and 741 are all different, and speeds 751, 761, and 771 are all different, but speeds 721 and 751 are the same, speeds 731 and 761 are the same, speeds 741 and 771 are the same, or a combination thereof, as another example. As previously mentioned, as used herein, speeds are considered to be "different" if they differ by more than five (5) percent. Moreover, in some embodiments, the multiple sets of constant speeds (e.g., 712, 713, or both) stored in the memory (e.g., 710) each have a substantially different maximum speed (e.g., different by more than 15 percent).

In some embodiments, maximum speed 721 may be higher than maximum speed 731, and maximum speed 731 may be higher than maximum speed 741. Further in some embodiments, maximum speed 751 may be higher than maximum speed 761, and maximum speed 761 may be higher than maximum speed 771. In certain embodiments, maximum speed 721 may be equal to or substantially equal to maximum speed 751, maximum speed 731 may be equal to or substantially equal to maximum speed 761, maximum speed 741 may be equal to or substantially equal to maximum speed 771, or a combination thereof. On the other hand, in other embodiments, maximum speed 721 may not be equal to or substantially equal to maximum speed 751, maximum speed 731 may not be equal to or substantially equal to maximum speed 761, maximum speed 741 may not be equal to or substantially equal to maximum speed 771, or a combination thereof.

For example, in a particular embodiment, heat pump 700 may have a maximum capacity of three tons when operating at maximum speed 721 in a cooling mode, but may provide a maximum capacity of two tons when operating at maximum speed 731 in a cooling mode, and one ton when operating at maximum speed 741 in a cooling mode. Similarly, heat pump 700 may have a maximum capacity of three tons when operating at maximum speed 751 in a heating mode, but may provide a maximum capacity of two tons when operating at maximum speed 761 in a heating mode, and one ton when operating at maximum speed 771 in a heating mode. Other embodiments may have different maximum capacities at corresponding speeds. For example, in certain embodiments, heat pump 700 may have a maximum capacity of three tons when operating at maximum speed 721 in a cooling or heating mode, but may provide a maximum capacity of 2.5 tons when operating at maximum speed 731, and two tons when operating at maximum speed 741. In different embodiments, relative capacities in the cooling and heating modes may be the same or may differ.

In embodiments in which the minimum speeds are kept the same and the maximum speeds are changed, the different speeds in a set of speeds may be closer together for sets that have a lower maximum speeds. For example, in the embodiment depicted, speeds 732 and 733 may be closer together (e.g., in terms of percentage change, rpm, or Hz) than speeds 722 and 723, and speeds 742 and 743 may be even closer together than speeds 732 and 733. Other embodiments, however, may provide fewer speeds in sets that have a lower maximum speed. For example, in some embodiments, speed may be reduced by eliminating the maximum speed and keeping the other speeds the same. A further reduction in speed may be obtained by also eliminating an intermediate speed closest to the maximum speed. In certain embodiments, further reductions in maximum speed may be achieved by eliminating the next highest speed or speeds. Still other embodiments may reduce speeds by both eliminating speeds and by making the speeds closer together (e.g., with the same minimum speed).

In a number of embodiments, the compressor (e.g., 701), motor (e.g., 702), variable-speed drive (e.g., 703) and other equipment may be physically able to operate at speeds higher than the maximum speed (e.g., higher than any of speeds 721, 731, 741, 751, 761, or 771), but these maximum speeds may be selected to avoid substantial reductions in efficiency (e.g., of heat pump 700) or to meet certain efficiency goals. Lower speeds may provide higher efficiency, at least at speeds above the minimum speed (e.g., 724, 734, 744, 754, 764, or 774). In different speed sets, the minimum speed may be held constant while the maximum speed is changed between speed sets. For example, speeds 724 and 734 may be the same, but speeds 721 and 731 may differ.

Various embodiments include at least one intermediate speed between the maximum speed and the minimum speed. Moreover, in particular embodiments, for example, for each of the multiple sets of constant speeds stored in the memory, the at least one intermediate speed includes, for instance, multiple intermediate speeds. As illustrated in FIG. 7, for example, heat pump 700 includes intermediate speeds 722 and 723 between maximum speed 721 and minimum speed 724. In fact, in the embodiment illustrated, each set of constant compressor speeds (e.g., 712 and 713) includes two intermediate speeds (e.g., 732 and 733, 742 and 743, 752 and 753, 762 and 763, and 772 and 773). In other embodiments, each set of constant speeds may include, as other examples, 1, 3, 4, 5, 6, 7, 8, 9, 10, 11, 12, 13, 14, 15, 16, 17, 18, 19, 20, 21, 22, 23, 24, or 25 intermediate speeds, as other examples. Further, in various embodiments, different sets of constant speeds may have equal or different numbers of intermediate speeds, for example. In certain embodiments, for example, each of the multiple sets of constant speeds stored in the memory has an equal number (2) of intermediate speeds.

In a number of embodiments, the intermediate speeds are spaced between the maximum speed and the minimum speed. In particular embodiments, for example, the intermediate speeds are substantially evenly spaced between the maximum speed and the minimum speed. As used herein, "substantially evenly", when referring to the spacing of speeds, means that the percentage change from a lower speed to a next higher speed is the same for all speeds in the set to within 10 percent of the change, or that the change in rpm or HZ from a lower speed to a next higher speed is the same for all speeds in the set to within 10 percent of the change in rpm or Hz. In certain embodiments, as another example, the intermediate speeds are evenly spaced between the maximum speed and the minimum speed. As used herein, "evenly" (without the modifier "substantially") when referring to the spacing of speeds, means that the percentage change from a lower speed to a next higher speed is the same for all speeds in the set to within 5 percent of the change, or that the change in rpm or Hz from a lower speed to a next higher speed is the same for all speeds in the set to within 5 percent of the change in rpm or Hz. On the other hand, in some embodiments, as yet another example, the intermediate speeds are approximately evenly spaced between the maximum speed and the minimum speed. As used herein, "approximately evenly", when referring to the spacing of speeds, means that the percentage change from a lower speed to a next higher speed is the same for all speeds in the set to within 15 percent of the change, or that the change in rpm or Hz from a lower speed to a next higher speed is the same for all speeds in the set to within 15 percent of the change in rpm or Hz.

In a number of embodiments, the different speeds (e.g., 721-724, 731-734, 741-744, 751-754, 761-764, 771-774, or a combination thereof) may be stored in non-volatile memory 711, for example, in a look-up table. In other embodiments, however, one or more formulas or routines may be provided (e.g., stored in non-volatile memory 711, for instance, within instructions 714 described in more detail below) that may be used to calculate, for example, some or all of the different speeds (e.g., 721-724, 731-734, 741-744, 751-754, 761-764, 771-774, or a combination thereof). Examples are described herein, for instance, using ratios Rc and Rh to calculate speeds. In such embodiments, constants such as Rc and Rh may be stored, for instance, in non-volatile memory 711. In some embodiments in which formulas are used to calculate speeds, certain problematic speeds (e.g., resonance frequencies) may be identified and those speeds may be avoided (e.g., by automatically adjusting to a higher or lower speed).

As mentioned, heat pump 700 includes compressor 701, compressor motor 702, variable-speed drive 703 and controller 710. In various such embodiments, the controller (e.g., 710) may include, for example, instructions to operate the compressor motor at multiple different speeds in each of a cooling mode and a heating mode. Instructions 714 are an example of such instructions. Instructions 714 may include software or programming instructions, or computer code, for example. In different embodiments, instructions may be separate from (as shown) or may include the at least one set of constant cooling speeds 712 or the at least one set of constant heating speeds 713, (or both) as examples. Such embodiments may include at least one field input device (e.g., 715 mentioned above), which may be arranged to allow a person to select at least one operating speed of the compressor motor in the cooling mode and arranged to allow the person to select at least one operating speed of the compressor motor in the heating mode. Examples of the at least one operating speed of the compressor motor in the cooling mode and the at least one operating speed of the compressor motor in the heating mode include the sets of constant cooling speeds (e.g., 712) and the sets of constant heating speeds (e.g., 713) previously described.

In the embodiment shown, controller 710 and field input device 715 are connected (e.g., via cable 716) and are configured so that the person can select a substantially different operating speed (e.g., maximum speed) of compressor motor 702 in the cooling mode than the operating speed of the compressor motor in the heating mode such that the operating speed in the cooling mode is substantially different (e.g., higher, lower, or either) than the operating speed in the heating mode. Moreover, in a number of such embodiments, a lesser of the operating speed (e.g., maximum speed) in the cooling mode and the operating speed in the heating mode provides a higher efficiency of the heat pump (e.g., 700) than a greater of the operating speed in the cooling mode and the operating speed in the heating mode. In a number of embodiments, for example, if maximum speed is set lower, the efficiency of the unit (at the maximum speed) will be higher.

In a number of embodiments, the at least one operating speed of the compressor motor in the cooling mode that the person can select includes, for instance, a maximum speed of the compressor motor in the cooling mode. For example, in heat pump 700, in such embodiments, instructions 714 provide for the person to be able to choose between or select for the maximum speed in the cooling mode either speed 721, 731, or 741. In other words, instructions 714 include software, that if executed by the person, allow the person to select the maximum speed in the cooling mode. In the embodiment illustrated, the unit would then operate in the cooling mode at the corresponding set of different (e.g., constant) speeds. For instance, if the person selects for the maximum speed in the cooling mode speed 731, then controller 710 (operating under instructions 714) will set the speed of compressor 701 (by controlling variable-speed drive 703, and thereby motor 702) at speed 731, 732, 733, or 734, depending on the demand for cooling (e.g., as such speeds are determined as described herein). In a number of embodiments, controller may, alternatively, turn compressor motor 702 completely off, if conditions require no cooling at all (e.g., based on a thermostat signal).

Similarly, in a number of embodiments, the at least one operating speed of the compressor motor in the heating mode that the person can select includes, for instance, a maximum speed of the compressor motor in the heating mode. For example, in heat pump 700, in such embodiments, instructions 714 provide for the person to be able to choose between or select for the maximum speed in the heating mode either speed 751, 761, or 771. In the embodiment illustrated, the unit would then operate in the heating mode at the corresponding set of different (e.g., constant) speeds. For instance, if the person selects for the maximum speed in the heating mode speed 771, then controller 710 (operating under instructions 714) will set the speed of compressor 701 at speed 771, 772, 773, or 774, depending on the demand for heating (e.g., as such speeds are determined as described herein).

In this example, speeds 741 and 771 in the cooling and heating modes, respectively, may be different or substantially different (maximum) operating speeds. Moreover, the lesser of the maximum operating speed in the cooling mode 741 and the maximum operating speed 771 in the heating mode may provide a higher efficiency of the heat pump (e.g., 700) than a greater of the maximum operating speed in the cooling mode and the maximum operating speed in the heating mode. For example, if speed 741 is higher than speed 771, then speed 771 may provide a higher efficiency of the heat pump (e.g., 700) in the heating mode than speed 741 provides in the cooling mode. Other heat pumps (e.g., 700), however, may be configured (e.g., by the person selecting other maximums speeds in the cooling and heating modes) so that the maximum speed in the heating mode is higher than the maximum speed in the cooling mode and the maximum speed in the cooling mode provides a higher efficiency than the maximum speed in the heating mode.

Further, in various such embodiments, the instructions (e.g., 714) to operate the compressor motor at multiple different speeds in the cooling mode include, for example, instructions to operate the compressor at the maximum speed (e.g., 721, 731, or 741) of the compressor motor in the cooling mode and instructions to operate the compressor at a minimum speed (e.g., 724, 734, or 744) of the compressor motor in the cooling mode. Even further, in some embodiments, the instructions (e.g., 714) to operate the compressor motor at multiple different speeds in the heating mode include, for example, instructions to operate the compressor at the maximum speed (e.g., 751, 761, or 771) of the compressor motor in the heating mode and instructions to operate the compressor at a minimum speed (e.g., 754, 764, or 774) of the compressor motor in the heating mode.

Furthermore, in some embodiments, the minimum speed of the compressor motor in the cooling mode does not change when the maximum speed of the compressor motor in the cooling mode is changed by the person selecting another of the multiple different speeds. In other words, speeds 724, 734, and 744 are all the same. Moreover, in some embodiments, the minimum speed of the compressor motor in the heating mode does not change when the maximum speed of the compressor motor in the heating mode is changed by the person selecting another of the multiple different speeds. In other words, speeds 754, 764, and 774 are all the same. Even further, in some embodiments, all of speeds 724, 734, 744, 754, 764, and 774 are all the same.

Moreover, in certain embodiments, the instructions (e.g., 714) to operate the compressor motor (e.g., 702) at multiple different speeds in the cooling mode include, for example, instructions to operate the compressor at multiple intermediate speeds of the compressor motor in the cooling mode. Examples of such intermediate speeds in the cooling mode include speeds 722 and 723, 732 and 733, and 742 and 743. Further, in a number of embodiments, the instructions (e.g., 714) to operate the compressor motor at multiple different speeds in the heating mode include, for example, instructions to operate the compressor at multiple intermediate speeds of the compressor motor in the heating mode. Examples of such intermediate speeds in the heating mode include speeds 752 and 753, 762 and 763, and 772 and 773. The embodiment illustrated includes all of intermediate speeds 722 and 723, 732 and 733, 742 and 743, 752 and 753, 762 and 763, and 772 and 773.

In a number of embodiments, the intermediate speeds of the compressor motor (e.g., 702) in the cooling mode are spaced between the maximum speed of the compressor motor (e.g., 721, 731, or 741) in the cooling mode and the minimum speed of the compressor motor in the cooling mode (e.g., 724, 734, or 744). In various such embodiments, the intermediate speeds of the compressor motor (e.g., 702) in the cooling mode are substantially evenly spaced between the maximum speed of the compressor motor (e.g., 721, 731, or 741) in the cooling mode and the minimum speed of the compressor motor in the cooling mode (e.g., 724, 734, or 744). For example, intermediate speeds 742 and 743 may be substantially evenly spaced between maximum speed 741 and minimum speed 744. In other embodiments, on the other hand, the intermediate speeds of the compressor motor (e.g., 702) in the cooling mode may be evenly spaced between the maximum speed of the compressor motor (e.g., 721, 731, or 741) in the cooling mode and the minimum speed of the compressor motor in the cooling mode (e.g., 724, 734, or 744).

Similarly, in a number of embodiments, the intermediate speeds of the compressor motor (e.g., 702) in the heating mode are spaced between the maximum speed of the compressor motor (e.g., 751, 761, or 771) in the heating mode and the minimum speed of the compressor motor in the heating mode (e.g., 754, 764, or 774). In various such embodiments, the intermediate speeds of the compressor motor (e.g., 702) in the heating mode are substantially evenly spaced between the maximum speed of the compressor motor (e.g., 751, 761, or 771) in the heating mode and the minimum speed of the compressor motor in the heating mode (e.g., 754, 764, or 774). For example, intermediate speeds 772 and 773 may be substantially evenly spaced between maximum speed 771 and minimum speed 774. In other embodiments, on the other hand, the intermediate speeds of the compressor motor (e.g., 702) in the heating mode may be evenly spaced between the maximum speed of the compressor motor (e.g., 751, 761, or 771) in the heating mode and the minimum speed of the compressor motor in the heating mode (e.g., 754, 764, or 774).

Various embodiments may further include, for example, an outdoor fan and an outdoor fan motor mechanically connected to the outdoor fan to drive the outdoor fan. For example, heat pump 700 includes outdoor fan 781 and outdoor fan motor 782 mechanically connected to outdoor fan 781 to drive outdoor fan 781. In a number of such embodiments, controller 710 may be configured to operate outdoor fan motor 782 of heat pump 700, for instance. In particular embodiments, controller 710 may be configured to operate outdoor fan motor 782, for example, at different speeds for different compressor 701 speeds (e.g., 721-724, 731-734, 741-744, 751-754, 761-764, 771-774, or a combination thereof). In particular embodiments, controller 710 may be configured to operate outdoor fan motor 782 at different speeds using variable-speed drive 783, for example, which may provide a variable frequency, voltage, or both, to fan motor 782. In certain embodiments, controller 710 may be configured to operate outdoor fan motor 782, for example, at a speed that is substantially proportional to a concurrent compressor 701 speed, for instance. In other words, the speed of fan 781 may be proportional to the speed of compressor 701 as controlled by controller 710. In particular embodiments, this may be true for steady state conditions, but start up speeds may differ. As an example, in a number of such embodiments, if compressor motor 702 is first operating at speed 721, and controller 710 reduces the speed of compressor motor 702 to speed 722, controller 710 may also reduce the speed of fan motor 782 proportionally. In other words, in this example, the speed of fan motor 782 while compressor motor 702 is operating at speed 722 would be the speed of fan motor 782 while compressor motor 702 is operating at speed 721 times speed 722, divided by speed 721.

Heat pump 700 is an example of an outdoor portion of a split system. In other embodiments, the heat pump may be a packaged air conditioning unit that may include another coil for indoor air and an indoor air fan, among other things. Further, in the embodiment illustrated, controller 710 and field input device 715 are housed within enclosure 706 of heat pump 700. In other embodiments, on the other hand, controller 710, field input device 715, or both, may be located elsewhere, such as within the building serviced by heat pump 700. In addition, components shown in FIG. 7 are not necessarily drawn to scale.

In some embodiments, for example, where the indoor air fan is a variable-speed fan (e.g., has a variable-speed motor or is driven by a variable-speed drive), the speed of the indoor air fan may change, for example, as the compressor (e.g., 701) speed changes. In some embodiments, for instance, the speed of the indoor air fan may be controlled by the same controller (e.g., 710) that controls the compressor (e.g., 701) speed. In other embodiments, however, a separate controller (e.g., from controller 710) may be used to control the speed of the indoor air fan. Moreover, in some embodiments, the speed of the indoor air fan may be controlled without input from the controller (e.g., 710) that controls the compressor (e.g., 701) speed or without communicating with the controller (e.g., 710) that controls the compressor speed. Such control of the indoor air fan may be based, for example, upon one or more signals from the thermostat, for example (e.g., Y1 and Y2).

For instance, in particular embodiments, the separate controller (e.g., separate from controller 710) may be located at, in, or near the indoor portion of the unit, and may control the speed of the indoor air fan in a manner that is the same or similar to the algorithm or method (e.g., as described herein) that is being used (e.g., by controller 710) to control the compressor (e.g., 701) speed. In other words, in different embodiments, any of methods described herein for controlling the compressor (e.g., 701) speed may be used instead or in addition (e.g., at the same time), to control the speed of the indoor air fan. In a number of such embodiments, outdoor temperature (e.g., of the outdoor coil) may not be used (e.g., at all or just to determine indoor fan speed), however. Further, in a number of embodiments, the algorithm or method for controlling the compressor (e.g., 701) speed may be run independently from the algorithm or method to control the speed of the indoor air fan.

In certain embodiments, the speed of the indoor air fan may be changed at the same time (e.g., within +/−5 seconds) that the compressor (e.g., 701) speed is changed (e.g., by controller 710). In other embodiments, however, the speed of the indoor air fan may be changed a certain time after the compressor (e.g., 701) speed is changed (e.g., by controller 710). This certain time may be, for example, 5, 10, 15, 20, 30, 45, 60, 90, 120, 180, or 240 seconds (e.g., within +/−5 seconds or within +/−10, 15, 20, 25, 30, 40, or 50 percent), as examples. Further, in particular embodiments, if the indoor air fan is operating at a lower speed, the indoor air fan speed may be increased periodically, for a period of time, for example, to promote mixing of the air within the space to obtain a more even temperature distribution within the space. Such a period of time may be, for example, ¼, 1, 1½, 2, 3, 4, 5, 7, or 10 minutes, as examples, and such an increase may occur, for example, every 5, 10, 15, 20, 30, 45, or 60 minutes, as examples.

In various embodiments, such adjustment of the indoor air fan speed may provide for higher efficiency or less energy consumption at lower demand by allowing for reduced indoor air fan speed and a resulting reduction in fan energy. Adjustment of the indoor air fan speed may also allow for a lower minimum compressor speed, since the indoor air fan speed can be reduced accordingly, for instance, to avoid a disproportionate amount of fan energy. Further, a number of such embodiments that provide for adjustment of the indoor air fan speed may have a greater number of available or multiple non-zero compressor speeds. In particular embodiments, additional lower available or multiple non-zero compressor speeds may be added, for example, which may provide for higher efficiency or less energy consumption at lower demand by allowing for reduced compressor speed and reduced indoor air fan speed and a resulting reduction in energy consumption. Lower speeds may also provide for less abrupt changes in temperature within the space and less noise when demand for cooling or heating is low.

Figure 10:
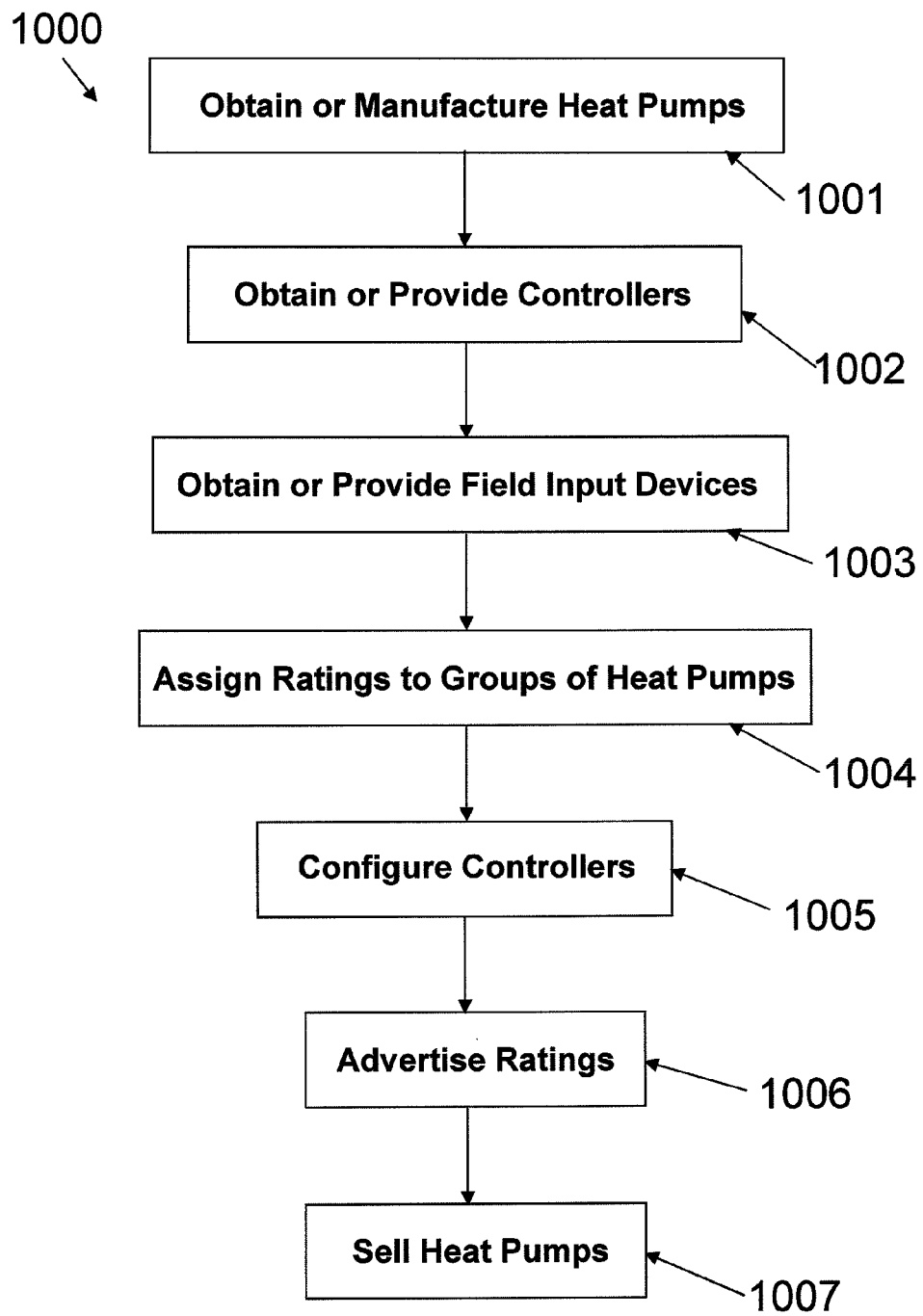
FIG. 10 is a flow chart illustrating an example of a method of adapting and distributing heat pumps to provide improved efficiency performance in different climates where demand for cooling and heating are substantially unequal.

FIG. 10 is an example of a method, method 1000, for instance, of adapting and distributing heat pumps (e.g., 700), for example, to provide improved efficiency performance in different climates where demand for cooling and heating are substantially unequal. Method 1000 includes certain acts, which may be performed in the order indicated, for example, or in another order. Various acts may be repeated, may be performed at the same time, or a combination thereof, as examples. These acts include, in method 1000, an act 1001 of obtaining or manufacturing an inventory of heat pumps (e.g., 700). In a number of embodiments, these heat pumps may each have (e.g., at least) substantially identical compressors (e.g., 701), compressor motors (e.g., 702), variable-speed drives (e.g., 703) for the compressor motors, outdoor heat exchangers (e.g., 704), outdoor fans (e.g., 781), and outdoor fan motors (e.g., 782).

Another act in method 1000 is act 1002 of obtaining or providing controllers (e.g., 710), for example, for each of the heat pumps (e.g., 700). Each controller (e.g., 710 obtained or provided in act 1002) may include, for example, instructions (e.g., 714) to operate the compressor motor (e.g., 702), for instance, at multiple different speeds in each of a cooling mode and a heating mode. Examples of such speeds include speeds 721-724, 731-734, and 741-744 for the cooling mode, and 751-754, 761-764, and 771-774 for the heating mode (or a combination thereof). Anther act of method 1000 is act (or acts) 1004 of dividing the inventory (e.g., obtained or manufactured in act 1001) of heat pumps (e.g., 700) in to multiple groups of multiple heat pumps and assigning different ratings to each group of heat pumps. These different ratings may differ in capacity in at least one of the cooling mode or the heating mode, in various embodiments. Further, in a number of embodiments, for at least one of the groups, a rating in the cooling mode is substantially different (e.g., higher or lower) than a rating in the heating mode.

Another act that method 1000 includes is act 1005 of configuring the controllers (e.g., 710). In a number of embodiments, act 1005 of configuring the controllers may include configuring controllers 710 of each group of heat pumps (e.g., 700) to operate the compressor motors (e.g., 702, via variable-speed drive 703) of the heat pumps in that group at selected speeds that provide performance that corresponds to the rating of the group. In various embodiments, act 1005 of configuring the controllers (e.g., 710) may involve selecting substantially different operating speeds or selecting a selected set of constant speeds from multiple sets of constant speeds, as examples. For example, in act 1004, heat pumps 700 shown in FIG. 7 may be divided into as many as nine different groups, each group having a different combination of ratings in the cooling and heating modes. A first group, for instance, may be configured to operate in the cooling mode at speeds 721-724, and may be configured to operate in the heating mode at speeds 751-754. If speeds 721-724 are equal to speeds 751-754, then this group of heat pumps may operate at the same speeds in the cooling mode as in the heating mode.

A second group, however, may be configured to operate in the cooling mode at speeds 721-724, and may be configured to operate in the heating mode at speeds 761-764. If speeds 721-724 are different than corresponding speeds 761-764, then this group of heat pumps may operate at different speeds in the cooling mode than in the heating mode. For example, if speeds 721-723 are higher than corresponding speeds 761-763, then this group of heat pumps may operate at higher speeds in the cooling mode than in the heating mode. (As mentioned, in a number of embodiments, the minimum speeds, speeds 724 and 764 may be the same or substantially the same, but the other speeds may be different.) In this example, the heat pumps (e.g., 700) of the second group are configured for a warm climate in which the demand in the cooling mode is higher than the demand in the heating mode.

A third group, as another example, may be configured to operate in the cooling mode at speeds 741-744, and may be configured to operate in the heating mode at speeds 761-764. If speeds 741-744 are different than corresponding speeds 761-764, then this group of heat pumps may operate at different speeds in the cooling mode than in the heating mode. For example, if speeds 741-743 are lower than corresponding speeds 761-763, then this group of heat pumps may operate at lower speeds in the cooling mode than in the heating mode. (Again, in some embodiments, the minimum speeds, speeds 744 and 764 may be the same or substantially the same.) In this example, the heat pumps (e.g., 700) of the third group are configured for a cooler climate in which the demand in the cooling mode is lower than the demand in the heating mode.

In various embodiments, for at least one of the groups (e.g., the second and third groups described above), a selected speed of the compressor motor in the cooling mode is different or substantially different than any selected speed of the compressor motor in the heating mode. For example, in the second group described above, maximum speed 721 in the cooling mode may be substantially different (higher) than any of speeds 761-764. Furthermore, in a number of such embodiments, a higher efficiency of the heat pumps in the cooling mode or in the heating mode is achieved by at least one of the groups in comparison with at least one other of the groups. For example, the efficiency in the heating mode at speeds 761-764 of the second group described above may be higher than the efficiency in the heating mode at speeds 751-754 of the first group described above. Similarly, the efficiency in the cooling mode at speeds 741-744 of the third group described above may be higher than the efficiency in the cooling mode at speeds 721-724 of the first group or the second group described above.

In the embodiment illustrated, method 1000 also includes act 1006 of advertising the different ratings, for example, of each group of heat pumps (e.g., 700). In various embodiments, the advertising (e.g., of act 1006) may include advertising the higher efficiency. Advertising may be performed, for example, to the public, to distributors or dealers, to builders, or a combination thereof. Advertising may be performed via the Internet, by telephone, through sales staff, by sending literature to prospective purchasers, on product packaging, on documents that accompany products, through displays where products are sold, via television or radio, in periodicals such as magazines or newspapers, at trade shows, or a combination thereof, as examples.

In the embodiment shown, method 1000 also includes act 1007 of selling the heat pumps (e.g., 700). In a number of embodiments, the heat pumps (e.g., 700) may be sold (e.g., in act 1007) in the different groups for use in different applications or climates having different unequal demands for cooling and heating. For example, heat pumps in some groups may be sold in warmer climates, while heat pumps in other groups may be sold in cooler climates. In various embodiments, assigning different ratings to different groups of heat pumps (act 1004), configuring the controllers of those groups (e.g., in act 1005) to operate the compressors at speeds that provide performance consistent with those ratings, and selling (e.g., in act 1007) the different groups of heat pumps in different climates where the ratings meet the demands, may result in energy savings in comparison with selling identically configured heat pumps in all of the different climates. In addition, the advertising of the ratings (e.g., in act 1006) may encourage the sale of the appropriately configured heat pumps in the different climates. Furthermore, configuring substantially identical heat pumps for different climates reduces the number of different models of heat pumps that must be manufactured to meet the varying needs.

Further, in some embodiments, the act of obtaining or manufacturing an inventory of heat pumps (e.g., act 1001) includes, for instance, obtaining or manufacturing heat pumps (e.g., 700) that include, for example, variable-speed drives (e.g., 783) for the outdoor fan motors (e.g., 782). In certain embodiments, the controllers (e.g., 710) in such embodiments may be configured to operate the outdoor fan motors (e.g., 782) of the heat pumps (e.g., 700) at different speeds for different compressor speeds.

In particular embodiments, the act of obtaining or providing controllers (e.g., 1002) for each of the heat pumps (e.g., 700) may include, for instance, obtaining or providing substantially identical controllers (e.g., 710) for each of the heat pumps. Further, in some embodiments, the act of dividing the inventory of heat pumps in to multiple groups of multiple heat pumps (e.g., act 1004) occurs after the act of obtaining or providing controllers for each of the heat pumps (e.g., act 1002). Moreover, in a number of embodiments, the act of configuring the controllers (e.g., act 1005) occurs after the act of dividing the inventory of heat pumps in to multiple groups of multiple heat pumps (e.g., act 1004. Additionally, in particular embodiments, the act of configuring the controllers (e.g., act 1005) is performed for each heat pump (e.g., 700) before the heat pump is shipped to an installation site.

Furthermore, in some embodiments, the act of obtaining or providing (e.g., substantially identical) controllers for each of the heat pumps (e.g., act 1002) includes, for instance, obtaining or providing controllers that are each configured to operate the compressor motor at a first number of different selected speeds in the cooling mode and a second number of different selected speeds in the heating mode. In various embodiments, the first number and the second number are both whole numbers, and the act of configuring the controllers of each group of heat pumps (e.g., act 1005) includes, for instance, lowering multiple of the first number of different selected speeds in the cooling mode. Further, in some embodiments, the act of configuring the controllers of each group of heat pumps (e.g., act 1005) includes, for instance, lowering multiple of the second number of different selected speeds in the heating mode.

For example, in the embodiment illustrated in FIG. 7, controller 710 is configured (e.g., programmed) to operate compressor motor 702 at four different selected speeds in the cooling mode and four different selected speeds in the heating mode. Speeds 721, 722, 723, and 724 are an example of the four different selected speeds in the cooling mode and speeds 751, 752, 753, and 754 are an example of the four different selected speeds in the heating mode. In other embodiments, the controller may be configured to operate the compressor motor at 2, 3, 5, 6, 7, 8, 9, 10, 11, 12, 13, 14, 15, 16, 17, 18, 19, 20, 21, 22, 23, 24, or 25 different selected speeds in the cooling mode, in the heating mode, or both. In a number of embodiments, the controller may be configured to operate the compressor motor at the same number of different selected speeds in the cooling mode as in the heating mode, while in other embodiments, the controller may be configured to operate the compressor motor at a different number of different selected speeds in the cooling mode as in the heating mode.

Further, in the example of heat pump 700, multiple of selected speeds 721, 722, 723, and 724 in the cooling mode may be lowered to speeds 731, 732, 733, and 734, or even further to speeds 741, 742, 743, and 744. Even in embodiments where minimum speeds 724, 734, and 744 are equal or the same, multiple (e.g., 3) of the other speeds in these sets (e.g., speeds 721, 722, and 723) may be lowered. In other embodiments, 2, 4, 5, 6, 7, 8, 9, 10, 11, 12, 13, 14, 15, 16, 17, 18, 19, 20, 21, 22, 23, 24, or 25 different selected speeds in the cooling mode may be lowered. Similarly, in this example, multiple of selected speeds 751, 752, 753, and 754 in the heating mode may be lowered to speeds 761, 762, 763, and 764, or even further to speeds 771, 772, 773, and 774. Even in embodiments where minimum speeds 754, 764, and 774 are equal, multiple (e.g., 3) of the other speeds in these sets (e.g., speeds 751, 752, and 753) may be lowered. In other embodiments, 2, 4, 5, 6, 7, 8, 9, 10, 11, 12, 13, 14, 15, 16, 17, 18, 19, 20, 21, 22, 23, 24, or 25 different selected speeds in the heating mode may be lowered, as other examples.

In certain embodiments, the act of configuring the controllers of each group of heat pumps (e.g., act 1005 in method 1000 shown in FIG. 10) includes, for instance, lowering at least one selected speed in the cooling mode proportionally to a reduction of rated capacity (e.g., rated in act 1004) in the cooling mode. For example, the change in speed from speed 721 to speed 731 may be proportional to a reduction of rated capacity in the cooling mode from heat pumps in one group configured to operate at maximum speed 721 in the cooling mode to heat pumps in another group configured to operate at maximum speed 731 in the cooling mode. Similarly, in some embodiments, the act of configuring the controllers of each group of heat pumps (e.g., act 1005 in method 1000 shown in FIG. 10) includes, for instance, lowering at least one selected speed in the heating mode proportionally to a reduction of rated capacity (e.g., rated in act 1004) in the heating mode. For example, the change in speed from speed 751 to speed 761 may be proportional to a reduction of rated capacity in the heating mode from heat pumps in one group configured to operate at maximum speed 751 in the heating mode to heat pumps in another group configured to operate at maximum speed 761 in the heating mode.

Further, particular embodiments may further include, for example, act 1003 of obtaining or providing at least one field input device (e.g., 715). In a number of embodiments, such a field input device may be arranged to allow a person to select at least one of an operating speed of the compressor motor (e.g., 702) in the cooling mode, or an operating speed of the compressor motor in the heating mode. For example, field input device 715 may be arranged (and controller 710 may be configured) so that the person may can select speeds 721-724, speeds 731-734, or speeds 741-744, so that the person may can select speeds 751-754, speeds 761-764, or speeds 771-774, or a combination thereof. In certain embodiments of such methods, the act of obtaining or providing at least one field input device (e.g., act 1003) includes, for instance, obtaining or providing multiple dipswitches (e.g., shown in FIG. 8) or multiple jumper wires (e.g., shown in FIG. 9), which may be electrically connected to the controller (e.g., 710) so that the person can select at least one of the operating speed of the compressor motor in the cooling mode or the operating speed of the compressor motor in the heating mode by changing the dipswitches (e.g., 810, 820, 830, or a combination thereof) or the jumper wires (e.g., 910, 920, other jumper wires not shown, or a combination thereof), as examples.

Various methods may further include acts of obtaining, providing, or making various components described herein or known in the art. Other embodiments include a controller configured to perform a method described herein, an HVAC unit including such a controller, an HVAC system that includes such a controller or unit, or a building that includes such an HVAC system. Further embodiments include various computer-readable storage media that may include, for example, computer-readable instructions to perform a method described herein. Such media may be or include, for example, a disc, random access memory (RAM), read only memory (ROM), programmable read only memory (PROM), erasable programmable read only memory (EPROM), electronically erasable programmable read only memory (EEPROM), flash memory, or the like. Other embodiments include various computers programmed to perform a method described herein, and computer software including, for example, instructions to perform a method described herein.

Various methods in accordance with different embodiments include acts of selecting, making, positioning, or using certain components, as examples. Other embodiments may include performing other of these acts on the same or different components, or may include fabricating, assembling, obtaining, providing, ordering, receiving, shipping, or selling such components, or other components described herein or known in the art, as other examples. Further, various embodiments include various combinations of the components, features, and acts described herein or shown in the drawings, for example. Further, particular embodiments include various means for accomplishing one or more of the particular functions described herein or apparent from the structure described. Other embodiments may be apparent to a person of ordinary skill in the art having studied this document.

What is claimed is:

1. A method of adapting and distributing heat pumps to provide improved efficiency performance in different climates where demand for cooling and heating are substantially unequal, the method comprising in any order at least the acts of:
    obtaining or manufacturing an inventory of heat pumps having, at least, substantially identical compressors, compressor motors, variable-speed drives for the compressor motors, outdoor heat exchangers, outdoor fans, and outdoor fan motors;
    obtaining or providing controllers for each of the heat pumps, each controller comprising instructions to operate the compressor motor at multiple different speeds in each of a cooling mode and a heating mode;
    dividing the inventory of heat pumps into multiple groups of multiple heat pumps and assigning different ratings to each group of heat pumps, the different ratings differing in capacity in at least one of the cooling mode or the heating mode, wherein for at least one of the groups, a rating in the cooling mode is substantially different than a rating in the heating mode; and
    configuring the controllers of each group of heat pumps to operate the compressor motors of the heat pumps in that group at selected speeds that provide performance that corresponds to the rating of the group; wherein:
        for at least one of the groups, a selected speed of the compressor motor in the cooling mode is substantially different than any selected speed of the compressor motor in the heating mode, and
        a higher efficiency of the heat pumps in the cooling mode or in the heating mode is achieved by at least one of the groups in comparison with at least one other of the groups.

2. The method of claim 1 further comprising acts of:
    advertising the different ratings of each group of heat pumps, the advertising including advertising the higher efficiency; and
    selling the heat pumps in the different groups for use in different applications having different unequal demands for cooling and heating.

3. The method of claim 1 wherein:
    the act of obtaining or manufacturing an inventory of heat pumps comprises obtaining or manufacturing heat pumps comprising variable-speed drives for the outdoor fan motors; and
    the controllers are configured to operate the outdoor fan motors of the heat pumps at different speeds for different compressor speeds.

4. The method of claim 1 wherein:
    the act of obtaining or providing controllers for each of the heat pumps comprises obtaining or providing substantially identical controllers for each of the heat pumps;
    the act of dividing the inventory of heat pumps into multiple groups of multiple heat pumps occurs after the act of obtaining or providing controllers for each of the heat pumps; and
    the act of configuring the controllers occurs after the act of dividing the inventory of heat pumps into multiple groups of multiple heat pumps.

5. The method of claim 1 wherein the act of configuring the controllers is performed for each heat pump before the heat pump is shipped to an installation site.

6. The method of claim 1 wherein:
    the act of obtaining or providing controllers for each of the heat pumps comprises obtaining or providing controllers that are each configured to operate the compressor motor at a first number of different selected speeds in the cooling mode and a second number of different selected speeds in the heating mode;
    the first number and the second number are both whole numbers; and
    the act of configuring the controllers of each group of heat pumps comprises lowering multiple of the first number of different selected speeds in the cooling mode; or
    the act of configuring the controllers of each group of heat pumps comprises lowering multiple of the second number of different selected speeds in the heating mode.

7. The method of claim 1 wherein:
    the act of configuring the controllers of each group of heat pumps comprises lowering at least one selected speed in the cooling mode proportionally to a reduction of rated capacity in the cooling mode; or
    the act of configuring the controllers of each group of heat pumps comprises lowering at least one selected speed in the heating mode proportionally to a reduction of rated capacity in the heating mode.

8. The method of claim 1 further comprising an act of obtaining or providing at least one field input device arranged to allow a person to select at least one of:
- an operating speed of the compressor motor the cooling mode; or
- an operating speed of the compressor motor in the heating mode.

9. The method of claim 8 wherein the act of obtaining or providing at least one field input device comprises obtaining or providing multiple dipswitches or multiple jumper wires electrically connected to the controller so that the person can select at least one of the operating speed of the compressor motor in the cooling mode or the operating speed of the compressor motor in the heating mode by changing the dipswitches or the jumper wires.

10. The method of claim 8 wherein the act of obtaining or providing at least one field input device further comprises obtaining or providing a pass code entered by the person through the field input device to allow the person to change at least one of the operating speed of the compressor motor in the cooling mode and the operating speed of the compressor motor in the heating mode.

11. The method of claim 10, wherein the change is accepted only if the person inputs a correct pass code.

* * * * *